United States Patent [19]
Saitou et al.

[11] Patent Number: 6,141,309
[45] Date of Patent: *Oct. 31, 2000

[54] OPTICAL MEMORY APPARATUS HAVING A SUPPORTING BASE WITH AN INTEGRAL, FIXED OPTICAL PART MOUNTING PORTION

[75] Inventors: Hidenori Saitou, Tokyo; Toshitaka Iwamoto, Kawasaki; Hirataka Ukai, Yokohama; Yasukiyo Kunimatsu; Shigeru Juman, both of Kawasaki, all of Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/678,551

[22] Filed: Jul. 9, 1996

[30] Foreign Application Priority Data

Jul. 10, 1995 [JP] Japan ..................................... 7-173652
May 24, 1996 [JP] Japan ..................................... 8-130170

[51] Int. Cl.$^7$ .................................................... G11B 33/12

[52] U.S. Cl. ........................................................ 369/75.1

[58] Field of Search ................................. 369/75.1, 77.1, 369/44.16, 44.23, 112; 360/97.02, 97.01; 361/685

[56] References Cited

U.S. PATENT DOCUMENTS 4,977,552  12/1990  Gotoh ................................... 369/44.14

(List continued on next page.)

FOREIGN PATENT DOCUMENTS

| 0 526 703 | 2/1993 | European Pat. Off. . | |
| 5-6559 | 1/1993 | Japan | 369/44.16 |

OTHER PUBLICATIONS

*Patent Abstracts of Japan*, vol. 15, No. 503 (P–1290), Dec. 19, 1991 & JP 03216885 A (Sony Corp), Sep. 24, 1991.
*Patent Abstracts of Japan*, vol. 16, No. 527 (P–1447), Oct. 29, 1992 & JP 04195963 A (Sony Corp), Jul. 15, 1992.
*Patent Abstracts of Japan*, vol. 18, No. 494 (P–1800), Sep. 14, 1994 & JP 06162753 A (Reich Co Ltd), Jun. 10, 1994.
*Patent Abstracts of Japan*, vol. 18, No. 638 (P–1837), Dec. 5, 1994 & JP 06243654 A (Sony Corp), Sep. 2, 1994.
*Patent Abstracts of Japan*, vol. 95, No. 4 (P–1837), May 31, 1995 & JP 07029362 A (Nec Gumma Ltd), Jan. 31, 1995.

*Primary Examiner*—David L. Ometz
*Assistant Examiner*—Angel Castro
*Attorney, Agent, or Firm*—Staas & Halsey LLP

[57] ABSTRACT

A miniaturized optical disc memory is receivable in a slot, of about 17 mm height, normally accommodating a floppy disc drive. A base includes a base plate with integral, peripheral sidewalls and an internal lateral partition wall which define a cartridge receiving slot on the upper surface of the base plate. First and second support plates extend from the partition wall to the rear peripheral sidewall of the base and define respective, first and second upper mounting surfaces and lower first and second cavities respectively receiving an ejection motor and a fixed optical system, individual optical components being mounted and aligned on integral, precision machined blocks in the second cavity for transmitting a laser beam and receiving a reflected beam along a central, longitudinal optical axis beneath the base plate. A first base plate aperture accommodates a lens carriage driven in reciprocating motion along the axis for receiving and redirecting the laser beam vertically for scanning an optical disc and receiving a reflected beam and redirecting same to the fixed optical system. The movable optical system is locked in a rest position and is released by insertion of a cartridge to permit scanning movement thereof. A disc drive unit is mounted beneath the base plate for reciprocating vertical movement through a second aperture therein to a raised position for engaging and driving, in rotation, an optical disc of a cartridge inserted into the apparatus and to a lowered position for releasing the cartridge and permitting ejection thereof.

21 Claims, 38 Drawing Sheets

U.S. PATENT DOCUMENTS

| | | | |
|---|---|---|---|
| 5,056,078 | 10/1991 | Carey et al. | 369/77.1 |
| 5,126,563 | 6/1992 | Aikoh et al. | 369/44.23 |
| 5,146,447 | 9/1992 | Nagasato et al. | 369/77.2 |
| 5,220,543 | 6/1993 | Kuroda et al. | 369/13 |
| 5,224,079 | 6/1993 | Inoue | 369/13 |
| 5,386,407 | 1/1995 | Park | 369/77.2 |
| 5,412,633 | 5/1995 | Ichikawa et al. | 369/112 |
| 5,420,832 | 5/1995 | Shigematsu et al. | 369/13 |
| 5,471,453 | 11/1995 | Suzuki | 369/100 |

OPTICAL MEMORY APPARATUS HAVING A SUPPORTING BASE WITH AN INTEGRAL, FIXED OPTICAL PART MOUNTING PORTION

CROSS REFERENCE TO RELATED APPLICATIONS

The present application is related to and incorporates by reference the disclosures of the following applications:

1. "Optical Information Recording/Reproducing Apparatus"—Tezuka et al., U.S. application Ser. No. 084,362 filed Jun. 30, 1993, corresponding to Japanese Application HEI5-619, filed Jan. 6, 1993 and Assigned to Fujitsu Limited
2. "Disk Apparatus"—Takahashi et al., U.S. application Ser. No. 067,867 filed May 27, 1993 corresponding to Japanese Application HEI3-316153 filed Nov. 29, 1991, Assigned to Fujitsu Limited and Copal Corp.
3. "Optical Disk Drive Unit"—Kaneko et al., U.S. application Ser. No. 334,079 filed Nov. 4, 1994 corresponding to Japanese Application HEI6-4690 filed Jan. 20, 1994, Assigned to Fujitsu Limited
4. "Optical Memory Apparatus"—Kaneko et al., U.S. application Ser. No. 08/959,454 filed Oct. 28, 1997 corresponding to Japanese Application HEI7-201229 filed Aug. 7, 1995, Assigned to Fujitsu Limited
5. "Storage Apparatus"—Itoh et al., U.S. application Ser. No. 08/688,905 filed Jul. 31, 1996 corresponding to Japanese Application HEI7-201176 filed Aug. 7, 1995, Assigned to Fujitsu Limited

BACKGROUND OF THE INVENTION

1. Field of the Invention

The present invention relates in general to an optical memory apparatus including, e.g., optical disc, magneto-optical disc and phase-change optical disc types of such memory apparatus, and, more particularly, to an overall structure and design of such an optical memory apparatus of a compact, small size and light weight, substantially reduced from conventional such apparatus.

2. Description of the Related Art

Optical discs of the above-noted types and optical cards, as well, are attracting a great deal of attention, recently, as recording media for use in optical memory apparatus; currently, moreover, optical disc media have become established as a core element of rapid multimedia developments. The optical disc usually is accommodated in a portable cartridge, which is loaded into an optical disc (memory) apparatus and the optical disc is accessed by an optical head of the apparatus for recording and storage of information therein, and for reproduction of information stored therein.

The optical disc apparatus is used currently under the condition that it is externally connected with a computer through an SCSI interface. For instance, an external 3.5-inch magneto-optical disc drive is connected with a desktop computer and is housed in a case or a locker. When the 3.5-inch magneto-optical disc drive is removed from the case or the locker, it has an external size of about 25.4 mm (height)×101.6 mm (width)×150 mm (depth), which dimensions may have an accuracy error of about ±0.5 mm, and a weight of about 470 g. Moreover, the total external size of the disc drive unit, as mounted within the case, is 36 mm (height)×132 mm (width)×208 mm (depth).

Such an optical disc drive can be applied to a desktop computer. However, from the viewpoint of size and weight, it has been impossible to have the optical disc drive built into a portable (laptop) computer, the market demand for which is rapidly growing, and to carry the optical disc apparatus with the portable computer.

In view of improving user operability, it is strongly required to introduce an optical disc apparatus into the portable personal computer. Therefore, technical developments for reduction of size and weight are now being made frequently.

SUMMARY OF THE INVENTION

It is an object of the present invention to provide a small size, light weight and low cost optical disc memory apparatus, while maintaining or improving the reliability and durability of same as a data storage apparatus.

It is another object of the present invention to provide an optical memory apparatus, such as a magneto-optical disc apparatus and a phase-change-optical disc apparatus, having a height of about 24 mm or less and a total weight of 300 g or less and to make it possible to mount such an optical memory apparatus into a portable computer without any design change of major dimensions, and/or of the total weight, of the portable computer.

It is a further object of the present invention to provide an optical memory apparatus which is designed to be almost of the same size as a floppy disk drive unit, of about 17 mm in thickness (i.e., height), and which can also be inserted into an existing slot provided in a computer housing for a floppy disk drive unit, of about 17 mm in thickness.

It is a still further object of the present invention to improve connectability of an optical memory apparatus with a host apparatus in order to improve the flexibility of use thereof.

To achieve the above-mentioned objects, an optical memory apparatus in accordance with the present invention comprises a base having a first surface and a second surface, a fixed optical part contacting the first surface and the second surface, a holding member holding the fixed optical part against the first surface and the second surface, a carriage movably mounted on the base, a movable optical part mounted on the carriage, a light emitter mounted on the base and a photo-detector mounted on the base.

An optical memory apparatus in accordance with other aspects the present invention further comprises a base having a shape approximately of a rectangular plate and a first recess, a turntable motor mounted on the base, a fixed optical part mounted on the base, a carriage movably mounted on the base, a movable optical part mounted on the carriage; a light emitter mounted on the base, a photo-detector mounted on the base, and an eject motor mounted within the first recess of the base.

According to further improvements of the present invention, an optical memory apparatus comprises a base of an approximately rectangular shape and having a sliding surface on a first side thereof for sliding a cartridge thereover, first and second openings in the base and first and second recesses extending (i.e., laterally displaced) from the sliding surface; a cartridge holder mounted on the sliding surface and spaced therefrom so as to define, with the sliding surface, a cartridge receiving slot; a turntable motor unit movably mounted on a second, opposite side of the base from the sliding surface and being movable, transversely, through the first opening; a carriage motor movably mounted on an opposite side of the base and being movable within the second opening; a movable optical part mounted on said carriage; a fixed optical unit mounted within the first recess; an eject motor unit mounted within the second recess; a cover mounted on the second side of said base; a printed circuit board mounted on the first side of said base; an interface connector mounted on an edge of said printed circuit board; and said optical memory apparatus having a height of 24 mm or less in a direction perpendicular to a surface of the 3.5-inch optical disc medium.

DESCRIPTION OF THE PREFERRED EMBODIMENTS

Figure 1:
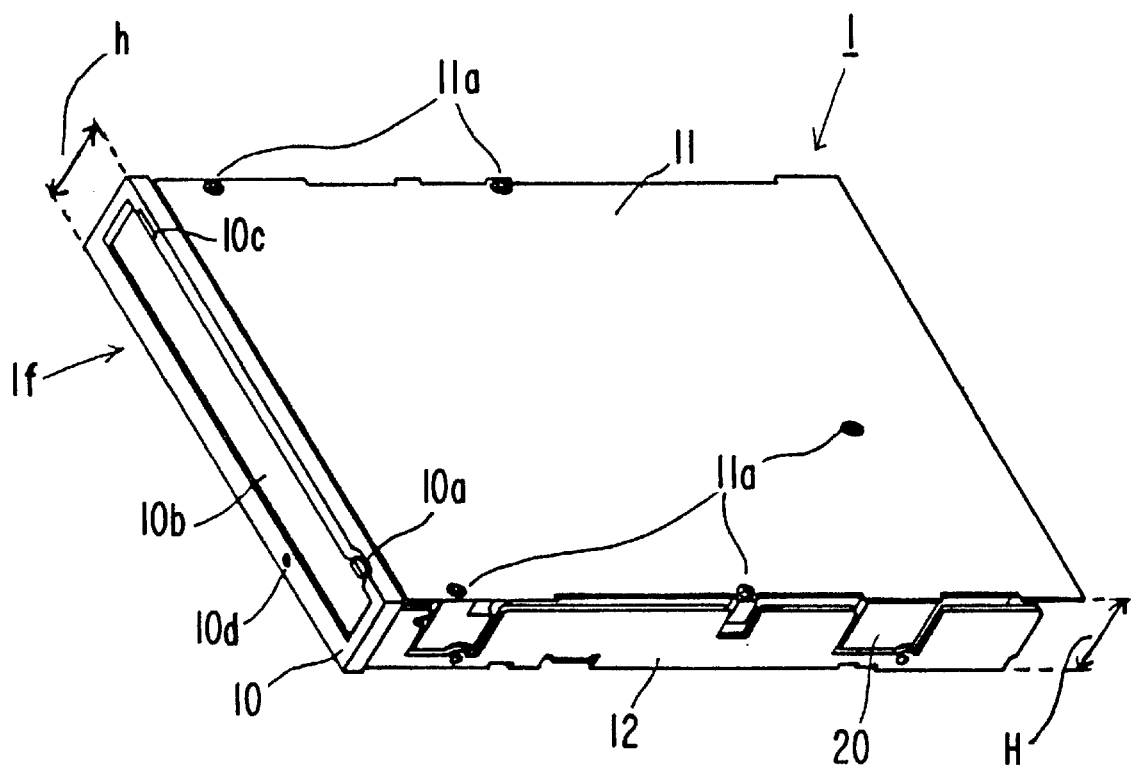
FIG. 1 is a top perspective view of a 3.5-inch magneto-optical disc drive unit as a preferred embodiment of the present invention.
Figure 2:
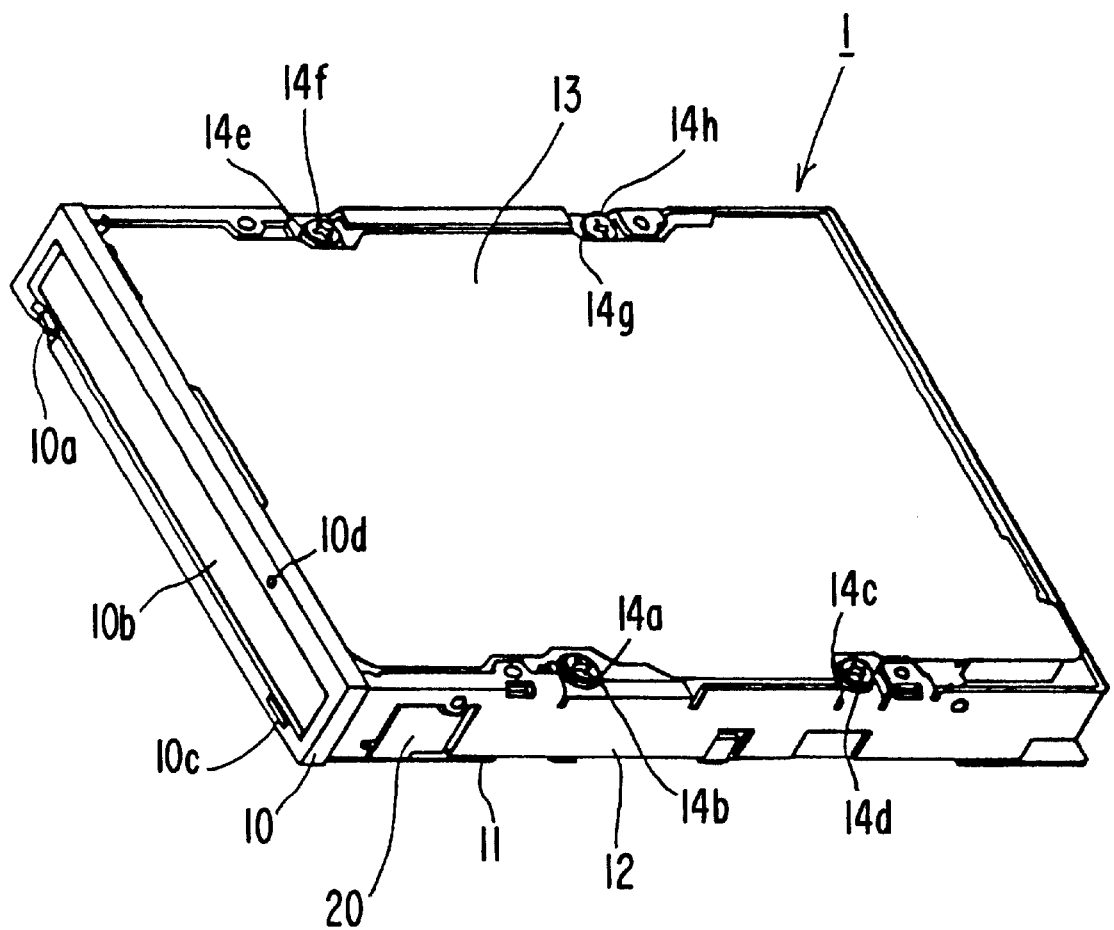
FIG. 2 is a bottom perspective view of the optical disc drive unit shown in FIG. 1.
Figure 3:
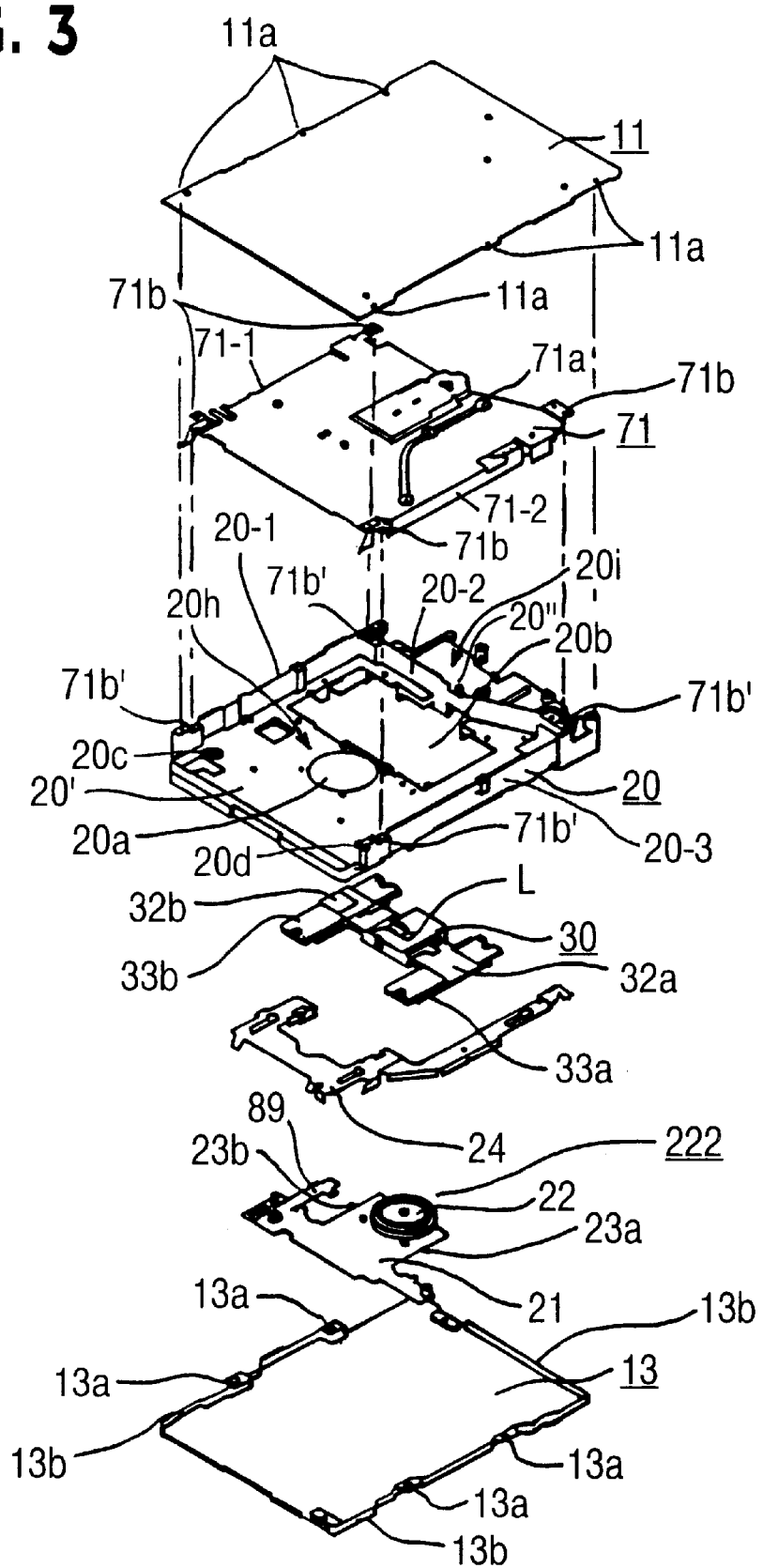
FIG. 3 is a top perspective and exploded view of the optical disc drive.
Figure 4:
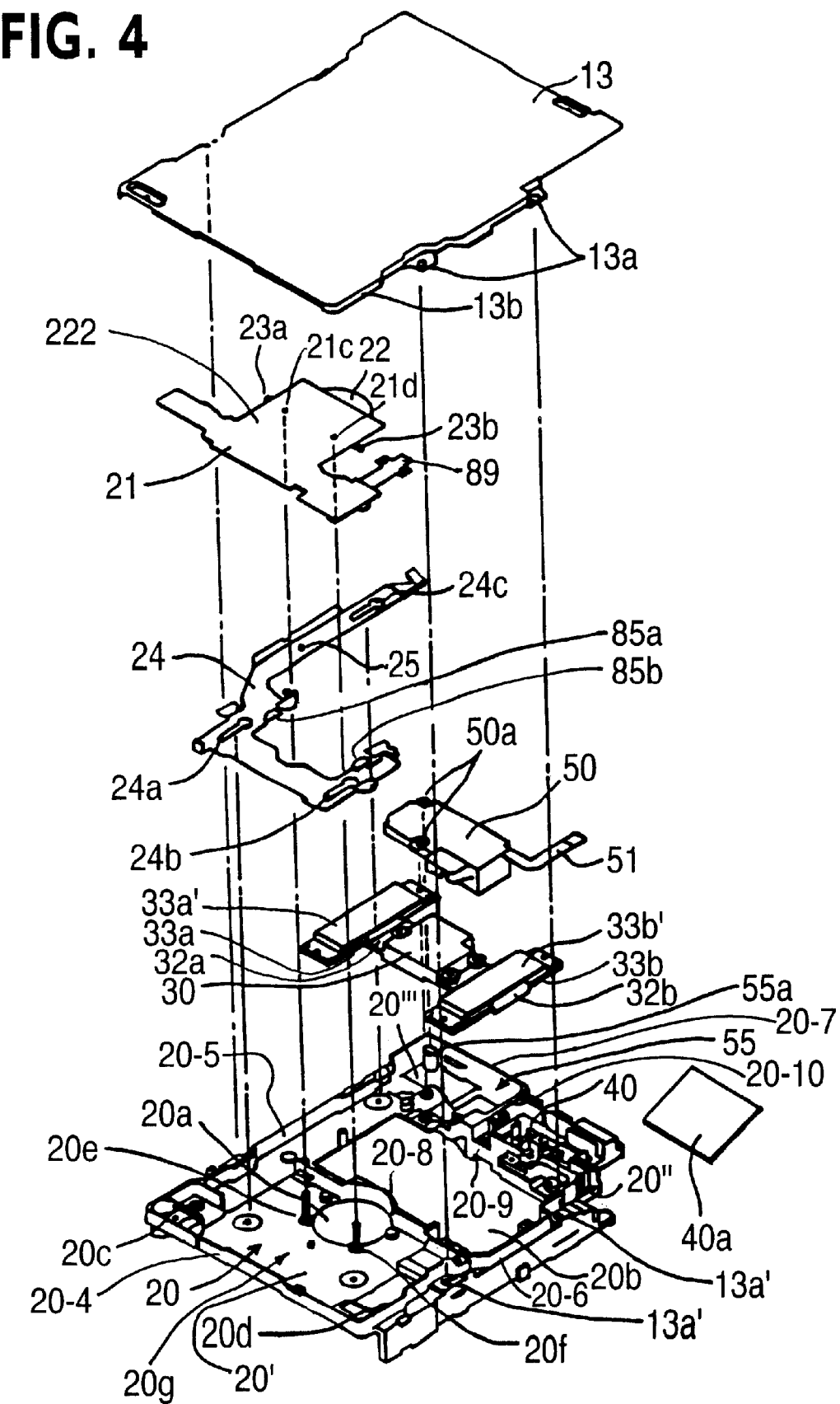
FIG. 4 is a bottom perspective exploded view of the optical disc drive shown in FIG. 3.

FIG. 1 is a top perspective view of a 3.5-inch magneto-optical disc drive unit 1, as a preferred embodiment of the present invention. FIG. 2 is a bottom perspective view of the optical disc drive unit 1 shown in FIG. 1. FIGS. 3 and 4 respectively are top and bottom, perspective and exploded views of the optical disc drive unit 1; therein, the front bezel 10 and the frame 12, shown in FIGS. 1 and 2, are omitted for simplification.

On the front of the optical disc drive unit 1 there is mounted a front bezel (front panel) 10 to which a door 10b is mounted by hinges 10a and 10b so that it can be freely rotated by, and thereby to permit, the insertion or ejection of an optical disc cartridge, into or from a slot within the disc drive unit 1. The door 10b is resiliently urged, by a spring (not illustrated), to a closed position (as shown).

An auto-eject button 10a is provided for instructing an automated ejection of an inserted disc cartridge; further, a manual eject hole 10d is provided into which a pin may be inserted to produce ejection of an inserted disc cartridge in the case of an electrical power failure and/or for maintenance of or otherwise checking the optical disc drive unit 1. The pin, when inserted into the manual eject hole 10d, cancels the engagement between the disc cartridge and the disc drive unit 1 for permitting ejection of the disc cartridge. An LED 10c emits an indicating light for indicating a current operating condition of the optical disc drive unit 1.

With concurrent reference to FIGS. 1–4, the disk drive unit 1 has a base 20, the front bezel 10 being coupled to the base 20 at a front end thereof, corresponding to the front surface 1f of the disc drive unit 1. Also coupled to the drive base 20 are a printed circuit board 11 on which various kinds of ICs are mounted and to which various kinds of flexible printed circuits "FPCs" are connected, a frame 12 (which is optional) defining a surrounding, or peripheral, external enclosure wall and a cover 13 made of a magnetic material. The printed circuit board (PCB) 11 is secured to the drive base 20 by screw(s) (not shown) received through corresponding holes 11a in the PCB 11 and aligned, threaded holes in the base 20 (FIG. 3). The cover 13 is secured to base 20 by screws 14a, 14c, 14f, 14h received through the holes 13a in the cover 13, shock absorbing spacers (e.g., of rubber) 14b, 14d, 14e, 14g, holes (not illustrated) of frame 12 (FIGS. 1 and 2) and aligned, threaded holes 13a' (shown in the drive base 20 (FIG. 4)).

In this embodiment, a height of the 3.5-inch optical disc drive unit is determined by the height "H" of the assemblage of the drive base 20, the PCB 11 and cover 13, and the height "h" (FIG. 1) of the front bezel 10. The heights "H" of the cabinet and "h" of the front bezel 10 are substantially the same, approximately 17 mm. However, since the front bezel 10 and the frame 12 are provided optionally, depending on a user's request, these need not always be actually provided.

When the total height "H" of the optical disc drive unit 1 is limited to about 17 mm, it can be used as an alternative storage device, relative to a floppy disk drive, by inserting it into an existing slot as is otherwise provided for a floppy disk drive unit in a portable computer or the like.

The technology of the invention for realizing a reduction in size and weight of the optical disc drive, and particularly for limiting the height to about 17 mm, will be explained hereunder.

As shown FIG. 3, the disc drive unit 1 comprises seven principal parts, roughly speaking, namely, the printed circuit board 11, a cartridge holder 71, the drive base 20, a lens carriage 30, a load plate 24, a turn-table motor unit 222 and the cover 13, arranged and assembled in that sequence and for the normal orientation of the unit 1 as illustrated.

The drive base, or baseplate, 20 is of a substantially rectangular shape and has several recesses and openings. The drive base 20, in FIG. 3, has upwardly extending and interconnected wall segments 20-1, 20-2 and 20-3, the segments 20-1 and 20-3 being substantially parallel and defining spaced, longitudinal, peripheral side walls, or edges, of the base plate 20 and the segment 20-2 being an interior wall or lateral partition, spaced inwardly of the rear end of the base plate 20 and being angled, as later discussed, the wall segments 20-1, 20-2 and 20-3 together with a support plate 20' surrounding and defining a recess 20h having a lower surface comprising the upper surface of the support plate 20' of the drive base 20 and providing a slide surface for a cartridge to be inserted into and held in the recess 20h by the cartridge holder 71. A slot, for the disc cartridge to be inserted, is defined by the cartridge holder 71 and the bottom, slide surface of the recess 20h. The cartridge holder 71 more particularly is of a generally planar configuration, corresponding substantially to the shape of the recess 20h and a pair of depending (i.e., downwardly extending), integral longitudinal flanges 71-1 and 71-2 which are received adjacent the peripheral wall segments 20-1 and 20-3, respectively, of the base 20 and thereby support the major planar surface of the cartridge holder 71 in spaced relationship from the bottom surface of the recess 20 to define the receiving slot for a disc cartridge. Moreover, the drive base 20 has vertical, post-like mounts 71b' integral therewith and with the wall segments 20-1 through 20-3, as indicated, which are bored and threaded, in alignment with apertures in corresponding mounting tabs 71b of the cartridge holder 71, and through which mounting screws are received to secure the cartridge holder 71 to the base 20.

Moreover, the base drive 20, in FIG. 3, has an upper recess 20i with an associated support plate 20" extending from the interior partition, lateral wall segment 20-2 to the back, or rear end, of the drive base 20 for accommodating electrical components therein, both as are directly mounted on the bottom surface of the recess 20i defined by the corresponding support plate 20" and, as well, which are mounted on and depend downwardly from the PCB 11. In that regard and as later shown in further detail, the depending flanges 71-1 and 71-2 are of a shorter height than the wall segments 20-1 through 20-3 as a result of which the upper surface of the planar cartridge holder 71 is spaced from and defines an upper recess portion relatively to the bottom surface of the printed circuit board 11, when the latter is assembled on the wall segments 20-1, 20-2 and 20-3, such that electrical components (e.g., IC chips and the like) mounted on the lower surface of the PCB 11 are accommodated in that upper recess portion 20i. The drive base 20 also has an opening 20a through which the turn-table motor unit 222 is moveable, in reciprocating (vertical) movement transverse to the plane of the (horizontal) drive base 20, so as to bring the turn-table 22 into engagement with, and to be released from, the hub of an optical disc of a cartridge (not shown in FIG. 3) received in the slot. Associated with the opening 20a are apertures 20c and 20d and guide pins 20e and 20f for guiding such movement of the turn-table motor unit 222, and an opening 20b along which the lens carriage 30 is moveable and through which it has access to the disc of a disc cartridge received in the cartridge holder 71.

FIG. 4 illustrates the components of FIG. 3 in inverted positions relatively to the illustration of same, in the normal upright positions thereof, in FIG. 3; therein, the base 20 is shown to have additional peripheral sidewalls, or side wall segments, 20-4, 20-5, 20-6 and 20-7 extending generally along the periphery of the front and rear ends and the opposite longitudinal sides of the base 20 and interior, lateral wall segments, or partitions, 20-8 and 20-9, generally extending parallel to the front and rear wall segments 20-4 and 20-7, and a wall segment 20-10 extending in a longitudinal direction transversely from the wall segment 20-9. It will be appreciated that the wall segments 20-4 through 20-10 depend from the lower surface of the base 20 when in its normal, upright orientation as shown in FIG. 3. Wall segments 20-7, 20-9 and 20-10 (or relevant portions thereof) and a (lower) surface of the support plate 20" define a (lower) recess 40' for receiving and precision mounting therein components of a fixed optical unit 40 (not illustrated in FIG. 4). In the empty recess 40', however, are seen various integral mounting posts of the base 20 which are precision configured to enable automatic, precision positioning and relative alignment of the components of the fixed optical unit. The fixed optical unit 40 guides the light beam emitted from a laser diode to the surface of an optical disc and then guides the light beam reflected from the optical disc to a photo-detector. In FIG. 4, a lens, etc. in the fixed optical unit 40 is not illustrated for simplification. Moreover, a cover 40a, for shielding optical unit 40 from dust and extraneous light beams, is mounted on and covers the recess 40'.

The compact disc drive unit of the invention is subject to a potential of increased magnetic flux leakage, due to a reduction in thickness and mass of walls and other parts; this can be prevented by making the cover 13 of a ferromagnetic material, such as stainless steel or the like. Therefore, even when the disc drive unit is mounted in a computer and stacked on (or with) a floppy disk drive or a hard disc drive, no adverse magnetic field effects are coupled to such a floppy disc drive unit or hard disc drive unit, thereby to avoid the generation of read/write failures which can readily be produced by such extraneous magnetic fields.

Moreover, packing typically is used between a drive base and a cover to improve the seal therebetween. However, in accordance with the invention, to minimize the height of the drive unit, the packing is successfully eliminated through the provision of peripheral flanges of the cover 13 which engage the peripheral side wall segments of the base 20. For example, when the cover 13 is mounted on the base 20, peripheral flanges 13b thereof mate and engage with corresponding portions of the wall segments 20-6 of the base 20 as seen in FIG. 4; further such flanges (not seen in FIG. 4) at the rear edge and opposite side edge of the cover 13 correspond in configuration to and engage the related and opposite wall segments 20-7 and 20-5. These various sidewalls 13b of the cover 13, as thus tightly fitted to the circumferential side wall segments of the base body 20, not only seal but also strengthen and provide further magnetic field shielding. The cover 13, further, has flanges providing mounting tabs 13a which are displaced from the main, planar surface of the cover 13 and further are received on corresponding mounting posts formed integrally with the base 20, in or contiguous with the various sidewall segments 20-5 through 20-7, and whereby the heads of screws received therethrough for securing the cover to the base 20 are displaced from the exterior surface of the cover 13 and thus do not project outwardly of that surface in the assembled relationship of the components of the drive unit 1.

A lens carriage 30 is shown in FIGS. 3 and 4 holding an objective lens L (FIG. 3) and is able to move longitudinally in the base 20 and in a radial direction relatively to an optical disc of a disc cartridge (not shown) received in the cartridge holder 71. The lens carriage 30 is integrally formed of a material, such as thermo-soluble resin or the like, and includes molded coil portions 32a and 32b at each of the opposite, transverse ends of the lens carriage 30 and in each of which a coil is buried. More particularly, the upper yokes 33a and 33b are seen in FIG. 3 as being received in and extending through corresponding openings in the molded coil portions 32a and 32b of the lens carriage 30 and, it will be understood, that the lens carriage 30 is thereby able to be driven in reciprocating, longitudinal movement along the lengths of the upper yokes 33a and 33b and thereby in the above-referenced radial direction of an optical disc. Moreover, a pair of magnetic circuits for moving the lens carriage 30 consist respectively of the upper yokes 33a and 33b, the mating lower yokes 33a' and 33b' and magnets disposed inside the lower yokes 33a' and 33b'. After inserting the upper yokes 33a and 33b through the openings of the molded coil portions 32a and 32b, the opposite ends of the upper yokes 33a and 33b are fixed by screws to the corresponding opposite ends of the lower yokes 33a' and 33b'.

A turn-table motor unit 222, in FIGS. 3 and 4, consists of a turn-table 22, a motor built in the inside (i.e., within the interior) of the turn-table 22, a flexible printed circuit sheet 89 and a actuator (metal) plate 21 on which the foregoing elements are mounted. The turn-table 22 has a diameter of 21 mm and is projected toward the cartridge holder 71 through the opening 20a of the drive base 20 when the disc cartridge is loaded. The turn-table 22, further, is formed of a magnetic material so as to attract a metal hub of the optical disc when the disc cartridge is loaded.

The actuator (metal) plate 21 consists of a zinc-plated steel plate or the like having an electric non-conductance and slide pins 23a and 23b. More details will be explained later with reference to FIGS. 22 and 23.

In FIG. 4, a recess 55 of the drive base 20, defined by the (depending) wall segments 20-5, 20-7 and 20-10 (or portions thereof) and a further support plate 20" of the base 20 is provided for receiving and mounting therein an eject motor unit 50 (manufactured by Omron, model R2DG-84 having a maximum height of about 7 mm) for ejecting an optical disc cartridge; screws (not illustrated) are received through holes 50a of the eject motor unit 50 and are threaded into the aligned, threaded holes 55a of the drive base 20. The drive base 20 necessarily must afford sufficient height in the recess 55 for the eject motor unit 50. To afford that requisite height while minimizing the overall height of the drive unit of the invention, the recess 55 is formed at the rear end of the base 20 and on the bottom surface thereof, effectively rearwardly of the interior, partition wall segment 20-2 (FIG. 3) and the integral and aligned interior, partition wall segment 20-9 (FIG. 4), and thus rearwardly of the recess 20h within which the cartridge holder 71 is mounted. This positioning of the eject motor unit 50, longitudinally and rearwardly of the portion of the drive base 20 which accommodates the cartridge holder 71, eliminates any restriction regarding the height of the disc cartridge. Therefore, it becomes possible to form the recess 55 having a sufficient depth for the eject motor unit 50 having a 10.7 mm height, within the drive base 20 having a maximum of 15.8 mm height.

The load plate 24 is received in sliding, reciprocating forward and backward (longitudinal) movement on, and relatively to, the lower main surface of support plate 20' of the base 20 and the actuator plate 21 of the turn-table motor unit 222 is mounted therebeneath, with the guide pins or rollers 23a and 23b thereof received in the angled slots, or guides, 85a and 85b, respectively, of the load plate 24. In a normal or rest position with no disc cartridge in the unit, the actuator plate 21 is at the lower end of its vertical travel and the load plate 24 is at the rear end of its horizontal travel, with the slide roller pins 23a and 23b in a rest position, displaced in a forward direction from the slots 85a and 85b. When a disc cartridge is inserted and as described in greater detail hereafter, the load plate 24 moves to a forward position and the slide roller pins 23a and 23b travel upwardly through the corresponding guide slots 85a and 85b to cause the turn-table 22 to project through the opening 20a and engage the hub of the disc. When the optical disc cartridge is to be ejected, the eject motor 50 then causes the load plate 24 to be drawn toward the rear of the unit, whereby the slide pins (rollers) 23a and 23b of the actuator (metal) plate 21 slide on the guides (inclined slots) 84a and 84b of the load plate 24 and the turn-table 22 is retracted from within (i.e., drops relative to) the cartridge holder 71, through the opening 20a of the drive base 20 and such that it is disposed below the bottom surface of the recess 20h. Thereby, the engagement between the optical disc and the turn-table 22 is canceled and the cartridge can be removed. More details will be explained later by reference to FIGS. 23–25.

Figure 5A:
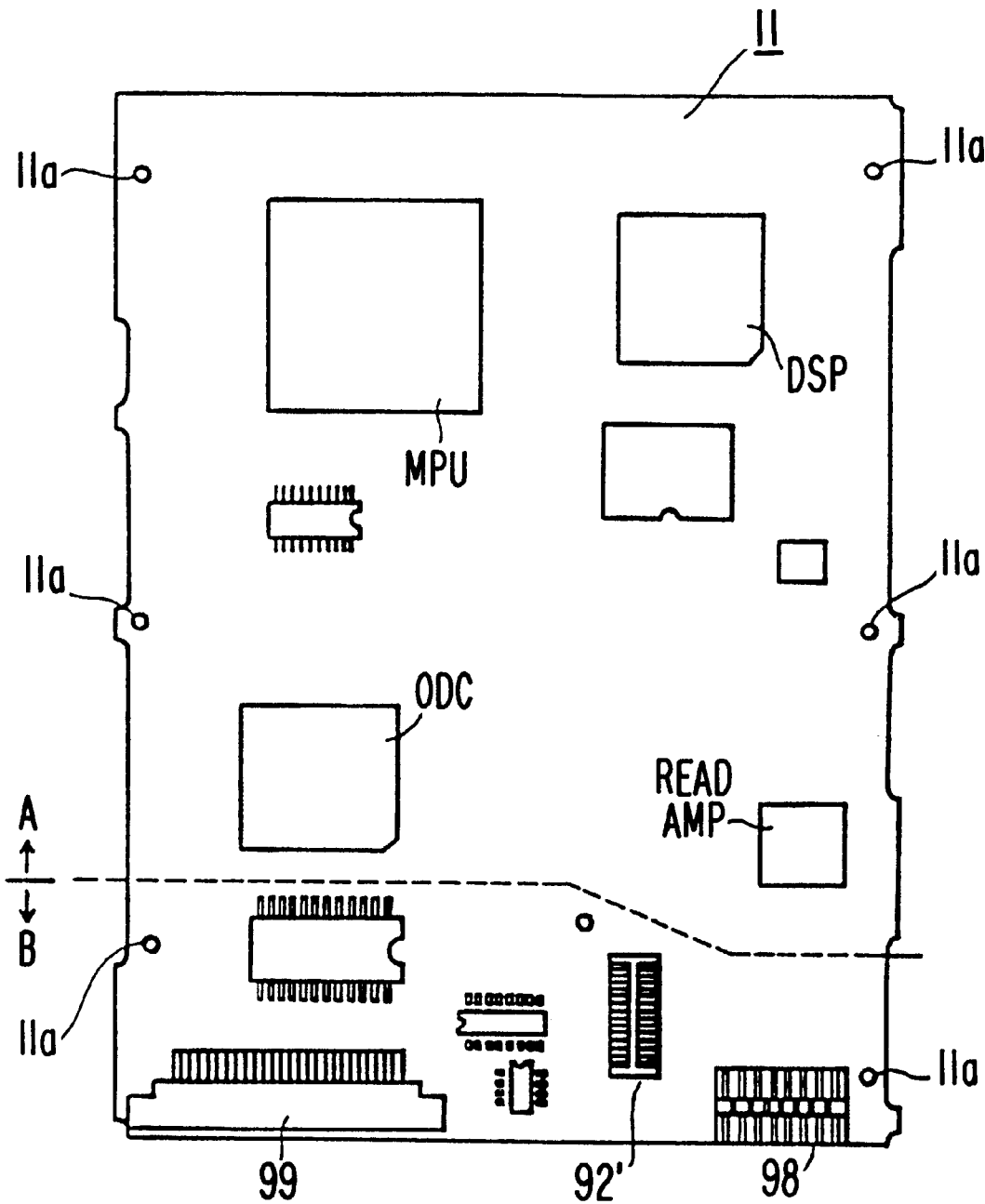
FIG. 5(a) is a top plane view of a printed circuit board.
Figure 5B:
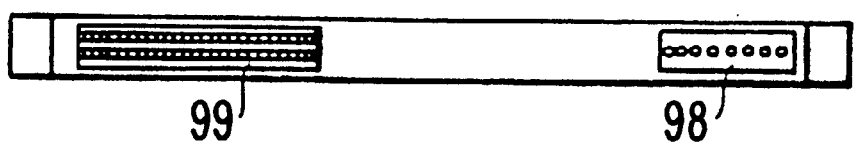
FIG. 5(b) is a side plane view of the printed circuit board shown in FIG. 5(a).

FIG. 5(a) is a top plane view of a printed circuit board and FIG. 5(b) is a side plane view of the printed circuit board shown in FIG. 5(a). The printed circuit board 11 has mounted thereon, on a single (lower) surface thereof facing the drive base 20 and the cartridge holder 71, an interface and power connector 99 and a device logic address setting switch 98 at the rear edge thereof, and also circuit parts such as DSP (Digital Signal Processor), MPU (Micro Processor Unit), etc. for controlling the reproducing/recording/erasing operation of the optical disc drive.

Moreover, the printed circuit board 11 has parts which are of shorter vertical dimensions (e.g., IC parts such as DSP, MPU, etc.) mounted on the area A, facing the upper surface of cartridge holder 71, and parts of larger vertical dimensions (e.g, a capacitor, the connector 99, the switch 98, etc.) mounted on the area B. facing the recess 20i of the drive base 20. The dotted line in FIG. 5(a), separating the areas A and B of the PCB 11, will be understood, moreover, to correlate to the angled partition wall segment 20-2 (FIG. 3). Further, a dust-proof film (not illustrated) is provided between the printed circuit board 11 and the cartridge holder 71. The printed circuit board 11 then is screwed to the drive base 20 via the holes 11a with the cartridge holder 71 stacked between the printed circuit board 11 and the drive base 20.

Accordingly and in accordance with the invention, the height of the drive base 20 is reduced and, correspondingly, the total height of the disc drive unit 1 is reduced by carefully considering the layout of the circuit parts on the printed circuit board 11, taking into account the shapes of the drive base 20 and of the cartridge holder 71.

In this embodiment, the height of the disc drive unit 1 is further reduced by using screws having a head thickness of 0.3 mm or less. Moreover, it is possible to use a screw having a head thickness of 0.5 mm and a washer having a recessed portion which is fitted into the hole 11a of the printed circuit board 11 and accommodates the head of the corresponding screw.

Further, it is possible to use screws having a head thinner than the printed circuit board 11 and frames which are soldered to the inside surface of the printed circuit board 11 at one end and which expand in parallel to the printed circuit board 11 and have a hole for the screw at the other end. Thereby, the outside surface of the printed circuit board 11 is flattened by sinking the screw head within the thickness of the printed circuit board 11.

After the above-mentioned parts, i.e., the printed circuit board 11, the cartridge holder 71, the lens carriage 30, the load plate 24 and the turn-table motor unit 222, are mounted on the drive base 20, a frame 12 is fitted thereover so as to cover the circumference of the drive base 20 and then the cover 13 of a molded ferro-magnetic material, such as stainless steel or the like, is screwed to the drive base 20 on the opposite side of the printed circuit board 11, thereby completing the assemblage of the optical disc drive unit 1 of FIGS. 1–5.

Figure 6:
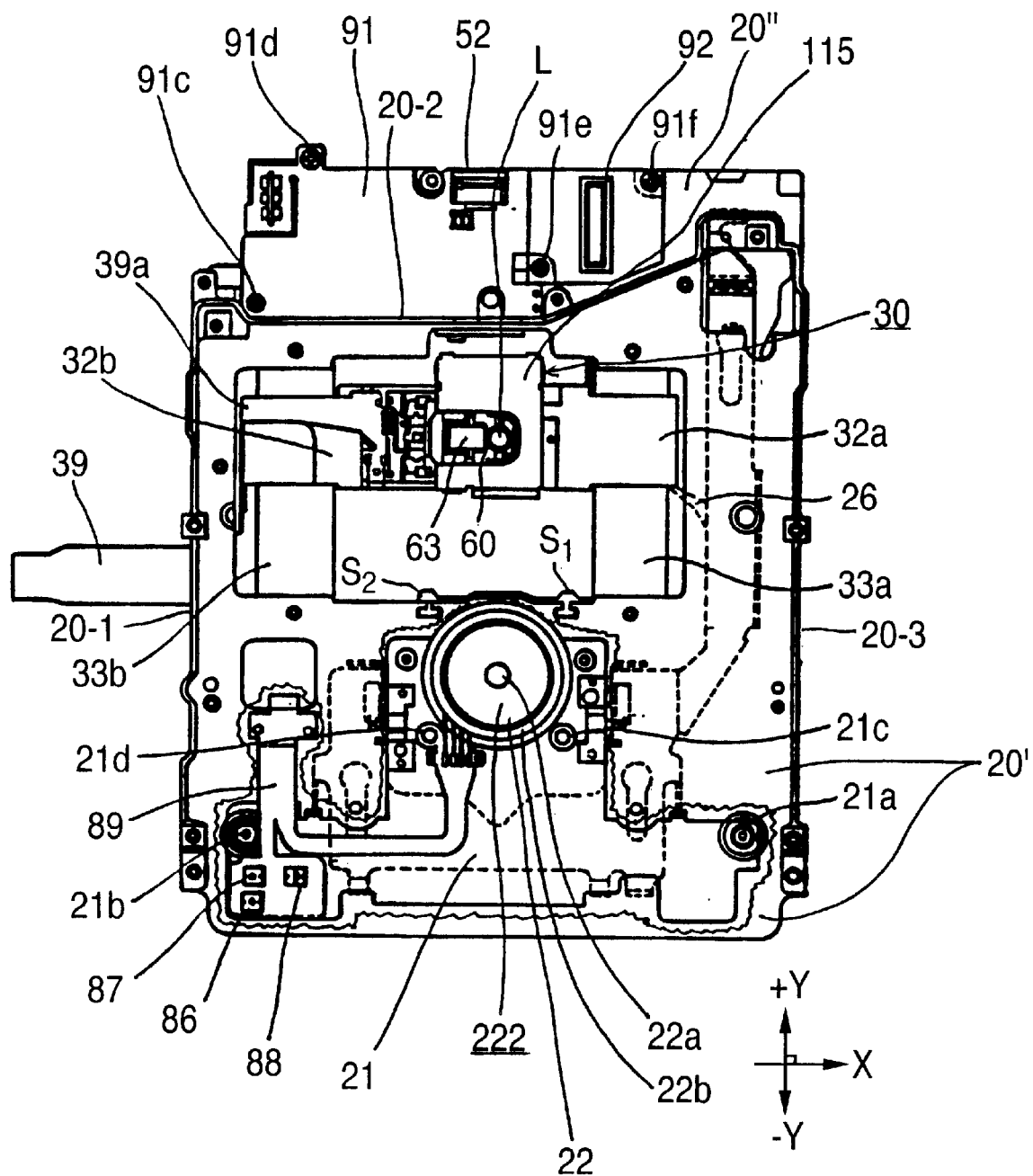
FIG. 6 is a top plane view of the interior of the optical disc drive with a portion of the drive base broken-away.
Figure 7:
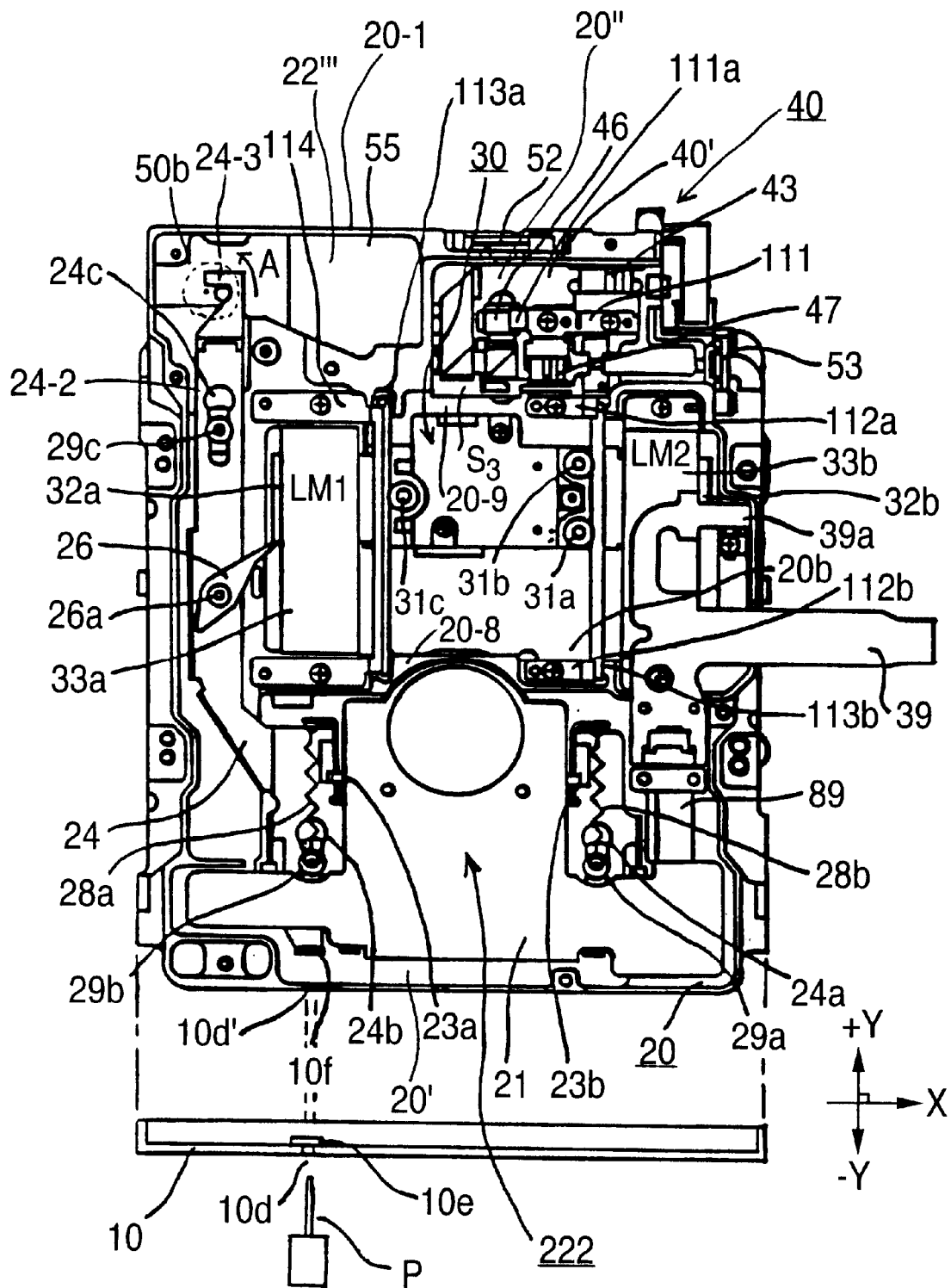
FIG. 7 is a bottom plane view of the interior of the optical disk drive shown in FIG. 6.

FIG. 6 is a top plane view of the upper interior of the optical disc drive unit 1 and thus with the PCB 11 and cartridge holder 71 removed and further with a portion of plate 20' of the base 20 effectively broken-away, so as to illustrate in full the elements of the turn-table motor unit 222 and its associated actuator plate 21. FIG. 7 is a bottom plane view of the interior of the optical disk drive unit 1 shown in FIG. 6 and thus with the cover 13 removed.

A flexible printed circuit sheet (FPC) 91 has mounted thereon a plug-in connector 92 in turn connected to the plug-in connector 92' (shown in FIG. 5) of the printed circuit board 11, a photo-detector 52 and circuit parts, such as head control integrated circuit (IC), etc., in the recess 20i of the drive base 20, and is fixed by a plurality of screws 91c–91f to the drive base 20. More details will be explained later by reference to FIGS. 30(a)–30(c).

The lens carriage 30, in FIG. 6, has mounted thereon an objective lens L and a lens actuator 60 which houses a magnetic circuit to drive the objective lens L. A flexible printed circuit sheet 39a, for conducting control signals to drive the lens actuator 60 selectively in the focus direction and in the track direction, is bonded with a bonding agent along the molded coil portion 32a of the lens carriage 30. Moreover, a carriage cover 115, consisting of a ferromagnetic material such as stainless steel or the like, is mounted around the objective lens L of the lens actuator 60.

The lens carriage 30 is driven in the radial direction of, and relatively to, the optical disc by a voice coil motor (VCM) provided at the opposite transverse sides of the lens carriage 30. This voice coil motor (VCM) comprises the molded coil portions 32a and 32b of the lens carriage 30 and the magnetic circuits 33a and 33b, each comprising a yoke and a magnet.

In addition and as seen in FIG. 7, a pair of bearings 31a and 31a and 31b is provided on one (the right) side of carriage 30 and a single bearing 31c is provided on the other (left) side of carriage 30, displaced longitudinally at an intermediate position of the bearings 31a and 31b, the bearings 31a and 31b engaging a guide rail 113b and the bearing 31c engaging a guide rail 113a and thereby supporting the lens carriage 30 on the (parallel) guide rails 113a and 113b, the latter fixed in position by a spring bias, or pre-pressure, provided by the plate springs 112a, 112b and 114. Namely, the plate springs 112a and 112b work for fixing the guide rail 113b by pressing it to mating portions of the interior, depending walls 20-8 and 20-9 of the drive base 20 in the vicinity of the respective, opposite ends of the guide rail 113b. On the other hand, the plate springs 114 apply pre-pressure to the guide rail 113a at the respective, opposite ends thereof and in such a manner so as to press it toward the guide rail 113b (i.e., in an orthogonal direction relative to the longitudinal direction of the guide rail) and thereby to resiliently urge the guide rails 113b and 113a together and securely suspend the lens carriage 30 therebetween. Moreover, the guide rails 113a and 113b each have a V-shaped convex surface and the bearings 31a to 31c have respective, mating, V-shaped concave roller surfaces thereby to maintain an engaged relationship with the corresponding guide rails 113a, 113b and without any gap or slippage therebetween.

Two carriage stoppers S1 and S2 shown in FIG. 6 are bonded to the drive base 20 at one end of the longitudinal path of reciprocal movement of the lens carriage 30 and a carriage stopper is also bonded at the other end. These carriage stoppers are made of a rubber material and have a buffer function for absorbing shock generated when the lens carriage 30 abuts a rigid portion of the drive base 20 at either end of the path of travel. Moreover, the carriage stopper S3 is provided in close contact with a beam reflector prism 44, the buffer function serving to protect the beam reflector prism 44 and the sealing function serving to prevent migration of dust into the fixed optical unit 40 by filling the clearance generated between a window 41b and the beam reflector prism 44.

A carriage lock 26, in FIGS. 6 and 7, is provided on the load plate 24 and is projected toward the lens carriage 30, to prevent the lens carriage 30 from inadvertently moving toward the turn-table motor unit 222. This is an important feature in view of the guide unit of the invention being adaptable for use in laptop computer with respect to which a normal vertical and stable relationship of parts cannot be maintained. More details of the carriage lock 26 will be explained late with reference to FIGS. 24 and 25.

The turn-table motor unit 222 (shown in FIG. 22) is provided within the recess 20g of the drive base 20. The depth of the recess 20g is about 6.0 mm, almost the same as the thickness of the turn-table motor unit 222, of about 5.8 mm. The turn-table 22, in FIG. 6, is movable in a reciprocating path of movement in a vertical direction, as before discussed, through the opening 20a in plate 20' of the drive base 20 and has a central projection 22a at the center thereof to engage a center hole of a hub of an optical disc and an annular magnetic projection 20b to contact the surface of the hub of the optical disc.

The flexible printed circuit sheet (FPC) 89, in FIG. 6, is bonded on the actuator (metal) plate 21 and has mounted thereon a sensor 86 for detecting a write-enable status of the optical disc cartridge, a sensor 87 for detecting a write-protect status of the optical disc cartridge and a cartridge-in sensor 88 for detecting an existence of an optical disc cartridge in the cartridge holder 71.

In FIG. 7, a flexible printed circuit sheet (FPC) 89 is connected, at one end thereof, to a connector provided on the flexible printed circuit sheet (FPC) 39 for transmitting control signals to control the movement of lens carriage 30 and lens actuator 60. The flexible printed circuit sheet (FPC) 39 is bent at the side of the drive base 20, from which it is shown extending, so as to travel vertically along the side wall 20-1 and to reach and be connected to a connector provided on the printed circuit board 11.

The 3.5-inch magneto-optical disc cartridge is standardized in 128 MB by ISO/IEC 10090 and in 230 MB by ISO/IEC 13963 and is available in the market; therefore, details of the optical disc cartridge are omitted herein.

Figure 23:
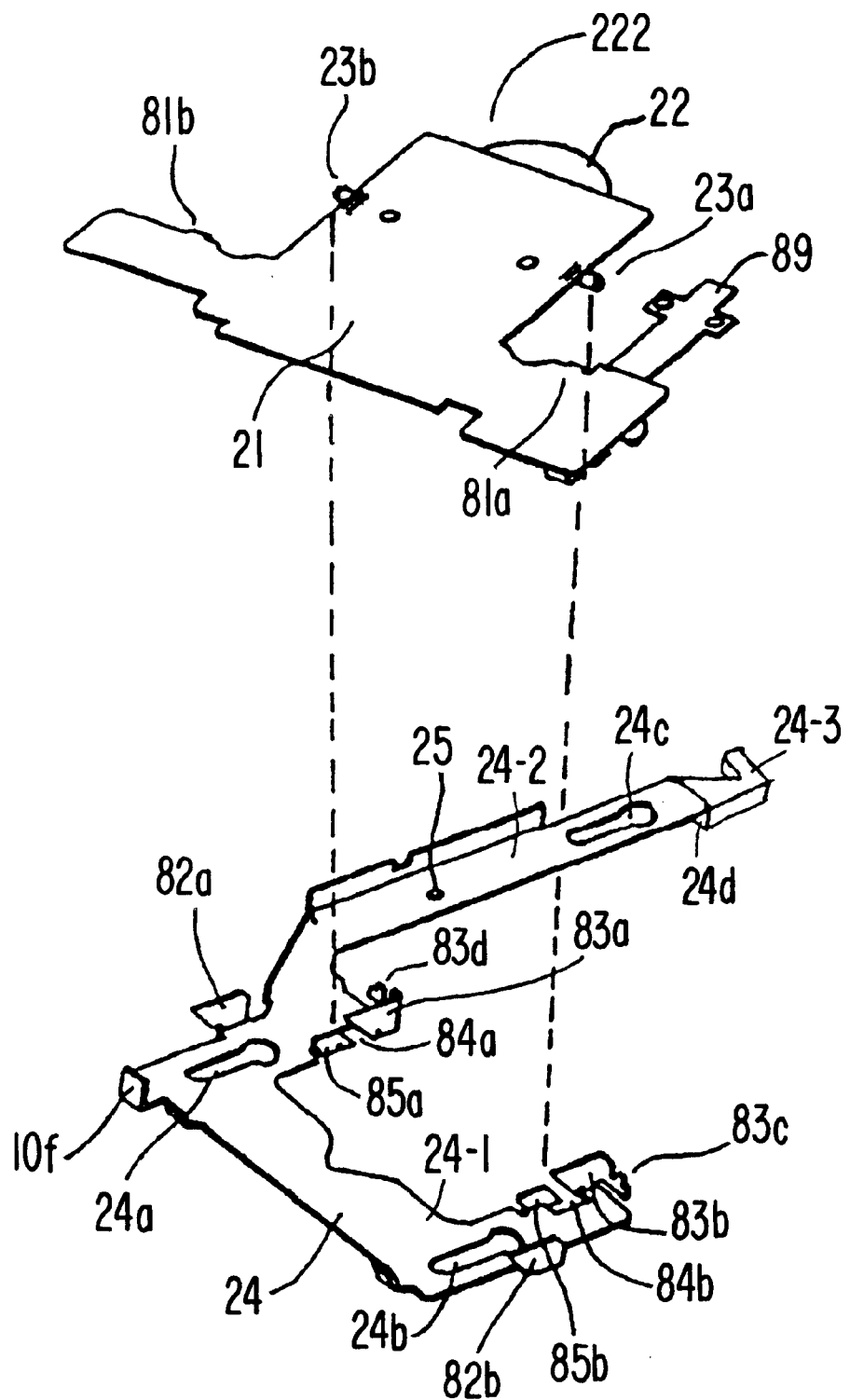
FIG. 23 is a bottom perspective view of the turn-table motion unit and a load plate.

The load plate 24, in FIGS. 7 and 23, is provided between the drive base 20 and the actuator (metal) plate 21 and is guided by pins 29a, 29b and 29c, fixed on the drive base 20, along longitudinal grooves 24a and 24b provided in opposite sides of a main portion 24-1 and a longitudinal groove 24c provided in an extension arm 24-2 of the load plate 24 (+Y direction). When a disc cartridge is loaded, the load plate 24 is moved toward the front side (−Y direction) by the springs 28a and 28b, releasing the lock mechanism and freeing the lens cartridge 30 to be driven in longitudinal movement by linear motors LM-1 and LM-2. When the disc cartridge is unloaded with an instruction issued by depressing the eject button, a disk 50b of the eject motor 50 rotates in a direction A and then a pin 50c of the disk engages a hook-like engaging end 24-3 of the arm extension 24-2 and thereby pulls the load plate 24 toward the rear side (+Y direction) and thereby the load plate 24 moves toward the rear side (+Y direction) of base 20. The lock mechanism then again is activated relative to the lens cartridge 30.

After the disc cartridge is completely unloaded, a projection 24d (shown in FIG. 23) of the load plate 24 engages with an engaged portion 72c' (shown in FIG. 26) of an arm 72c to keep the load plate 24 at the rear side position (+Y direction). When the disc cartridge is loaded again, the arm 72c (shown in FIG. 26) rotates and then the engagement between the projection 72c' (shown in FIG. 23) and engaged portion is released and, thereby, the load plate 24 is moved toward the front side by springs 28a and 28b.

The eject instruction is issued not only by depressing the eject button boa provided on the front bezel 10 but also by inserting a pin or the like into the manual eject hole 10d. In the former case, when the eject button 10a is depressed, the eject motor 50 is driven so as to pull the load plate 24 toward the rear side (+Y direction). In the latter case, when the pin P is inserted into the manual eject hole 10d, the pin P pushes an engagement portion 10f of the load plate 24 (FIG. 7) and thereby the load plate 24 moves toward the rear side (+Y direction).

The manual eject hole 10d is an aperture provided in the front bezel 10 allowing insertion of the pin P, as explained above. Moreover, an aperture 10d' is also provided in the drive base 20, aligned with the manual eject hole 10d. Therefore, the pin P is inserted through the manual eject hole 10d and the hole 10d' to be pressed against the erected wall engagement portion 10f of the load plate 24.

However, the manual eject hole 10d and aperture 10d' work as free air flow paths, allowing inflow of dust into the drive base 20 from outside due to an air-pressure difference generated when the disc operates. Therefore, in this embodiment, a sealing cover 10e is provided over the manual eject hole 10d and aperture 10d'. Of course, the effect for preventing inflow of dust can be improved by providing respective sealing covers over both the manual eject hole 10d and the aperture 10d'. However, even if the sealing cover can be provided for only one of such holes, depending on the shape of the drive base 20 and specifications of the front bezel 10, a sufficient sealing effect nevertheless can be assured, particularly, in comparison with the case where no sealing cover is provided.

Figure 8A:
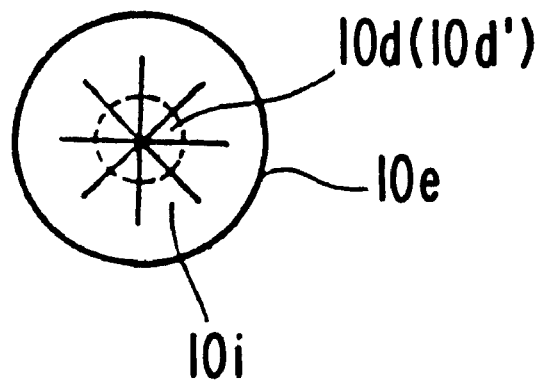
FIG. 8(a) is a top plane view of a sealing cover.
Figure 8B:
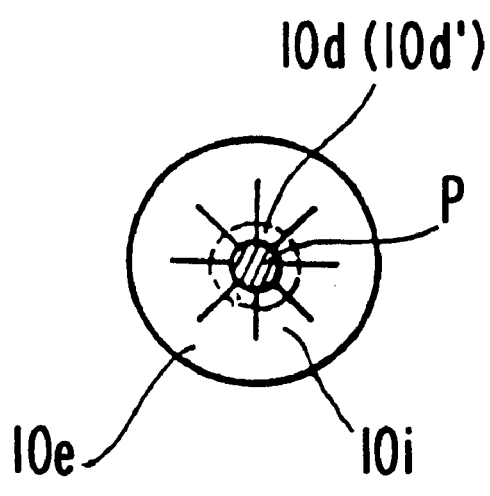
FIG. 8(b) is a top plane view of the sealing cover with a pin slightly inserted.
Figure 8C:
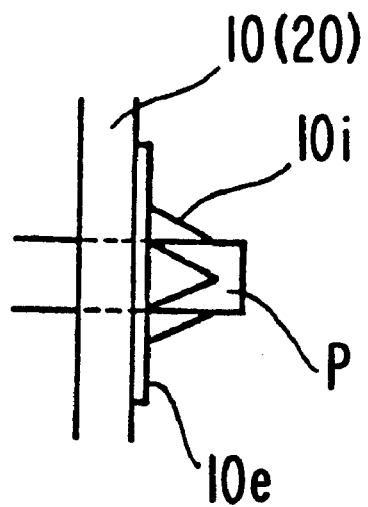
FIG. 8(c) is a side plane view of the sealing cover with the pin deeply inserted.

FIG. 8(a) is a top plane view of a sealing cover 10e, FIG. 8(b) is a top plane view of the sealing cover with a pin P slightly inserted and FIG. 8(c) is a side plane view of the sealing cover 10e with the pin P deeply inserted. In FIG. 8(a), the sealing cover 10e is made of a circular thin resin sheet, wherein the external circumference is composed of a seal member 10h coated with a bonding agent for the purpose of bonding, while the center area is equally cut into eight leaves.

In FIG. 8(b) and 8(c), the pin P is inserted into the manual eject hole 10d or the aperture 10d' of the drive base 20. The equally cut eight (8) leaves 10i (i=1, 2, . . . ) of resin sheet are pushed inwardly, forming an entrance aperture at a central area thereof, as the pin P is inserted into the inside of the front bezel 10 or of the drive base 20.

The seal member 10e may be constituted, in addition to the resin, by a material having a property of rubber or a sponge or a material such as aluminum foil or the like. Moreover, a double-sided bonding tape may also be used for the bonding. In addition, the seal member 10e may be circular or polygonal, so long as it can seal the hole. Moreover, the central area may be cut in any desired way, so long as it provides a shape allowing insertion of the pin P and whereby it may be returned easily to the original shape after the pin P is removed.

Figure 9A:
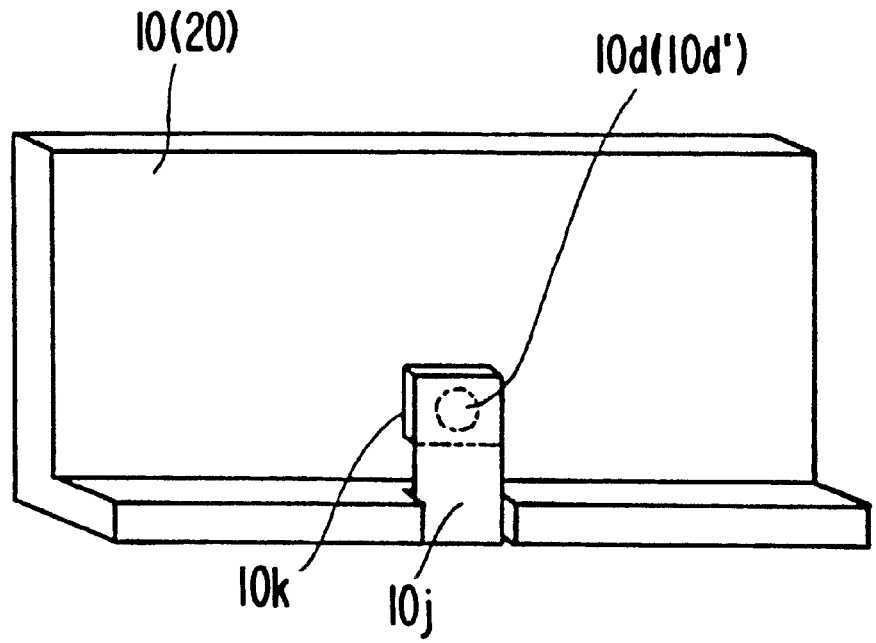
FIG. 9(a) is a perspective view of an alternative sealing cover.
Figure 9B:
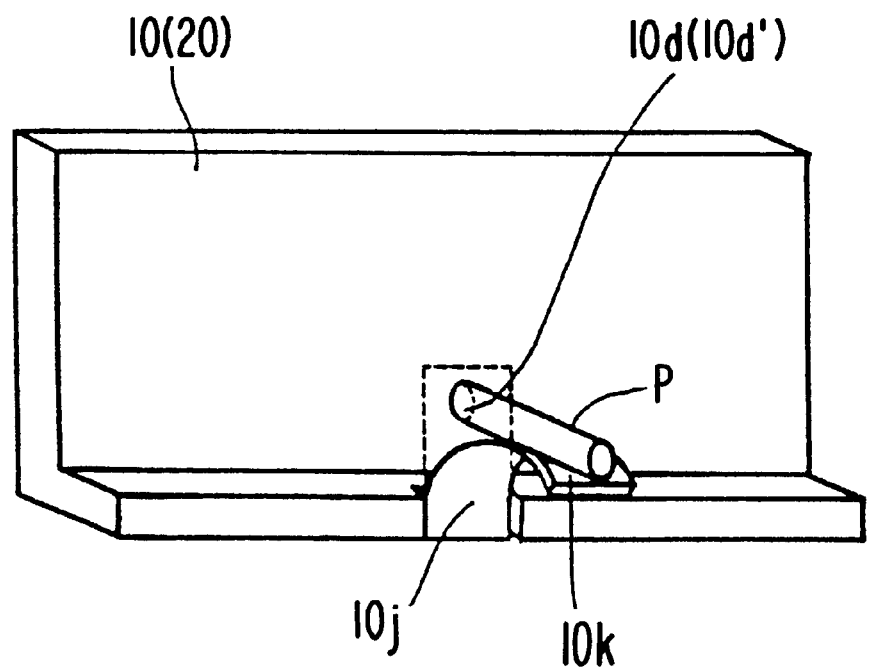
FIG. 9(b) is a perspective view of the alternative sealing cover with a pin inserted

FIG. 9(a) is a perspective view of an alternative sealing cover 10d and FIG. 9(b) is a perspective view of the alternative sealing cover with a pin P inserted. In FIG. 9(a), the sealing cover comprises a cover portion 10k, consisting of rubber, to close the hole (i.e., manual eject hole 10d or aperture 10d') and a plate spring 10j for fixing the cover portion 10k by a bonding method and pressing it toward the hole. The plate spring 10j can be fixed, using a bonding agent, to the inside of the front bezel 10 or to the drive base 20. Otherwise, it can be fixed by affixing a pawl thereto and then engaging such pawl with the hole provided at the inside of the front bezel 10 or drive base 20. As shown in FIG. 9(a), when the pin P is not inserted, the hole of the cover 10k is closed and the sealing property is improved by the a spring function of the plate spring 10j, but when the pin P is inserted, the plate spring 10j is pressed by the pressing force of the pin P to open the hole, allowing further entry of the pin P.

The cover 10k may also be formed of a resin or a material having a sponge property, in addition to rubber, in order to improve contactness with the hole, and the plate spring 10j may also be constituted in a simplified structure, or in order to realize light weight, by using a thinner vinyl material, such as miler film or the like, or a plastic material, in addition to a metallic spring material.

Figure 10A:
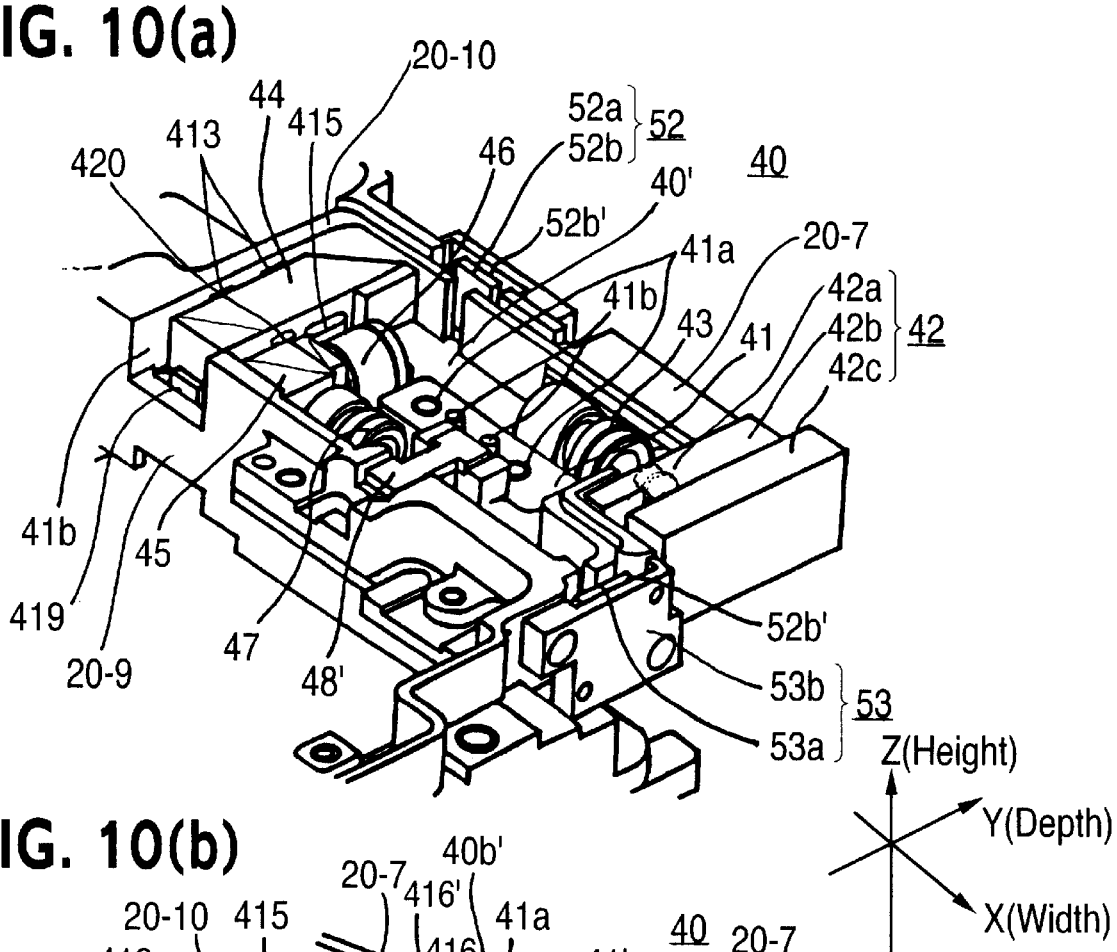
FIG. 10(a) is a partially enlarged perspective view of the drive base mounting a fixed optical unit.
Figure 10B:
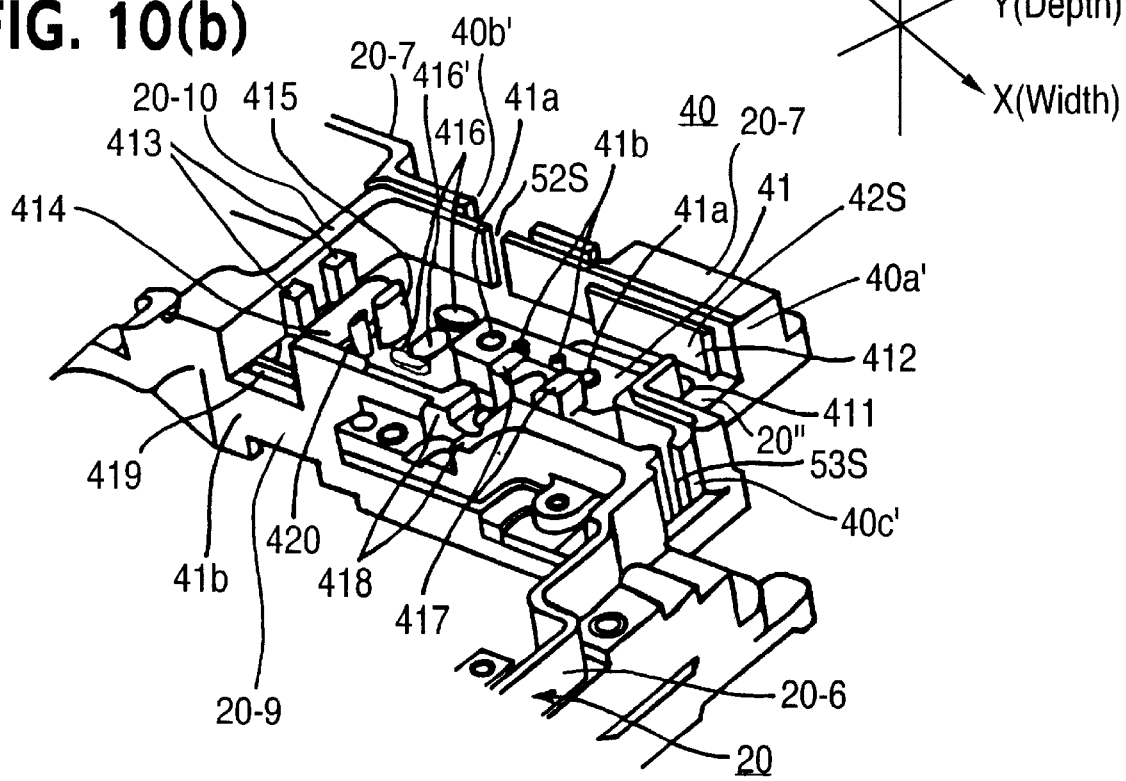
FIG. 10(b) is a partially enlarged perspective view of the drive base before mounting the fixed optical unit.

FIG. 10(a) is an enlarged and perspective partial view of the recess 40' portion of the drive base 20 having a fixed optical unit 40 mounted therein. FIG. 10(b) is an enlarged and perspective, partial view of the drive base 20 before mounting the fixed optical unit 40 in the recess portion 40'. The recess 40' has a depth of about 6.4 mm as defined by the associated surface of support plate 20" of the drive base 20 and further is defined by the peripheral wall segment 20-7 and the interior partition wall segments 20-9 and 20-10 (or portions thereof), and is thus adjacent to but rearwardly of the recess 20h (shown in FIG. 3) for mounting the cartridge holder 71; further, recess 40' and recess 20h are of the same height within base 20 and thus the corresponding surfaces of the support plates 20' and 20" are in a common plane.

In FIGS. 10(a) and 10(b), a mounting block 41 is provided within the recess 40' of the drive base 20 and a plurality of threaded holes 41a and a plurality of positioning projections 41b are provided thereon. Moreover, the plate spring 111 shown in FIG. 7 is affixed to block 41 and has arms 111a, 111b and 111c which respectively extend to the M lens 46, the S lens 47, and the collimator lens 43; M lens 46 and S lens 47 thereby are abutted against projections or wall surfaces and fixed in place by the elastic, resilient biasing force of the spring arms.

Further, in FIG. 10(b), the recess 40' has integrally formed therein positioning blocks 411–420 variously on the bottom and sidewall surfaces thereof, and these positioning blocks 411–420 are formed with precision surface elevations and positions relatively to each other and to the base 20.

The collimator lens 43, with a cylindrical shape as seen in FIGS. 10A and 10(b), is placed in contact with the block 411 on the bottom surface of the recess 40' thereby determining its position in the height direction Z, is placed in contact with the block 412 on the surface of the end wall 20-7 thereby determining its position in the depth direction Y and then is pressed by the plate spring 11 shown in FIG. 7 against the blocks 411 and 412 and thereby fixed precisely in place.

The M lens 46, with a cylindrical shape as seen in FIGS. 10(a) and 10(b), is placed in contact with the block 415 which projects from the bottom surface of the recess 40' thereby determining its position in the direction X, is placed in contact with the block 416' on the bottom surface of base 20 thereby determining its position in the height direction Z, and is sandwiched between two blocks 416 which are formed to extend vertically a little higher than the block 416' thereby determining its position in the depth direction Y and then is pressed against the blocks 415 and 416' by the plate spring 111 shown in FIG. 7 and thereby fixed in place.

The L lens 47 with a cylindrical shape, in FIGS. 10(a) and 10(b), is similarly placed in contact with a block (not illustrated) on the bottom surface of the recess 80' thereby determining its position in the height direction Z, is placed in contact with a block (not illustrated) on the sidewall surface of the recess 40' thereby determining its position in the depth direction Y, and is bonded to the blocks and thereby fixed in place.

The beam reflector prism 44 in FIGS. 10(a) and 10(b) is placed in contact with the blocks 413 on the side wall surface of the recess determining its position in the width direction X, is placed in contact with the block 414 on the bottom surface of the recess 40' determining its position in the height direction Z and is placed in contact with the block 419 determining its position in the depth direction Y and, further, is bonded to the blocks 413 and 414. Moreover, an opening 41b is formed on the sidewall of the recess 40' and the light beam reflected from the beam reflector 44 passes through the opening 41b.

The beam splitter and Wollaston prism (BW prism) 45, in FIGS. 10(a) and 10(b), is placed in contact with the block 420 determining its position in the width direction X, is placed in contact with a block 420 (not illustrated) on the bottom surface of the recess 40' determining its position in the height direction Z, is placed in contact with a block (not illustrated) on the side wall surface of the recess 40' determining its position in the depth direction Y, and is bonded to the blocks 419 and 420.

The complex lens Y of the servo unit 48, described later, is fitted between two blocks 417 and 418 determining its position in the directions X, Y and Z.

The laser diode unit 42 in FIGS. 10(a) and 10(b) is mounted on the side wall 40a', having a slit (ie., an opening) 42S, of the drive base 20 by screws; it consists of a laser diode 42a, a frame 42b holding the laser diode at the slit 42S, a drive circuit (not illustrated) for the laser diode and a cover 42c for protecting the drive circuit.

The photo detector unit 52 for detecting a data signal is mounted on the side wall 40b', having a slit 52S, of the drive base 20 by screws; it consists of a photo detector 52a and a frame 52b having a recess 52b' for mounting the photo detector 52a.

The photo detector unit 53 for detecting a servo signal is mounted on the side wall 40c', having a slit 53S, of the base drive 20 by screws; it consists of a photo detector 53a and a frame 53b having a recess 53b' for mounting the photo detector 53a.

Accordingly, each optical part is positioned in recess 40' of the drive base 20, in contact with the respective blocks 411–420 which are formed with high precision surface accuracy—and the remainder of the drive base 20 (i.e., except the blocks 411–420 for positioning) may be formed with regular accuracy.

Therefore, the recess 40' can be integrally formed on the drive base 20 for assembling a fixed optical unit 40 therein, enabling elimination of parts such as an independent housing within which components are precision aligned to form a fixed optical unit, as is employed in conventional devices—and thereby achieving a substantial reduction in size and weight requirements and specifically while achieving the objective of the reduced total height limitation of the disc drive unit 1—while maintaining all requisite functions of a fixed optical unit 40. In addition, since a conventional, separate head base is no longer necessary in the disc drive of the present invention, the invention also affords a lighter weight construction.

Figure 11:
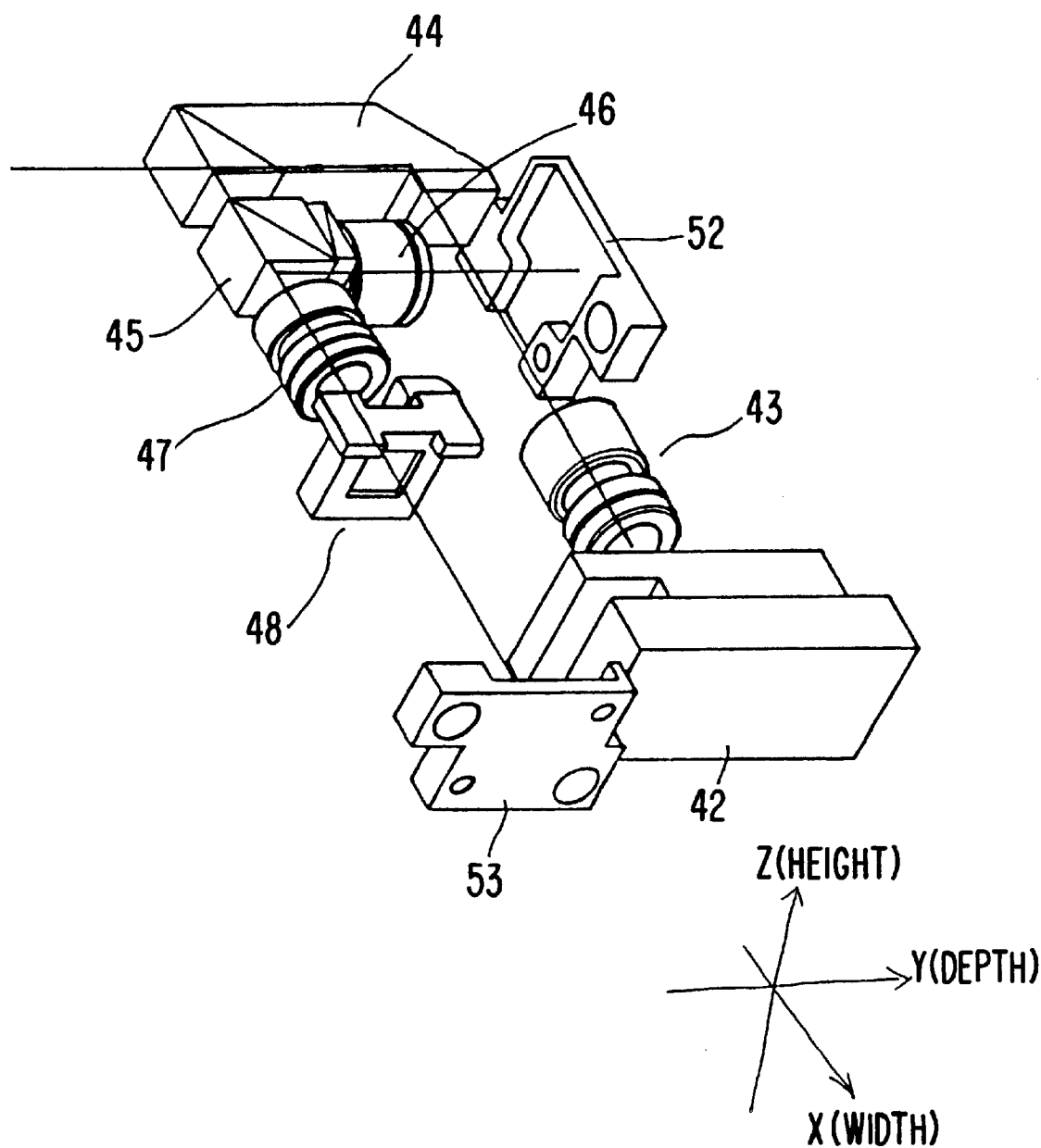
FIG. 11 is a perspective view of the fixed optical unit.
Figure 12:
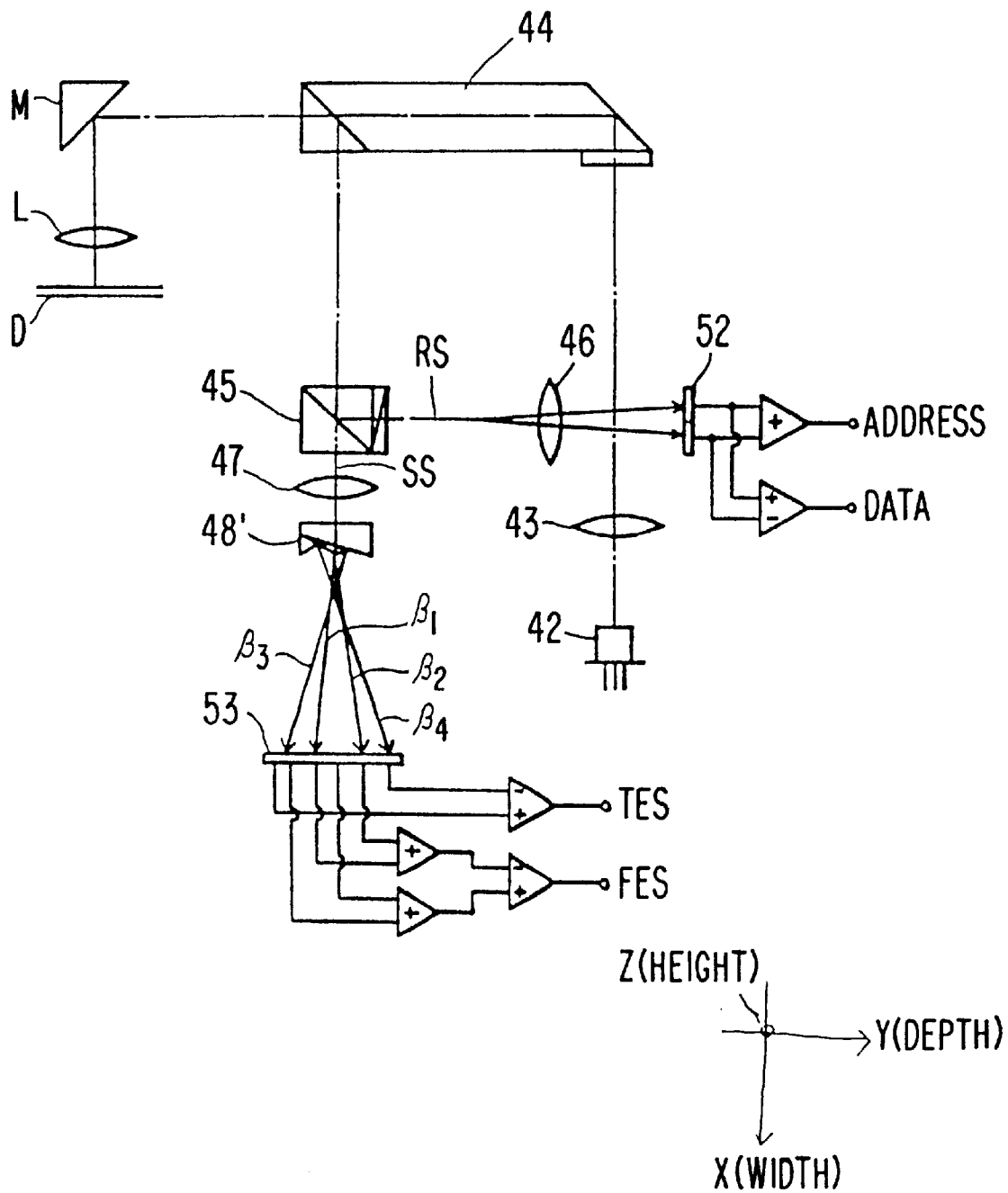
FIG. 12 is an explanatory diagram of optical paths and electronic signals of the fixed optical unit.

FIG. 11 is a perspective view of the fixed optical unit 40. FIG. 12 is an explanatory diagram of optical paths and electronic signals of the fixed optical unit.

The laser diode unit 42 emits a laser light beam having the desired emission power in the direction X and then the beam reflector prism 44 reflects the light beam at a right angle, that is, in the direction Y. Since the direction X of the beam path between the laser diode unit 42 and the beam reflector prism 44 is perpendicular to the direction Y (i.e., Y being the depth direction of the optical disc drive unit), no extra space for this light beam path in the depth direction Y is required and, therefore, a shortest possible total beam path is afforded in the depth direction Y. In FIG. 12, the emitted light beam from the laser diode unit 42 passes through the collimator lens 43 and the beam reflector prism 44 of the fixed optical unit 40 and then passes through the mirror M of the lens carriage 30 and then is guided thereby to the objective lens L of the lens actuator 60. Thereby, the light beam, as focussed by the objective lens L, is then radiated onto the optical disc.

Thereafter, the returning beam, reflected from the optical disc D, passes through the objective lens L, the mirror M and the beam reflector prism 44 and then is guided to the beam splitter and Wollaston prism 45 for being separated into a reproduction signal and a servo signal. The reproduction signal (RS), i.e., an address signal and a data signal, is guided to the photo-detector unit 52 through the M lens 46. Moreover, the servo signal (SS) is guided to the L lens 47 from the beam splitter and Wollaston prism 45, and thereafter separated into a plurality of signal components β1 to β4 by the complex lens 48' and which are then guided to the photo-detector unit 53. The photo-detector unit 53 generates the focus signal FES from the signal components β1 and β2 and the track signal TES from the signal components β3 and β4.

Figure 13A:
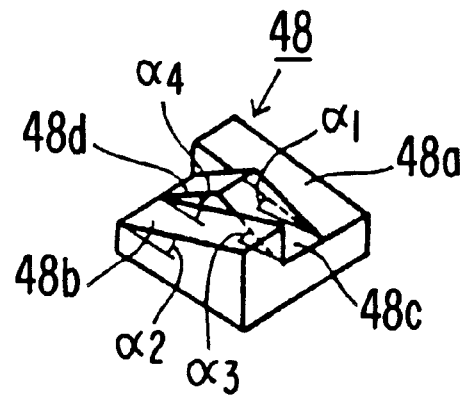
FIG. 13(a) is a perspective view of a complex lens of a servo unit.
Figure 13B:
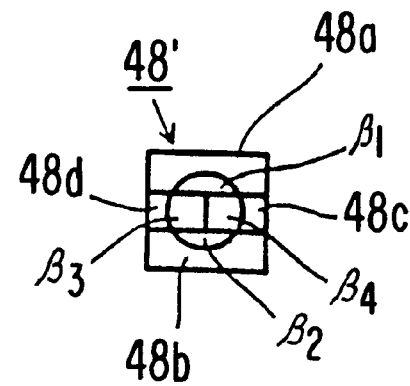
FIG. 13(b) is a top plane view of the complex lens of the servo unit.
Figure 13C:
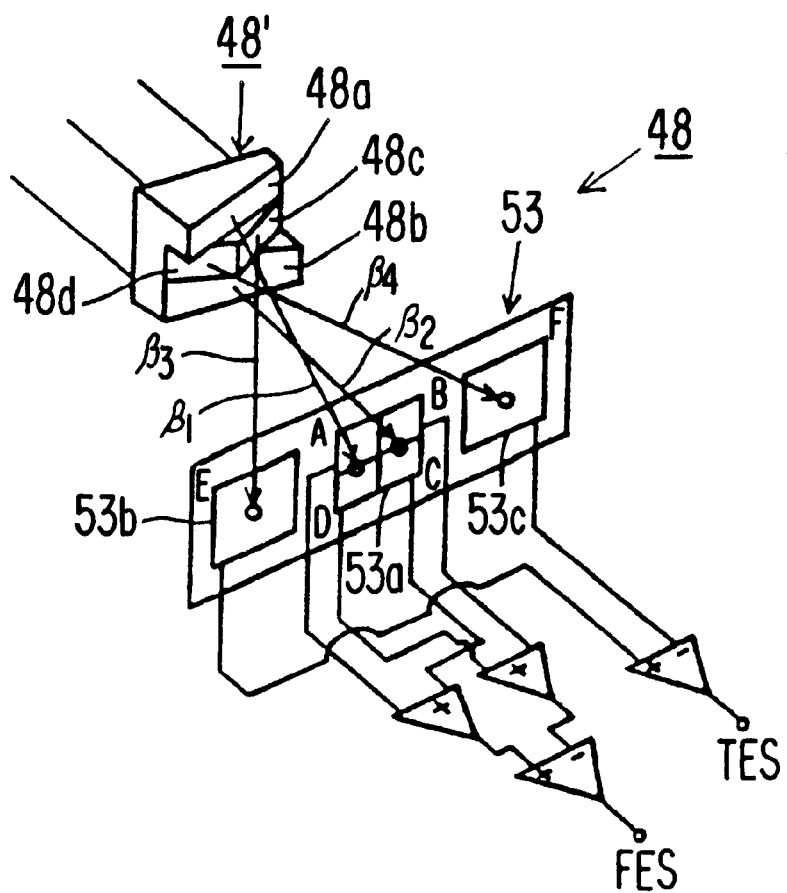
FIG. 13(c) is an explanatory diagram of an optical path and electronic signals of the servo unit.

FIG. 13(a) is a perspective view of a complex lens of the servo unit 48. FIG. 13(b) is a top plane view of the complex lens. FIG. 13(c) is an explanatory diagram of an optical path and electronic signals of the serve unit 48.

The complex lens of servo unit 48 has a structure such that a first light emitting surface 48a, for emitting the first light flux β1 among the flux of the returning beam, is inclined in a first angular orientation in the right side, while a second light emitting surface 48b, for emitting the second light flux β2, is inclined in a second, opposite angular orientation in the left side, in the figure. Moreover, third and fourth light emitting surfaces 48c, 48d, for emitting third and fourth light fluxes β3 and β4, are formed in an inverted V-shaped configuration—i.e., oppositely inclined surfaces proceeding from a common central apex.

The first light emitting surface 48a is inclined in the same orientation as the third light emitting surface 48c, although the inclination angle α1 of the former surface 48a is smaller than the inclination angle α3 of the latter surface 48c.

The second light emitting surface 48b is inclined in the same orientation as the fourth light emitting surface 48d, although the inclination angle a2 of the former surface 48b is smaller than the inclination angle a4 of the latter surface 48d.

In FIG. 13(c), the returning light beam from the optical disc D, guided by the L lens 47 (FIG. 12), is split by the servo unit 48 into four beams β1 to β4, which are separately received by the photo-detector 53. The photo-detector 53 is formed in such a manner that the first receiving element 53a, which is split into four separate regions (A to D), receives the first and second light beams β1 and β2, the second receiving element 53b receives the third light beam β3 and the third receiving means 53c receives the fourth light beam β4, all thereof lying in a common plane; alternatively, they may be separate units.

In more detail and among the light flux of the returning light beam, the first light beam β1, emitted from the first light emitting surface 48a, is received by the regions A, D of the first light receiving means 53a of the photo-detector 53 and the second light beam β2, emitted from the second light emitting surface 48b, is received by the regions B, C of the first light receiving unit 53a. Thereby, the arithmetic operation of (A+C)−(B+D) is carried out, in accordance with the Foucault method, to detect a focus error signal.

The third light beam β3 emitted from the third light emitting surface 48c, among the light flux of the returning light beam, is received by the second receiving unit 53b of the photo-detector and the fourth light beam β4, emitted from the fourth light emitting surface 48d, is received by the third light receiving unit 53c (region F). Thereby, the arithmetic operation of (E−F) is carried out, in accordance with the Push-Pull method, to detect a tracking error signal.

As explained above, since it is not required to split the light path into two paths even when the Foucault method for focus detection and the Push-pull method for tracking error signal detection are used, the number of required parts can be reduced and also a volume of the fixed optical unit can be reduced.

Practical details of the servo unit 48 are well known, since described in the Japanese Patent application No. HEI5-619, also Laid-open No. HEI5-250704, and U.S. patent application Ser. No. 084,362 filed Jun. 30, 1993.

The BR prism 44 and the BW prism 45, explained above, must be of a small size for mounting into the super-miniaturized optical disc drive unit 1 of the invention, having, e.g., a total height of about 17 mm. Here, a Cube type prism is considered as an example. When the size of width W×length L×height H (6×6×6) [mm] is reduced to 5×5×5 [mm], the tolerance must be reduced from ±0.1 mm to ±0.08 mm so that an angular deviation of prism due to the fitting accuracy (remains equal (i.e., tolerance/size=0.1/6, 0.08/5).

Thus, when the prism is reduced in size from a 6 mm type to a 5 mm type as explained above, the tolerance also becomes small, requiring a higher fitting accuracy. On the other hand, a method of producing a small size prism without also reducing the tolerance will next be explained.

Figure 14A:
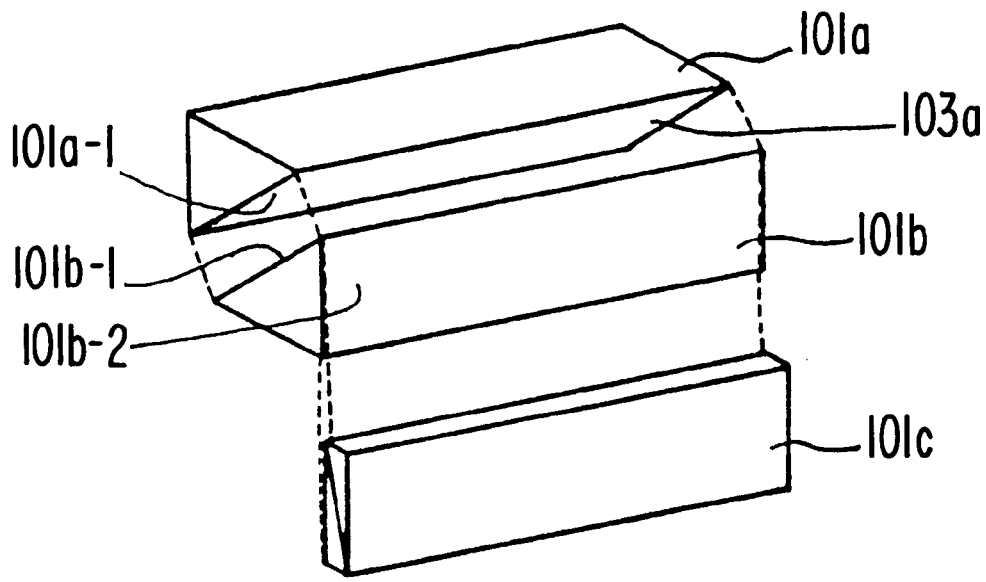
FIGS. 14(a)–14(c) are explanatory diagrams of the process of manufacturing a beam splitter and Wollaston prism.
Figure 14B:
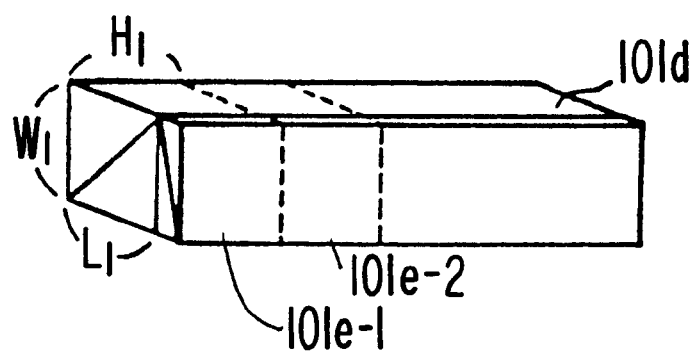
Figure 14C:
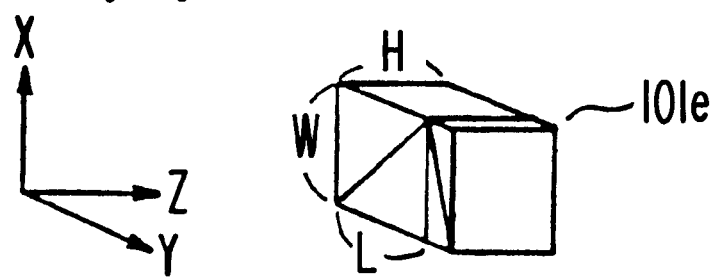

FIGS. 14(a)–14(c) are explanatory diagrams of the process of manufacturing a beam splitter and Wollaston prism (BW prism). Two triangular elongated prisms 101a and 101b are prepared, having respective, opposing surfaces 101a–1 and 101b–1 of matched rectangular shapes. Prism 101a has an evaporated film 103a formed on the rectangular base surface 101a–1 thereof and these two prisms 101a and 101b then are bonded together with the respective, transverse ends thereof aligned and with the evaporated film 103a disposed in opposed relationship to the matched rectangular surface 101b–i of the other prism 101b. In addition, an LN Wollaston prism 101c is bonded to the predetermined inclined (vertically oriented) surface 101b–2 of the prism 101b.

The resulting angular pole type prism 101d, having a size of width W1×length L1 and manufactured as explained above, is cut to a desired (predetermined) length H1, to produce a corresponding number of individual BW prisms 101e–1, 101e–2 . . . .

Figure 15A:
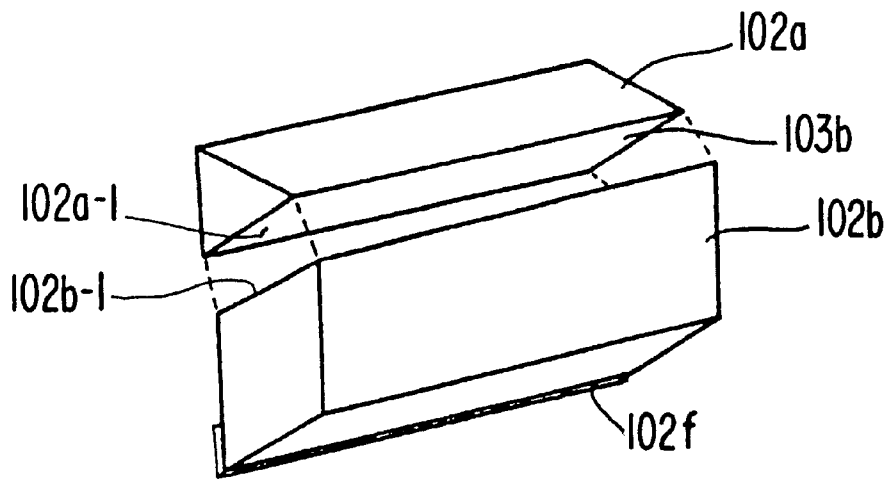
FIGS. 15(a)–15(c) are explanatory diagrams of the process of manufacturing a beam reflector prism.
Figure 15B:
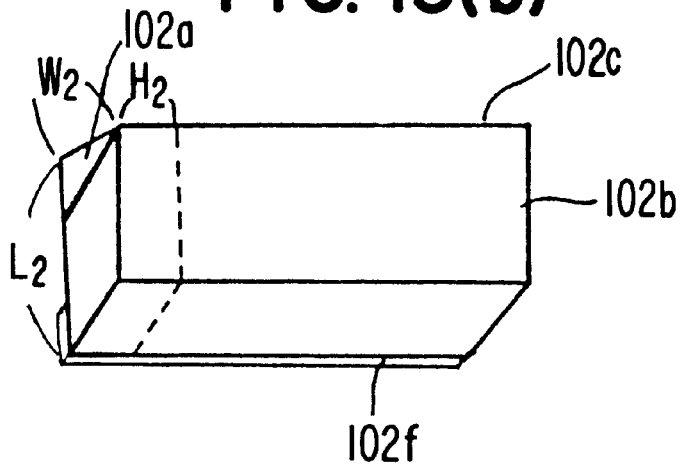
Figure 15C:
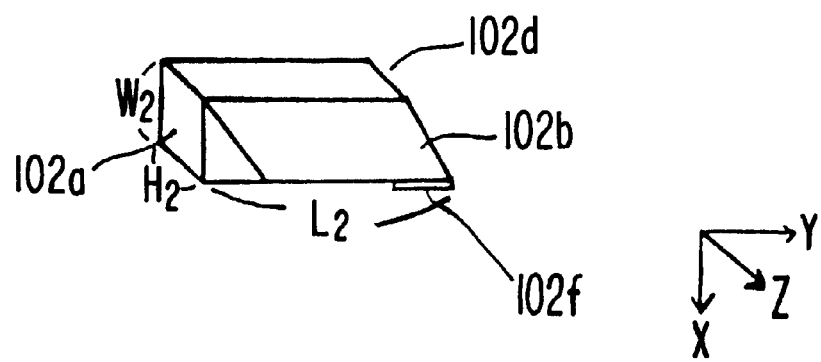

FIGS. 15(a)–15(c) are explanatory diagrams of the process of manufacturing a beam reflector prism (BR prism).

A triangular pole type prim 102a and an angular pole type prism 102b, having matched rectangular shapes of respective, opposing surfaces 102a–1 and 102b–1 thereof are also prepared. Prism 102a has an evaporated film 103b formed on the rectangular base surface 102a–1 thereof and these two prisms 102a and 102b are bonded with the respective ends thereof aligned, the evaporated film 103b being provided on the rectangular surface 102a–1 opposed to the corresponding rectangular surface 102b–1 of the other prism 102b. In addition, the prism 102f is bonded to the lower portion of the rear surface of the angular pole type prism 102b. The prism 102c, having a size of width W2×length L2 and manufactured as explained above, is cut in a predetermined length H2 in the narrow width to produce a corresponding number of individual BW prisms 102d.

The BR prism and BW prism, manufactured as explained above, are arranged as shown in FIGS. 10a and 10b and FIG. 11, so that the cut lengths H1 and H2 are equal to the lengths in the height (thickness) direction (Z direction) of the optical disc drive. That is, a reduction in size in the height direction is realized by locating the surface having the lengths H1 and H2, which easily generate a cutting error, to the position not taking part in the fitting accuracy, namely to the position in the height direction. Thereby, an improvement in the fitting accuracy can be achieved without changing the size of the width direction and depth direction.

Moreover, a diameter of the light beam flux ΦD emitted from the LD unit 42 (FIG. 11) is set in the relation: ΦD>1.0. For example, when the height of prism is 5 mm, the light beam flux ΦD is set as sufficiently small as 0.2 mm, so that the light beam flux does not exceed the surface of the prism in the height direction Z. Accordingly, even when the prism is reduced in size, the minimum accuracy can be maintained.

It is possible, of course, to employ prisms other than those explained above.

Therefore, use of prisms 44 and 45, when manufactured as explained above, assures obtaining a sufficient fitting accuracy even when a surface having poor surface accuracy, such as that of the drive base 20 made of aluminum die-casting as shown in this embodiment, is used for mounting the fixed optical unit 40 and also enables direct mounting thereof to the drive base 20 without using a separately prepared head base (i.e., a support block or housing) which has been typically used.

Figure 16A:
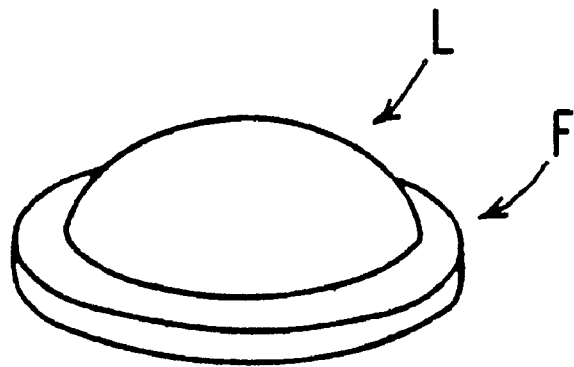
FIG. 16(a) is a perspective view of an objective lens.
Figure 16B:
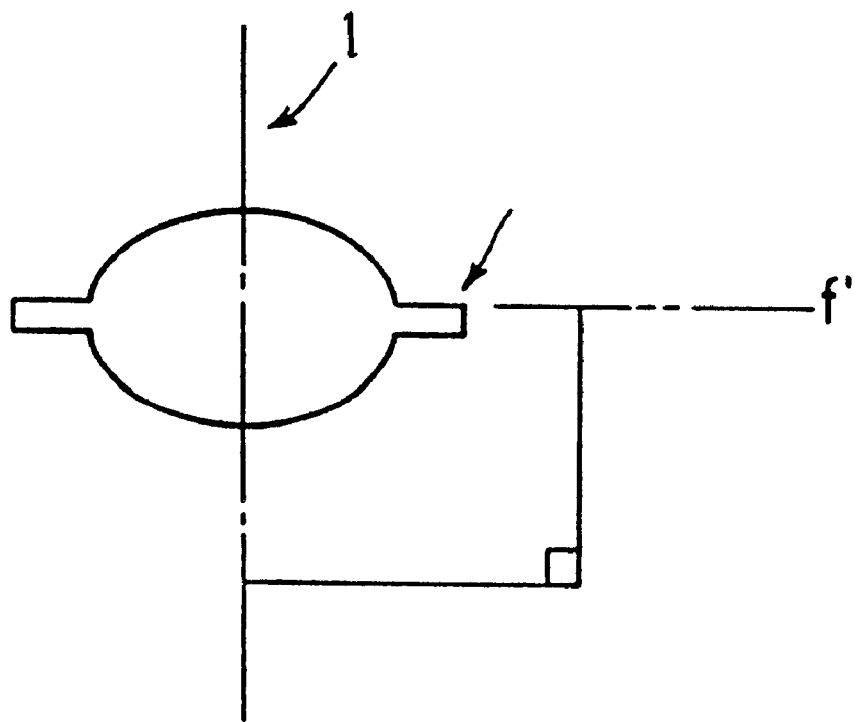
FIG. 16(b) is a cross-sectional view of the objective lens.

FIG. 16(a) is a perspective view of an objective lens. FIG. 16(b) is a cross-sectional view of the objective lens.

The objective lens L has a central double-convex portion with an integral, annular flat portion F extending radially therefrom at the external circumference thereof such as in a shape of a brim of a hat. While one end face f' of the flat portion F is adjusted so as to be transverse to the optical axis (FIG. 16(b)), the flat surface F is butted and then bonded for the purpose of fixing to the end surface of the lens holder (FIG. 18) of the lens actuator 60.

Therefore, even when the objective lens L is small in size, it can be mounted to the lens mounting unit 62a with high accuracy and by a simplified adjusting method.

Figure 17A:
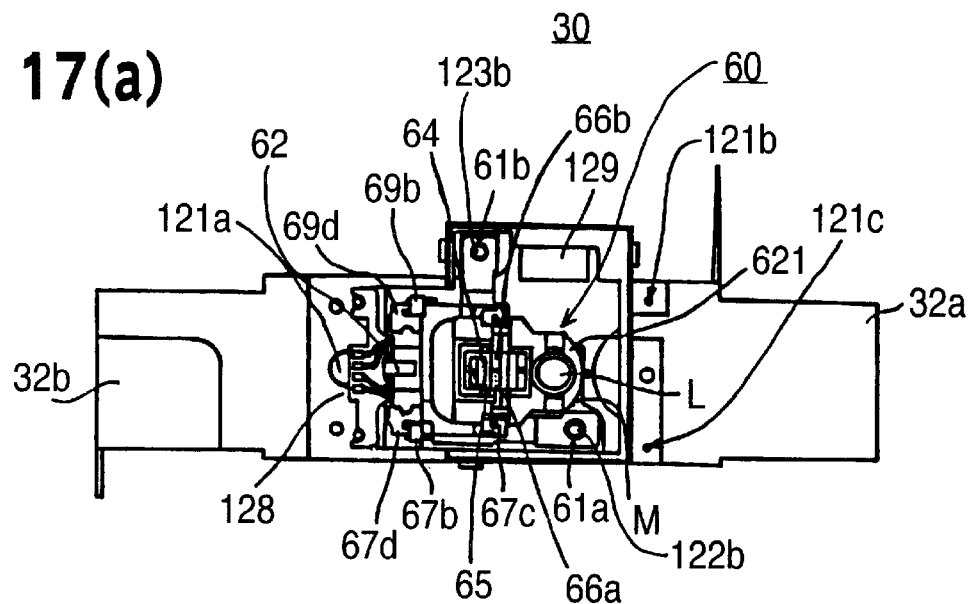
FIG. 17(a) is a top plane view of a lens carriage.
Figure 17B:
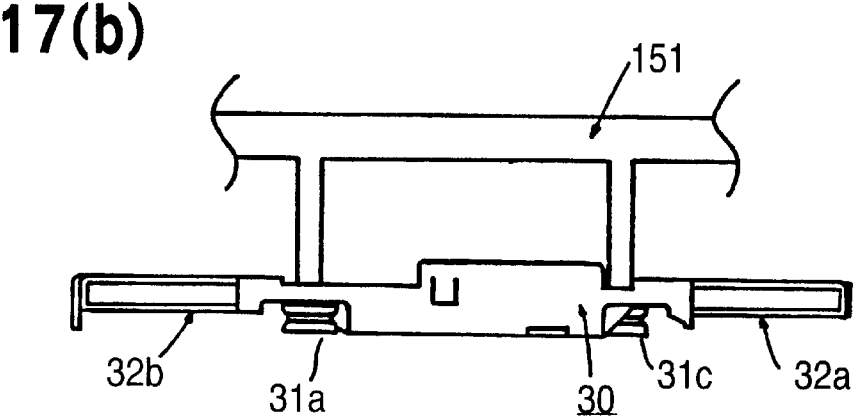
FIG. 17(b) is a side plane view of the lens carriage.
Figure 17C:
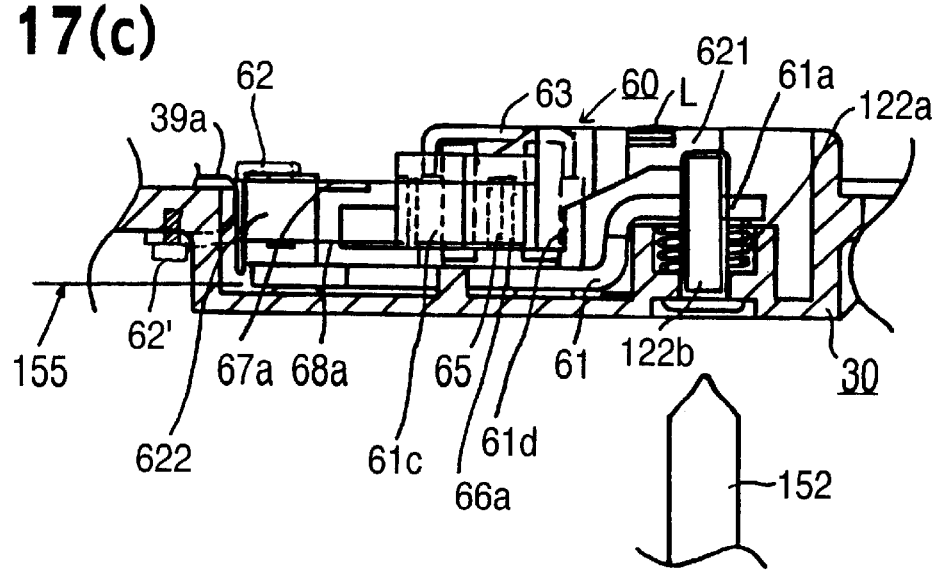
FIG. 17(c) is an enlarged cross-sectional view of the lens carriage.

FIG. 17(a) is a top plane view of a lens carriage 30, FIG. 17(b) is a side plane view of the lens carriage 30 and FIG. 17(c) is an enlarged cross-sectional view of the lens carriage 30.

A condenser lens 129, in FIG. 17(a), is mounted on the lens carriage 30 at the center thereof and inputs/outputs the beam from/to the fixed optical unit 40. A mirror M is mounted below the objective lens L and deflects the light beam from the condenser lens 129 toward the objective lens L. Details of the lens actuator 60 will be explained later with reference to FIG. 18. In addition, at both transverse, or lateral, sides of the lens carriage 30, the bearings 31a to 31c and coils 32a, 32b, explained above, are provided.

Next, a method of adjusting the optical axis of the objective lens L will be explained.

On the occasion of mounting the lens actuator 60 on the lens carriage 30, a jig 151 is engaged on three recessed reference points 121a to 121c to hold the lens carriage 30 and then the light beam is irradiated onto the jig 151 through the objective lens L and then the inclination of the light beam is detected by an auto-collimator or the like. The screw 122b, which passes axially through the coil spring 122a, is advanced with a screw-driver 152, under the condition that the coil spring 122a is provided between the screw fitting portions 61a of the actuator base 61 and the bottom surface of the lens carriage 30, so that the light beam from the objective lens L becomes almost perpendicular, effectively, to a bottom surface of the recess 20h (FIG. 3) defining the slot for access to the optical disc cartridge. In FIG. 17(a), a screw 123b is similarly provided at a screw fitting portion 61b of the actuator base 61 via a coil spring (not illustrated).

Therefore, the angular inclination of the objective lens L, that is, the angular inclination of the optical axis "l" (FIG. 16(b)), can be fine-adjusted with an elastic (i.e., resilient) pressure of the coil spring 122a. Thus, since the lens actuator 60 is provided with two adjusting points, that is, the screw fitting portions 61a and 61b, the objective lens can be fine-adjusted in two directions with a couple of screws, that is, the objective lens can be fine-adjusted in two-dimensions.

Figure 18:
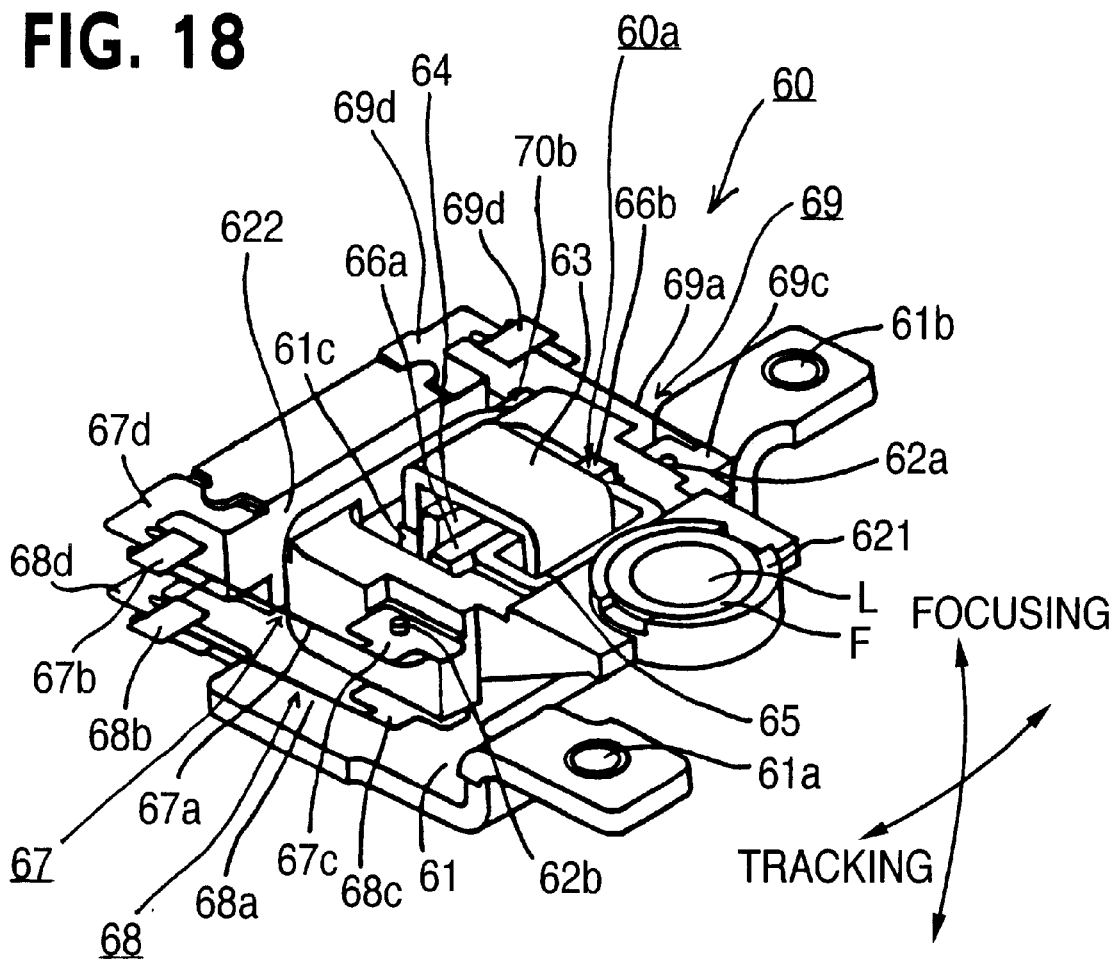
FIG. 18 is a perspective view of a lens actuator.

FIG. 18 is a perspective view of the lens actuator 60. The movable part of the lens actuator 60 comprises a lens holder 621, made of a thermosetting resin or the like, which movably holds the objective lens L in the track and focus directions, a focus coil 65 which is provided by bonding at the wall part of the center aperture of the lens holder 621 and tracking coils 66a and 66b which are bonded to the opposite surfaces, relative to that to which the above-mentioned bonding is provided for the focus coil 65.

Moreover, a magnetic circuit of the lens actuator 60 comprises a magnet 64, provided on the actuator base 61 in opposing relationship to the tracking coil 65 at the center aperture of the movable side lens holder 621, a yoke 61c consisting of an upwardly bent part of the actuator base 61 receiving a magnetic force of the magnet 64, a yoke 61d consisting of a bent part which opposed to the yoke 61c and a U-shaped cover yoke 63 coupling the foregoing two yokes.

In addition, there are provided four wire assemblies 67, 68 and 69 (one is not illustrated) for movably holding the movable part of the lens actuator 60. These four wire assemblies 67, 68 and 69 consist of wire portions 67a, 68a, 69a (one is not illustrated), four free end portions 67c, 68c, 69c (one is not illustrated) and four fixed end portions 67d, 68d, 69d (one is not illustrated). The four free end portions 67c, 68c and 69c (one is not illustrated) are respectively engaged with four projections 62a and 62b (two are not illustrated) on the lens holder 621 and are bonded thereon. The four fixed end portions 67d, 68d and 69c (one is not illustrated) are bonded to the wire holding block 622. The four vibration absorbing plate 67b, 68b and 69b (one is not illustrated) are respectively provided on the wire corresponding assembly 67, 68 or 69 (one is not illustrated) near the fixed end portion 67d, 68d and 69d (one is not illustrated).

The wire portions 67a, 68a and 69a of the wire assemblies 67, 68 and 69 comprise, sequentially from the upper layer, a vibration absorbing plate (damping plate) consisting of Kapton, miler film or the like, double-sided bonding tape for bonding the damping plate or bonding layer consisting of non-perfect setting bonding agent, wire, bonding layer and damping plate.

The four lead conductors on the FPC 39a (of FIG. 17(a)) is respectively extended to the fixed end portions 67d, 68d and 69d and are soldered to the fixed end portions 67d, 68d and 69d on the wire holding block 622. Moreover, the four free end portions 67c, 68c, 69c on the lens holder 621 are respectively soldered with four lead wires of the focus coil 654 and track coils 66a, 66b. As explained above, continuity among the focus coil 65, track coils 66a, 66b and FPC 39a can be attained. Accordingly, since electrical connections can be made without routing fine leads of each coil, there is no fear of disconnection/default and improvement in reliability can be realized.

Moreover, two wire portions 67a and 69a, two free end portions 67c and 69c and two fixed end portions 67d and 69d are manufactured by laminating plate or linear spring material as a single assembly and then coupling the wire assembly 67 and the wire assembly 69 in the shape of "C". A pair of wire assembles 67 and 69 in the coupled (i.e., in the shape of "C") condition are attached to the wire holding block 622 and, thereafter, the coupling portion is cut out. Therefore, small size parts can be dealt with easily and managed, with improvement in the assembling efficiency, by using the wire assembling manufactured as explained above.

The actuator base 61 can be screwed, under the condition that all parts of the lens actuator 60 are mounted, to the lens carriage 30 through the fitting portions 61a and 61b of the bending piece of the actuator base 61.

Figure 19:
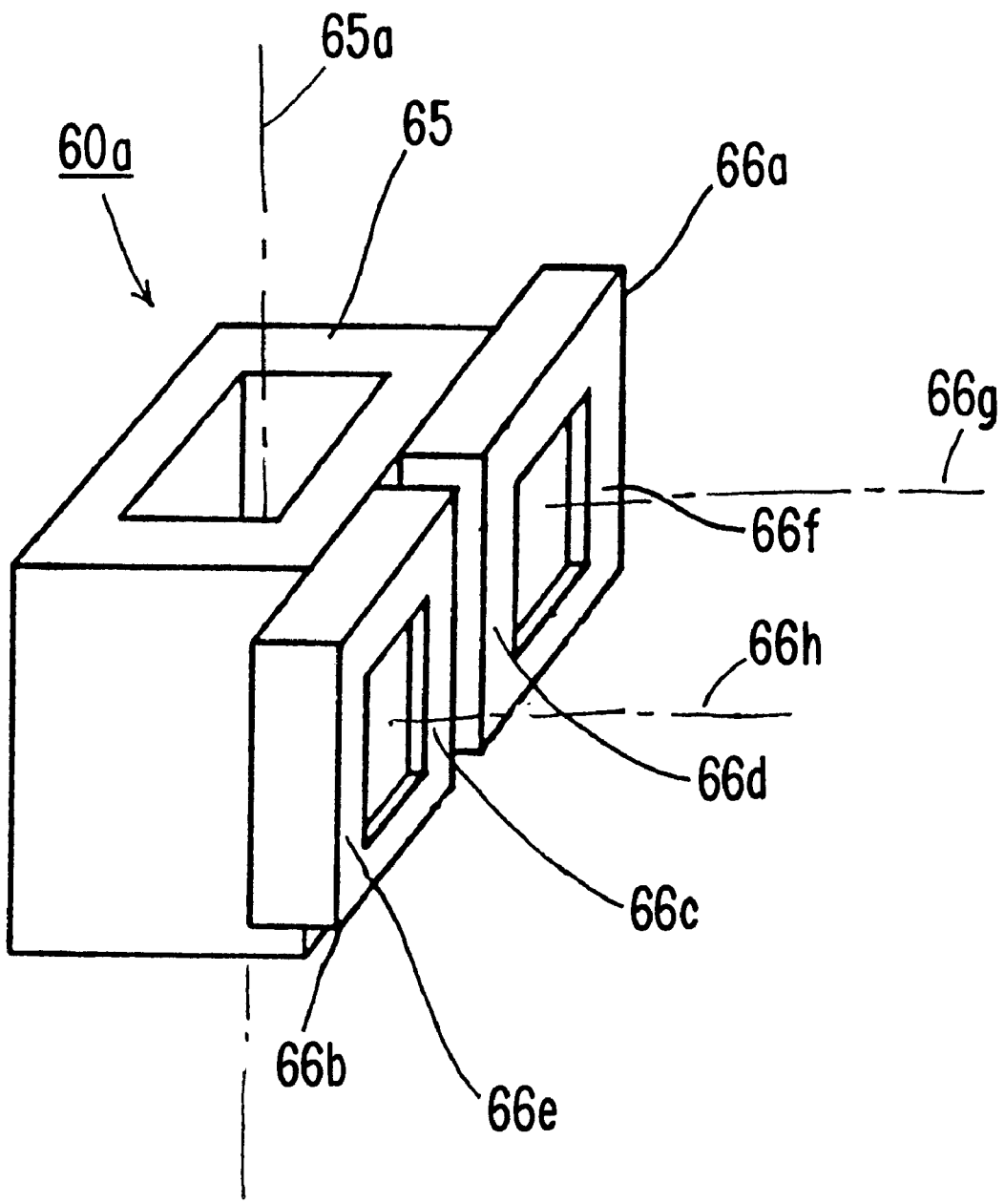
FIG. 19 is a perspective view of a track/focus coil unit.

FIG. 19 is a perspective view of the track/focus coil unit 60a comprising a focus coil 65 and track coils 66a and 66b and is locked in the magnetic circuit of the lens actuator 60. The tracking coils 66a and 66b are respectively wound around axes 66g and 66h and the focus coil 65 is wound around an axis 65a perpendicular to the axes 66g and 66h.

In the tracking coils 66a and 66b, only the inner vertical sides 66c and 66d are used for generating a drive force, while the outer vertical sides 66e and 66f and horizontal sides thereof do not take part in same.

However, when the tracking coils 66a and 66b move within the range of movement of coil unit 60a and the outer vertical sides 66e and 66f enter into the magnetic flux of the magnetic circuit, the outer vertical sides 66e and 66f generate forces in opposite directions and thus may produce mechanical oscillation (e.g., vibration). In this situation, the tracking coils 66a and 66b cannot make a uniform driving force at any position within the moving range of coil unit 60a and then it become difficult to control the position of tracking coils 66a and 66b. Therefor, in this embodiment, the outer vertical sides 66e and 66f are located sufficiently away from the magnetic circuit to cancel the above-mentioned manner.

Figure 20A:
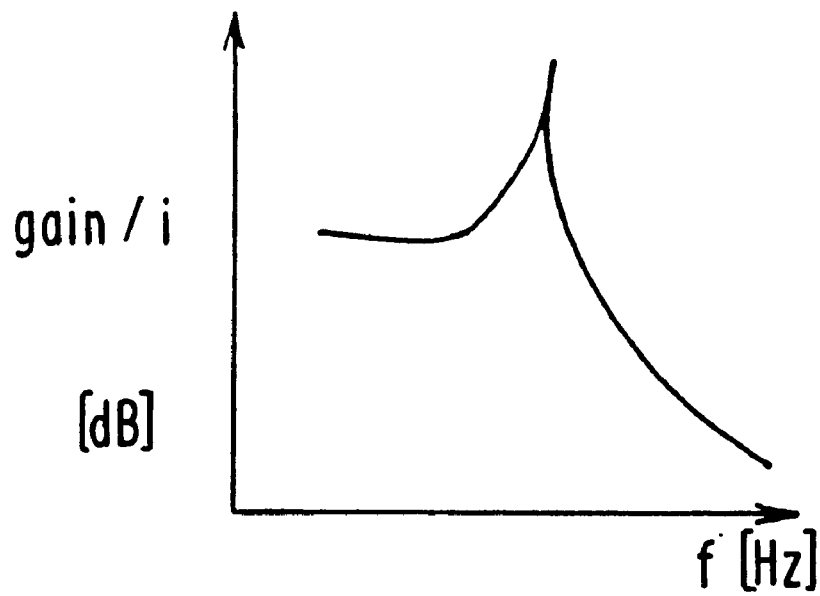
FIG. 20(a) is a graph of a frequency-mechanical compliance profile of the lens actuator having wire assemblies without any damping member.
Figure 20B:
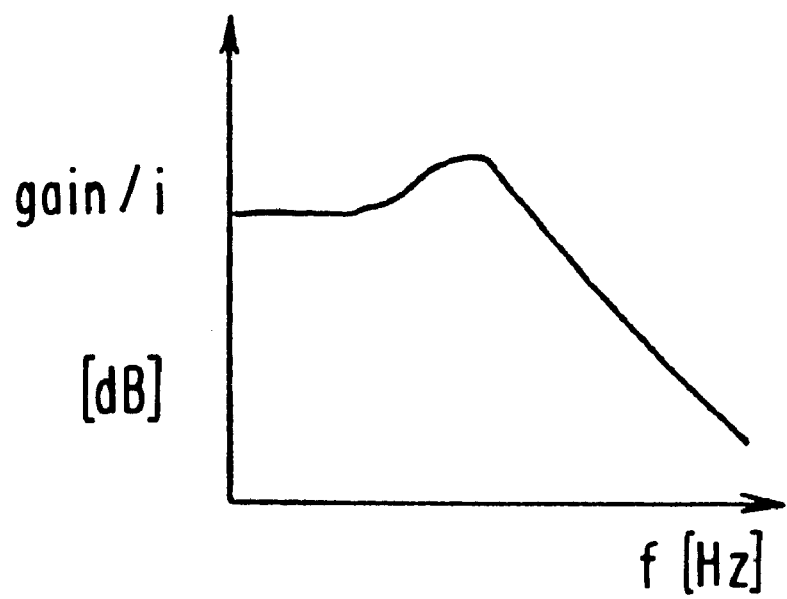
FIG. 20(b) is a graph of a frequency-mechanical compliance profile of the lens actuator having wire assemblies with damping members.

FIG. 20(a) is a graph of a frequency—mechanical compliance profile of the lens actuator having wire assemblies without any damping member. FIG. 20(b) is a graph of a frequency—mechanical compliance profile of the lens actuator having wire assemblies with damping members. In FIGS. 20(a) and 20(b), the horizontal axis indicates frequency (Hz) of a current applied to the track/focus coil unit 60a, while the vertical axis indicates a gain (dB), namely, vibration as a function of the level of the current (i).

Comparison between FIGS. 20(a) and 20(b) teaches that sharp peaks are formed at a certain frequency when only wire is used, as shown in FIG. 20(a); however, there is no such peak value and, instead, vibration is substantially attenuated when a damping member is used, as shown in FIG. 20(b).

Therefore, if shearing deformation is generated in the wire assembly, vibration in the focus direction and track direction of the wire assembly can be absorbed by covering the surrounding of the wire assembly with the bonding layer, explained above, or with a damping member such as a vibration absorbing plate. Namely, the vibration can be attenuated to about 1/10th or less the amount that is generated when only the wire is used.

As explained previously, a vibration absorbing (damping) plate is provided near the wire holding block 622. The vibration absorbing plate is formed as a thin plate, which is composed, like the wire assembly explained above, of a vibration absorbing plate constituted by aluminum foil, Kapton, miler film or the like, a bonding layer consisting of double-sided bonding tape or non-perfect setting bonding agent, and the vibration absorbing plate is bonded by the bonding layer. In this embodiment, the vibration absorbing plates 67b, 68b, 69b are provided but since the bonding layer actually plays an important role for absorption of vibration, employing even only a bonding agent having soft-viscosity can also provide a sufficient damping effect.

Figure 21A:
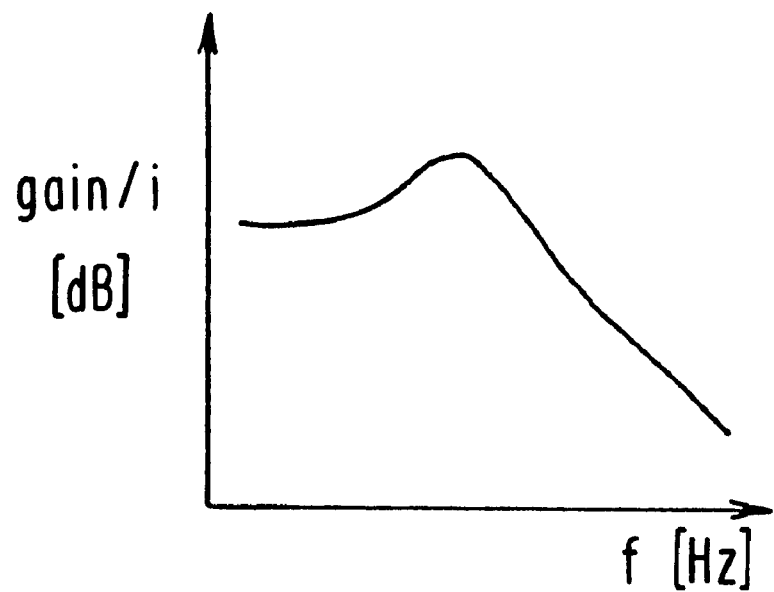
FIG. 21(a) is a graph of a frequency-mechanical compliance profile of the lens actuator having wire assemblies with a thermosetting bonding agent.
Figure 21B:
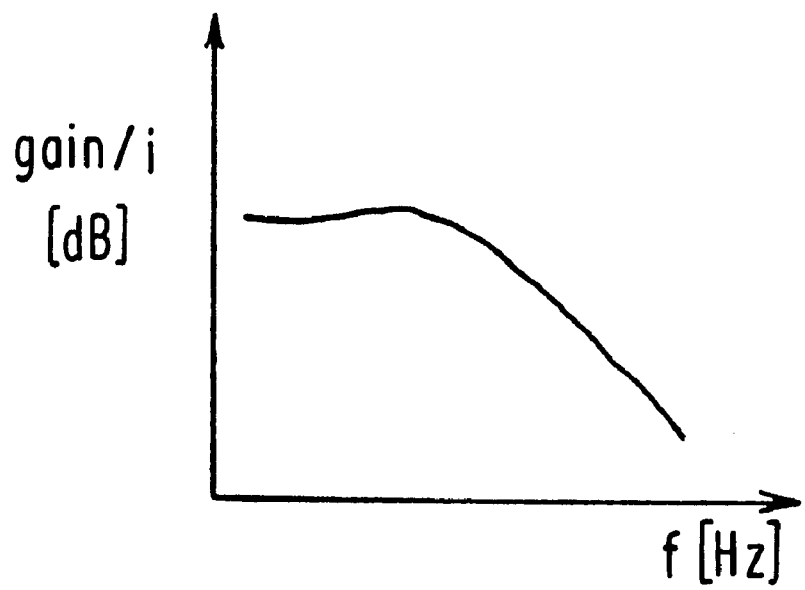
FIG. 21(b) is a graph of a frequency-mechanical compliance profile of the lens actuator having wire assemblies with a non-perfect setting bonding agent.

FIG. 21(a) is a graph of a frequency—mechanical compliance profile of the lens actuator 60 having wire assemblies with a thermosetting bonding agent, such as an epoxy-based material, and FIG. 21(b) is a graph of a frequency—mechanical compliance profile of the lens actuator having wire assemblies with a non-perfect setting bonding agent, such as a silicon-based or ultraviolet setting type bonding agent.

In FIGS. 21(a) and 21(b), the horizontal axis indicates frequency (Hz) of a current applied the a track/focus coil unit 60a, and the vertical axis indicates gain (dB), namely vibration caused by the current.

A comparison of FIG. 21(a) and FIG. 21(b) teaches that a sharp peak value is formed at a certain frequency, namely vibration is generated, when the thermosetting bonding agent is used as shown in FIG. 21(a), but such a sharp peak value as shown in FIG. 21(a) is not generated and vibration instead is attenuated when the non-perfect setting bonding agent is used, as shown in FIG. 21(b).

Therefore, if shearing deformation is generated at the wire assembly, vibration in each of the focus direction and the track direction in the wire assembly can be absorbed and thereby reduced to about 1/10th (or less) of that which is generated when only the wire is used to attenuate the vibration, by providing the vibration absorbing plate 67b, 68b, 69b, such as a bonding layer and a vibration absorbing plate or the like explained previously, to the area of the wire assembly having a larger deforming angle during the drive of the lens actuator 60 or movement of lens carriage.

Meanwhile, since the thin plate vibration absorbing members 67b, 68b, 69b are provided in the manner that the plate surfaces are parallel to the bottom surface of the lens carriage 30, the behavior of one does not have any influence on another, adjacent such wire assembly.

Employment of the lens actuator as explained above affords high performance yet with a thinner lens carriage.

Figure 22:
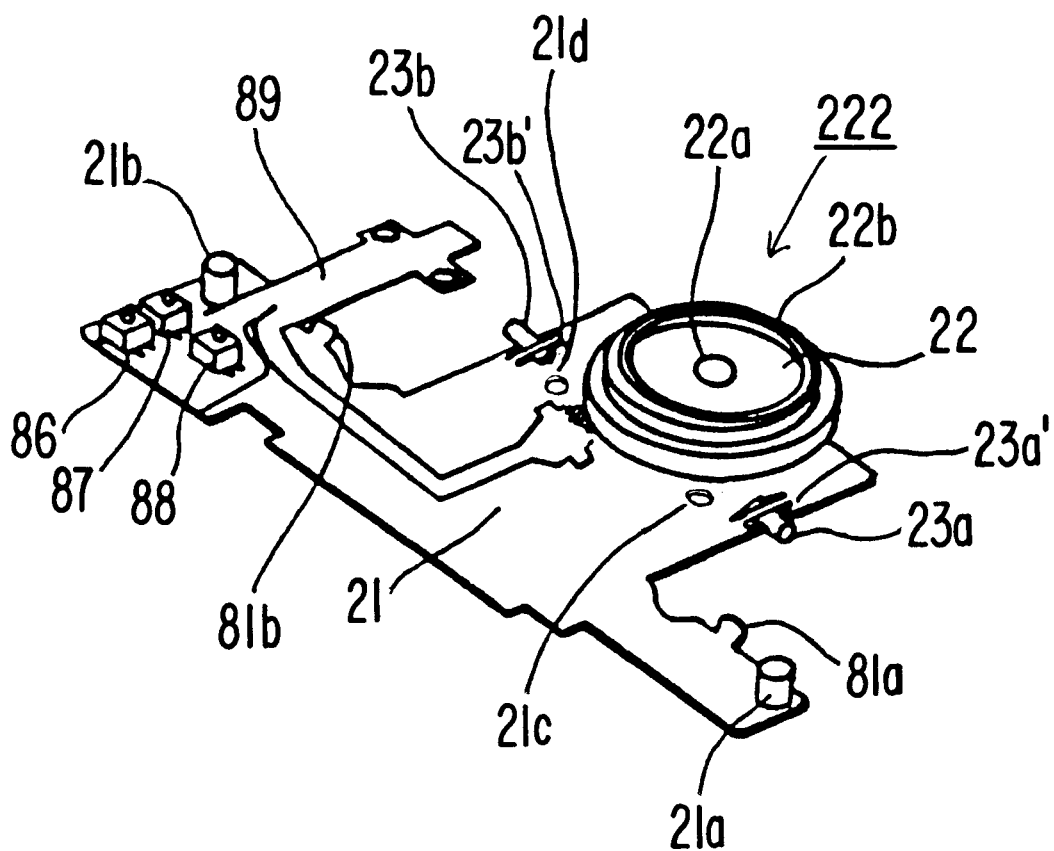
FIG. 22 is a top perspective view of a turn-table motion (i.e., transport) unit.

FIG. 22 is a perspective view of the turn-table motor unit 222 (c.f., FIG. 3). A turn-table 22 is formed of a magnetic material for attracting a metal part of a hub of an optical disc and has a central projection 22a to be engaged with a central hole of the hub of an optical disc and an annular projection 22b to be placed in contact with the hub of optical disc. The accuracy of the center projection 22a and the circumferential projection 22b is an important factor to improve the precision of the central point and a horizontal plane of the optical disc.

The actuator (metal) plate 21 has projections 21a and 21b to be engaged and received in corresponding apertures 20c and 20d of the drive base 20 (see FIGS. 4 and 6), apertures 21c and 21d to be engaged with projections 20e and 20f of the drive base 20 (FIGS. 4 and 6), upwardly bent flanges 81a and 81b, and slotted bands, or belts, 23a' and 23b' for holding the pin-type shafts of the slide roller pins 23a and 23b. The actuator (metal) plate 21 having these structures is formed in a single process by a metal-stamping, or press technique.

The turn-table motor unit 222 is mounted on the (metal) actuator plate 21 and, further, the flexible printed circuit sheet (FPC) 89 is bonded to the latter. On this flexible printed circuit sheet (FPC) 89 are provided a sensor 86 for detecting the write enable status to which the optical disc cartridge is set, a sensor 87 for detecting the write protect status to which the optical disc cartridge is set and a cartridge-in sensor 88 for detecting insertion of an optical disc cartridge. The flexible printed circuit sheet (FPC) 89 further has wirings to transfer the signals of the above sensors and a drive signal which controls driving of the turn-table 22.

Since the turn-table motor unit 222 is constituted as explained above and the drive circuits, for example, for driving the turn-table 22 are all mounted on the printed circuit board 11, the actuator (metal) plate 21 on which is mounted the FPC can be made much thinner than conventionally and the number of parts on the drive base 20, at the upper layer of the cartridge holder 71, can be (reduced), thereby enabling reduction in size in the height direction of the disc drive. Namely, the height of the recess 20g (FIG. 4) for the turn-table motor unit 222 (i.e., the height of the interconnected wall segment 20-1, 20-2 and 20-3 of the drive base 20) can be set to the higher one of the respective heights of the turn-table motor unit 222 and of the guides 82a, 82b, 83a, 83b (FIG. 23) of the load plate 21.

In this embodiment, since the shapes of the guides 82a, 82b, 83a, 83b and bent flanges 81a, 81b (FIG. 22) are determined as shown in the figures, upward/downward movement of the turn-table motor unit 222 can be controlled and the height of the turn-table motor unit 222 can be set to be almost equal to the height of the recess 20g (FIG. 4).

Therefore, the height (about 6.0 mm) of the recess 20g (FIG. 4) can be restricted only to the maximum upward/downward movement (about 5.8 mm) of the turn-table motor unit 222. Because the thickness of the actuator (metal) plate 21 is only about 0.6 mm and the turn-table unit 22 avoids into the opening 20a (FIG. 4) of the drive base 20.

Accordingly, since the height of the recess 20g (FIG. 4) can be reduced by employing a thinner turn-table motor unit, the height of the optical disc drive unit is expected to become near the thickness (about 5 mm) of the cartridge.

Unloading of the optical disc is achieved by engagement of appropriate parts of the turn-table motor unit 222, eject motor unit 50 and load plate 24, as explained previously.

First, when the eject button 10a, provided at the front bezel 10, is depressed or when a pin or the like is intensively inserted into the manual eject hole 10d, ejection of a disc cartridge can be instructed manually.

In the former case, when the eject button 10a is depressed, the eject motor 50 is driven and when the end part 24d of the load plate 24 is pulled next, the load plate moves to the rear side of the disc drive, while in the latter case, when the pin or the like is intensively inserted into the manual eject hole 10d, the pin collides with the erected wall part 10f of the load plate 24 and thereby the load plate 24 is moved to the rear side of the disc drive.

FIG. 23 is a bottom perspective view of the turn-table motor unit 222 and the load plate 24. The actuator (metal) plate 21 of the turn-table motor unit 222 is provided with fitted slide/roller pins 23a, 23b to be engaged with the load plate 24. The load plate 24 is provided between the actuator (metal) plate 21 and base 20, for effectuating the function to raise the actuator (metal) plate 21 including the turn-table 22 to engage a disc and to lower same to release the disc.

In more detail, the load plate 24 is provided with inclined guide slots, or channels, 84a, 84b, having a slope rising toward the rear of the disc drive, for engagement with the slide pins/rollers 23a, 23b of the actuator (metal) plate 21, first guides 83a, 83b for stably introducing the rollers 23a, 23b into the guide slots 84a, 84b and second guides 85a, 85b having flat edge surfaces, disposed higher than the first guides, for stably introducing the pins/rollers 23a, 23b into engagement with the guide slots 84a, 84b and allowing the slide pins/rollers 23a, 23b, when having left the guide slots 84a, 84b, to ride over such flat surfaces.

Further, the load plate 24 is also provided with third guides 82a, 82b having respective slopes rising toward the rear side of the disc drive. Therefore, with movement of the load plate 24 to the front side of the disc drive, the slide pins/rollers 23a, 23b of the actuator (metal) plate 21 slide on the second guides 85a, 85b by rotating the rollers at the end portions thereof and the bent flanges 81a, 81b of the actuator (metal) plate 21 slide on the slope of the third guides 82a, 82b, thereby pushing the actuator (metal) plate 21 upwardly. (Recognize that FIG. 23 illustrates the structure, as inverted.)

Figure 24A:
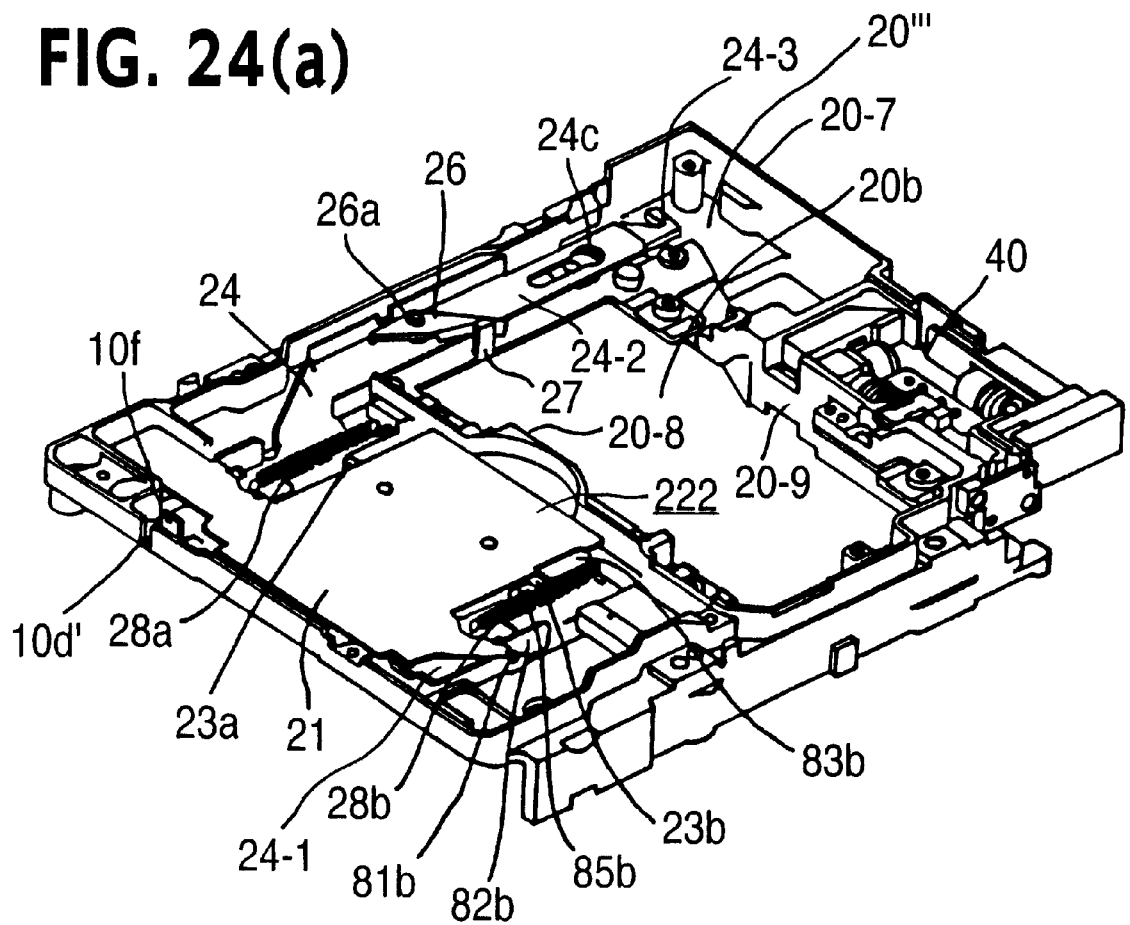
FIG. 24(a) is a bottom perspective view of the interior of the disc drive positioned as when a disc cartridge (not shown) is loaded therein.
Figure 24B:
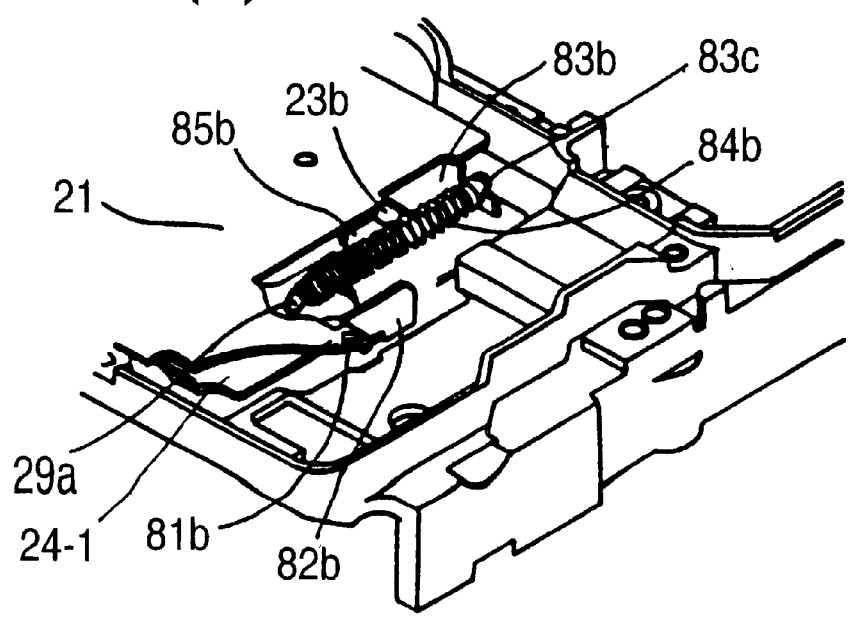
FIG. 24(b) is a partially enlarged perspective view of the interior of the disc drive shown in FIG. 24(a).

FIG. 24(a) is a bottom perspective view of the interior of the disc drive in the condition when a disc cartridge (not shown) is loaded therein. FIG. 24(b) is a partially enlarged perspective view of the interior of the disc drive shown in FIG. 24(a). Both figures illustrate the inverted condition for ease of illustration of the mechanisms and it is to be understood that the normal orientation and operation thus is inverse to the illustrations. The actuator (metal) plate 21 is mounted on the load plate 24 with deposition of the slide pins/rollers 29*a* and 29*b*, projections 83*c* and 83*d* of the load plate 24 and coil springs 28*a* and 28*b* with both ends coupled. In this case, these springs 28*a* and 28*b* are retracted. In this case, the slide pins 23*a* and 23*b* of the actuator (metal) plate 21 are coupled with the guide slots 84*a* and 84*b*. In addition, it can also be seen that the bent flanges 81*a* and 81*b* of the actuator (metal) plate 21 are located at the lower side of the slope of the third guides 82*a* and 82*b*.

Figure 25A:
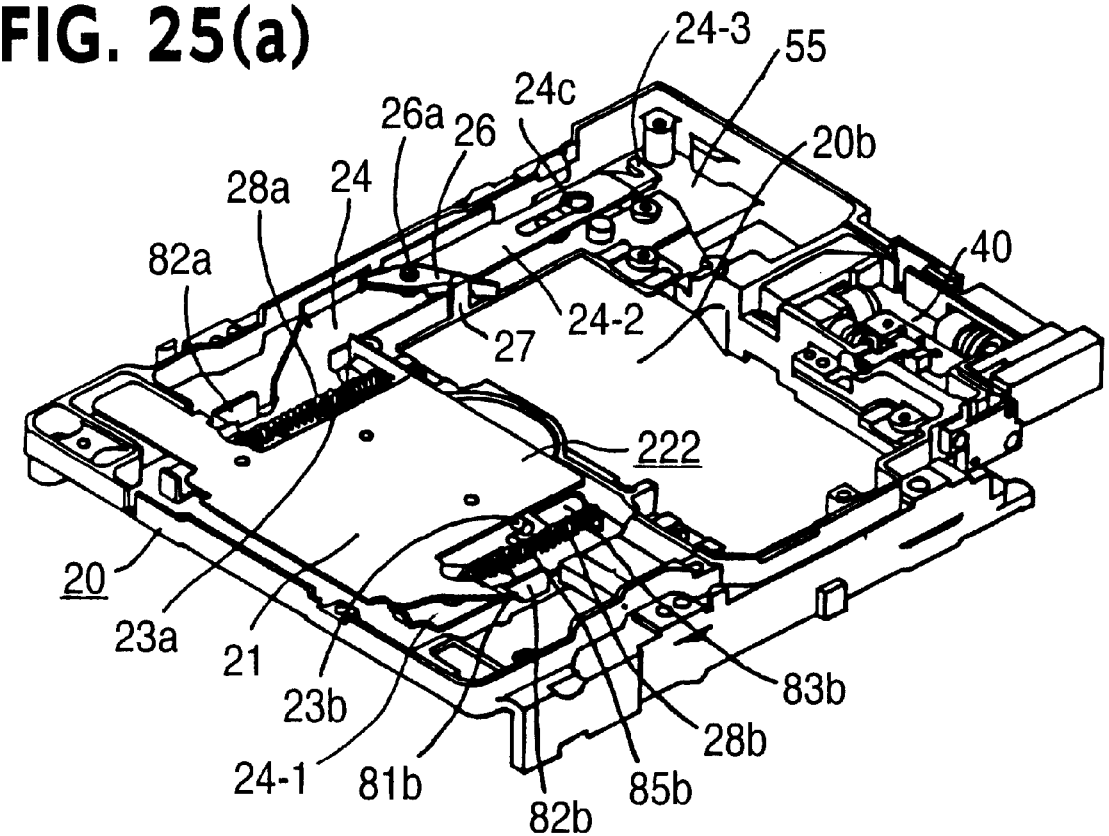
FIG. 25(a) is a bottom perspective view of the interior of the disc drive with no disc cartridge therein (i.e., with the disc cartridge ejected/unloaded).
Figure 25B:
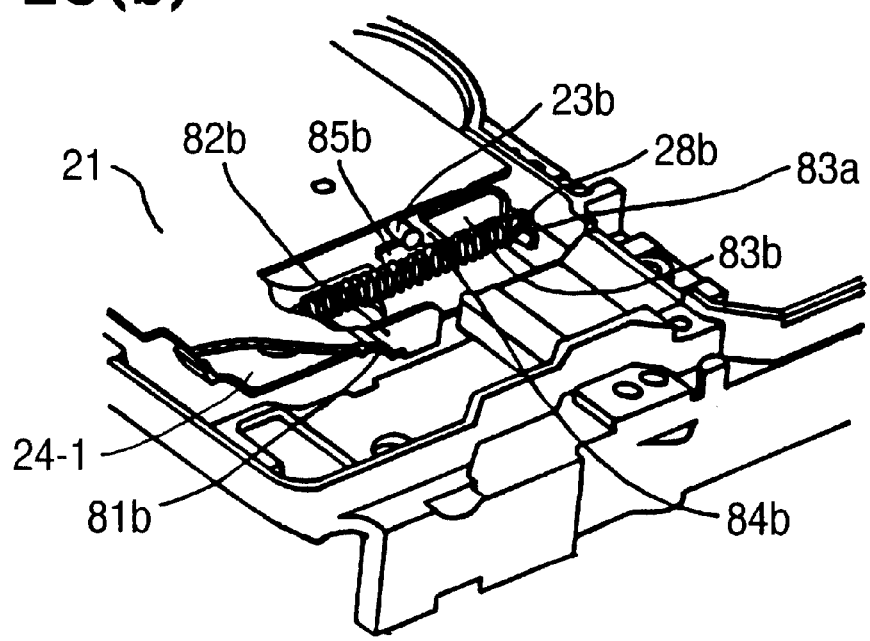
FIG. 25(b) is a partially enlarged perspective view of the interior of the disc drive shown in FIG. 25(a).

FIG. 25(*a*) is a bottom perspective view of the interior of the disc drive with no disc cartridge thereon (i.e., with the disc cartridge ejected/unloaded). FIG. 25(*b*) is a partially enlarged perspective view of the interior of the disc drive shown in FIG. 25(*a*).

With the eject instruction explained above, the load plate 24 moves to the rear of the disc drive. This movement causes the plurality of grooves 24*a* to 24*c* provided within the load plate 24 to slide along the pins 29*a* to 29*c* provided on the drive base 20. Moreover, with the movement of the load plate 24, the slide pins 23*a*, 23*b* of the actuator (metal) plate 21 slide on the slopes of the guide slots 84*a*, 84*b* and ride over the flat surfaces of the second guides 85*a*, 85*b* to push the metal plate 21 downwardly. Thereafter, the slide pins 23*a* and 23*b* of the actuator (metal) plate 21 slide by the specified amount and are then returned to the guide slots 84*a* and 84*b* with the returning forces of the coil springs 28*a*, 28*b*.

In the same manner, when the load plate 24 moves, the bent flanges 81*a*, 81*b* of the actuator (metal) plate 21 slide on the slopes of the third guides 82*a*, 82*b* and the bent flanges 81*a*, 81*b* cause the actuator (metal) plate 21 to move downwardly a little, near the turn-table 22.

With the mechanism as explained previously, when the actuator (metal) plate 21 moves downwardly, the turn-table 22 holding the optical disc moves downwardly through the opening 20*a* of the drive base 20 thereby to withdraw from the inside of the cartridge holder and whereby the disc cartridge is urged toward the wall surface of the drive base 20 around the opening 20*a*. Thereby, engagement between the optical disc and turn-table 22 is canceled. The cartridge ejection mechanism of the cartridge holder 71, explained later, then ejects the cartridge to the outside of the disc drive.

In FIG. 25(*a*), the carriage lock 26, rotatably mounted on shaft 26*a* to the load plate 24, is projected toward the (large) aperture 20*b* of the drive base 20. In more detail, a part of the carriage lock 26, made of plastic material, is pressed against the projection 27 by a coil spring received on the shaft 26*a* between the block 26 and is energized, or biased, normally to rotate the lock 26 toward, and to engage, the projection 27 of the drive base 20; the end part of the carriage lock 26 thereby is projected normally toward the aperture 20*b* of the drive base 20 to engage the end part of the coil assembly 32*a* of the lens carriage 30 (as in FIG. 7) for preventing inadvertent movement of the lens carriage 30.

Figure 26:
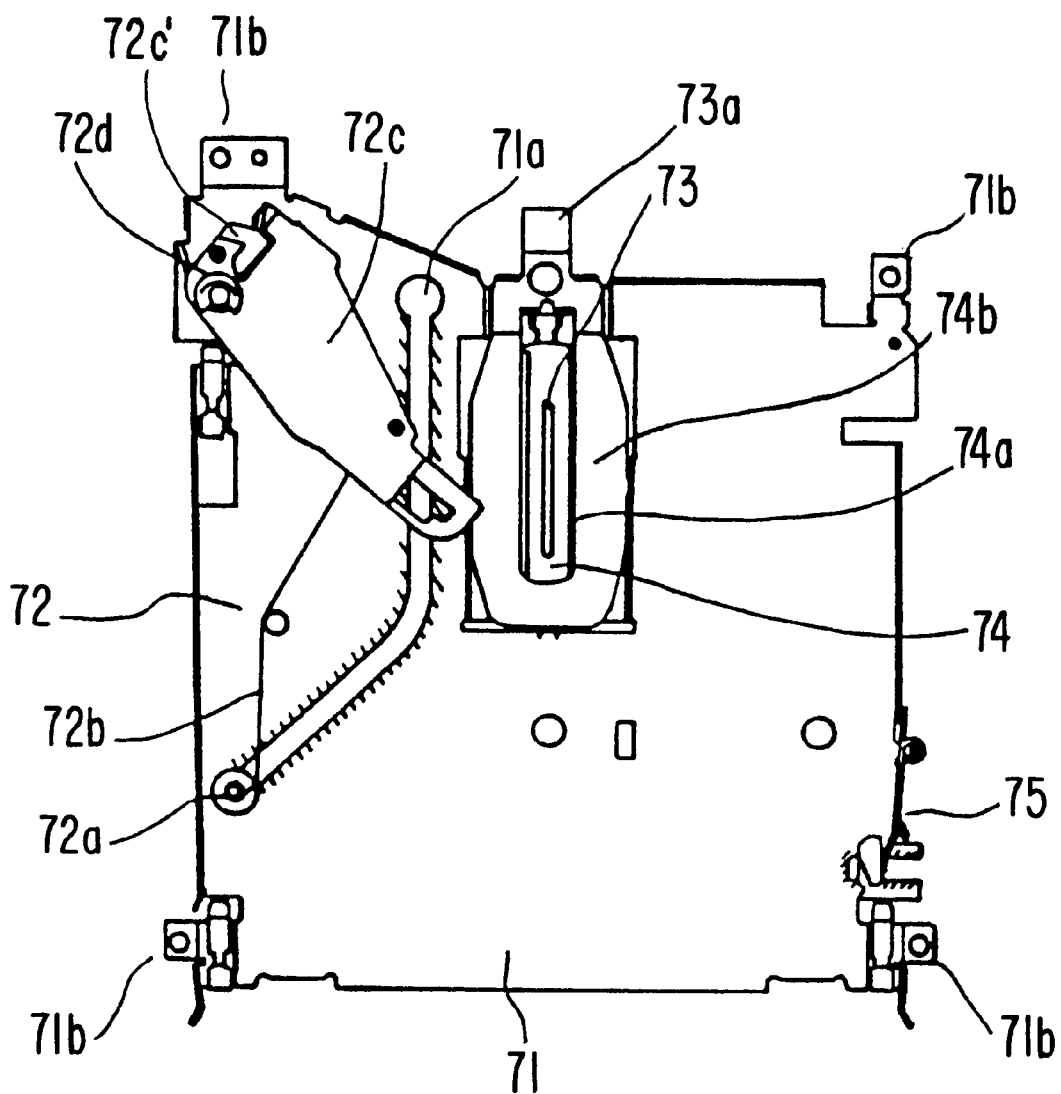
FIG. 26 is a bottom plane view of a cartridge holder.

FIG. 26 is a bottom plane view of the cartridge holder 71. The cartridge holder 71 is formed as s stamped stainless steel element. A cartridge transfer/ejection mechanism 72 comprises a roller 72*a* which is engaged within an elongated track aperture 71*a* of the cartridge holder 71, so as to move therein and thereby to open or close the shutter of the optical disc cartridge, coil spring 72*b* for energizing the roller 72*a* in the cartridge ejection direction and coil spring 72*d* for energizing the rotatable arm 72*c* in the cartridge ejection direction. The rotatable arm 72*c* has a gear therein affording a mechanism to counter the elastic force of the coil spring 72*d* and adjust, or off-set and dampen, a cartridge ejection force, in order to prevent the cartridge from being too forcibly and rapidly ejected.

In addition, an electromagnet unit 73 is provided at a position near the center of the cartridge holder 71 and in opposition to the light beam from the objective lens L. An electromagnetic coil assembly of the unit 73 comprises a coil which is covered with an insulation seal 74*a* and a cover 74*b*. As an alternative, a coil with a rectangular cross-section can be also used. This rectangular cross-sectional coil is successfully used to reduce heat generation and prevents temperature rise within the disc drive.

Moreover, there is also provided a cartridge clamp 75 which engages the end part of an optical disc cartridge and is energized, by the coil spring, at the internal side of the cartridge holder 71, to clamp the cartridge 400 to the other wall surface of the drive base 20.

The cartridge holder 71 having the parts explained above mounted therein, is secured to the drive base 20 by a plurality of screws received through a corresponding plurality of holes 71*a* and 71*b* and related threaded holes in the base 20, as previously discussed.

Further, a terminal 73*a* of the electromagnet unit 73, formed like a plate spring, is exposed at the rear surface side of the cartridge holder 71, opposed to the printed circuit board 11, and the cartridge holder 71 and printed circuit board 11 are stacked so that such terminal 73*a* is placed in contact with the land of the printed circuit board 11. The terminal 73*a* of the electromagnet unit 73 is attached to the printed circuit board 11 by the screw hole 73*b* and a screw (not illustrated) to prevent warpage of the printed circuit board 11.

Figure 27:
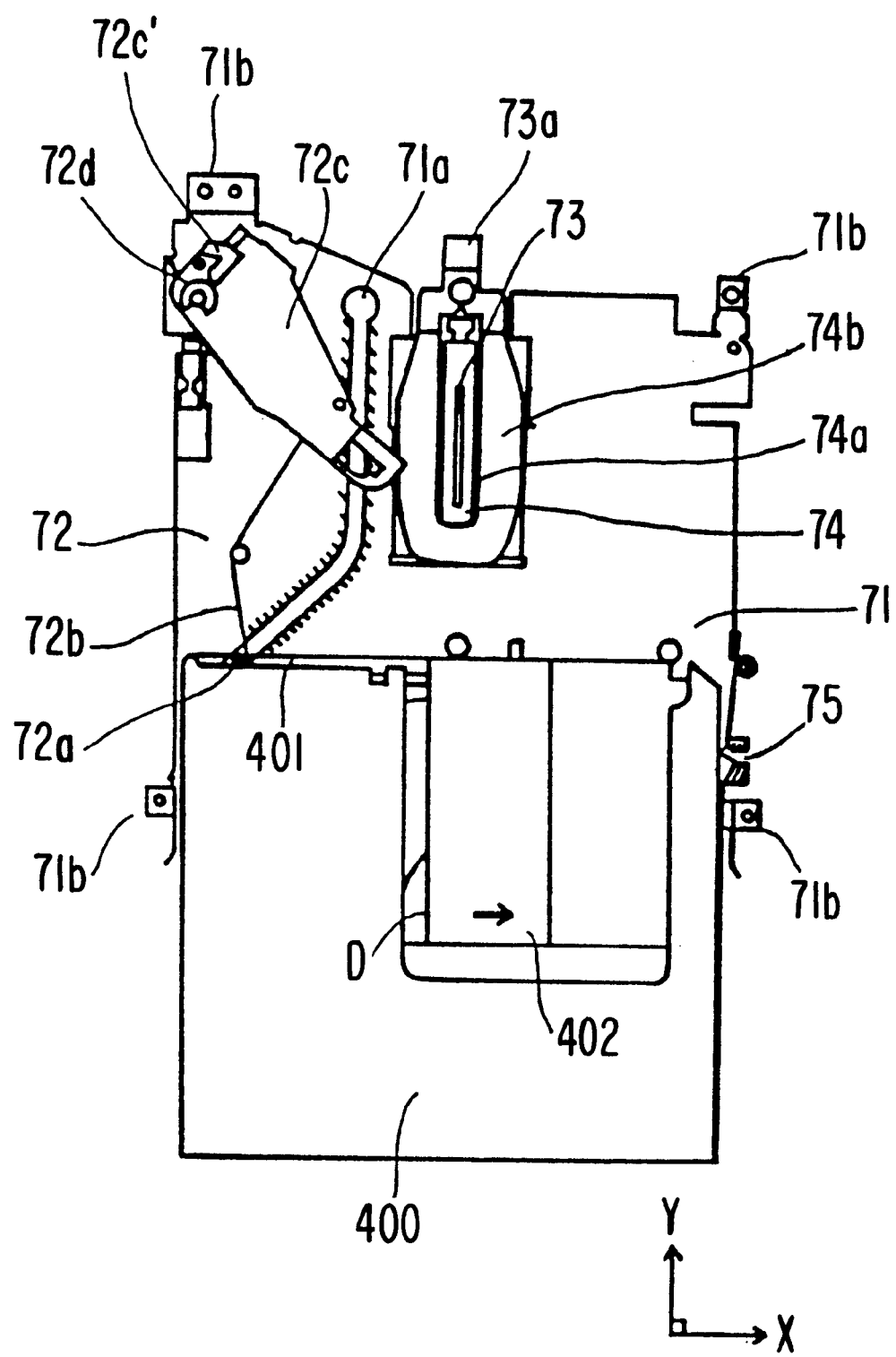
FIG. 27 is a bottom plane view of the cartridge holder with the disc cartridge normally inserted or ejected.

FIG. 27 is a bottom plane view of the cartridge holder when the disc cartridge 400 is in an intermediate stage of being normally inserted or ejected. The roller 72*a* engages with the end surface of the slider 401 of the optical disc cartridge 400 and the roller 72*a* moves along the elongated aperture 71*a*, upon insertion/ejection of the cartridge 400, respectively to open/close the shutter 402 coupled with the slider 401.

Figure 28:
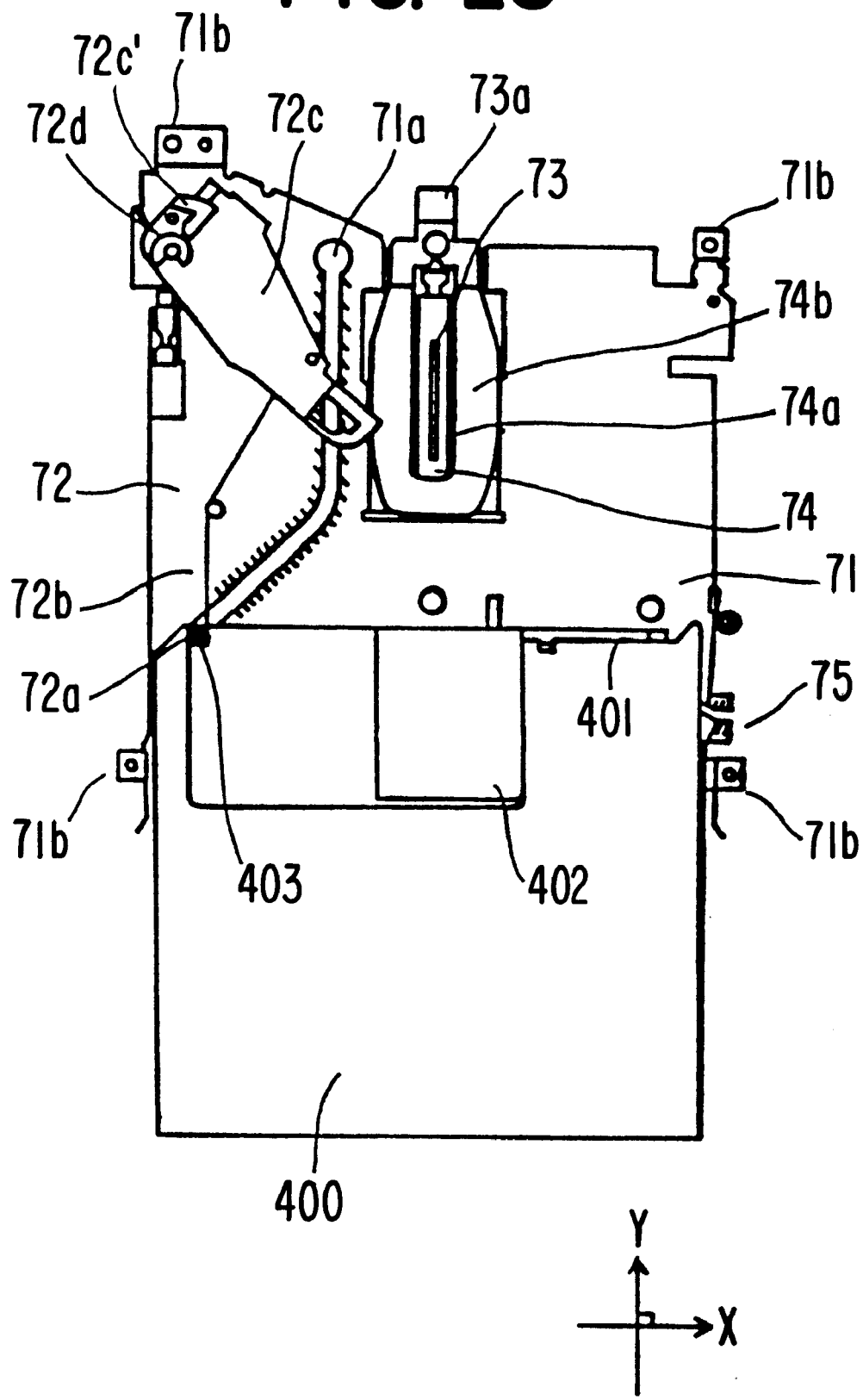
FIG. 28 is a bottom plan view of the cartridge holder with the disc cartridge reversely (i.e., improperly) inserted and partially loaded.

FIG. 28 is a bottom plan view of the cartridge holder 72 when the disc cartridge 400 is inserted incorrectly, i.e., upside down side. In this case, the roller 72*a* is coupled with the groove 403 provided on the cartridge 400, and cannot move in the groove 71*a* even if the groove 403 is pushed; thus, the cartridge 400 is ejected to the outside with the reactive force of the coil spring 72*b*.

However, in some cases, the cartridge 400 is pushed forcefully by a user, even though it is inserted erroneously, for the positioning. In this case, the roller 72*a* may be worn down, resulting in breakdown. While a force required for opening and closing operation of the shutter is usually set to several tens of grams, a bending force, due to the erroneous insertion, applied to the roller 72*a* may be increased depending on the user, up to several kilograms. This may cause damage and breakdown.

Figure 29:
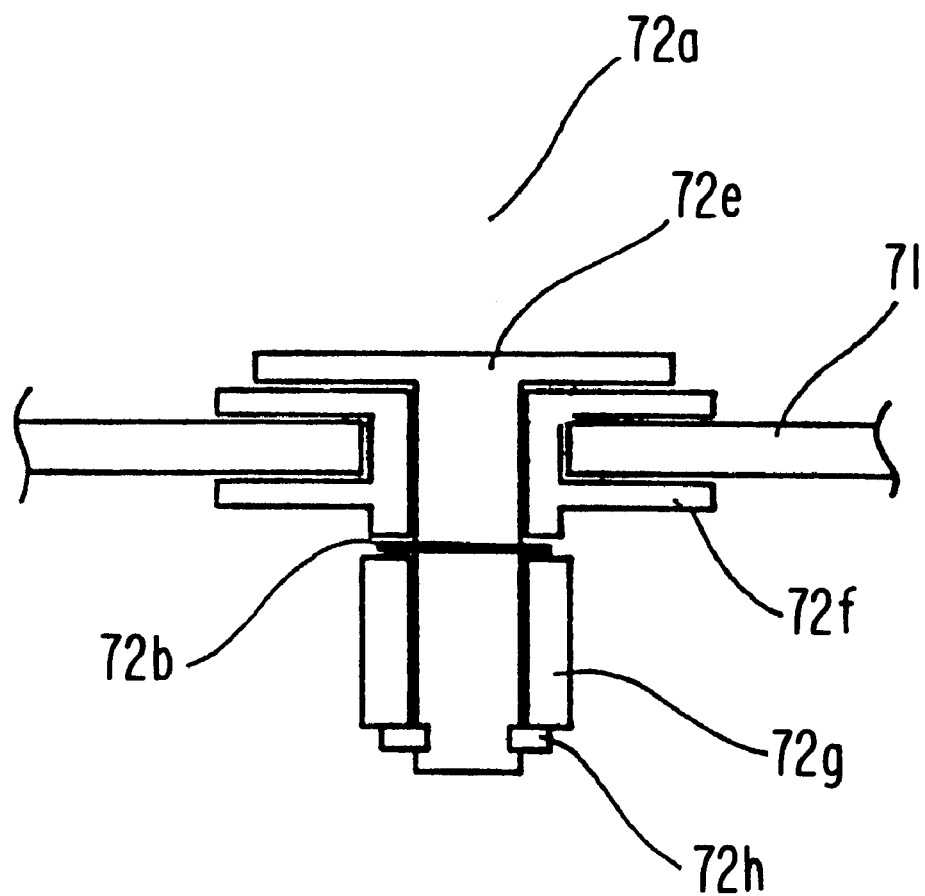
FIG. 29 is a side (elevational) cross-sectional view of a roller of the cartridge holder.

FIG. 29 is a side cross sectional view of the roller 72*a* of the cartridge holder 71. The roller 72*a* comprises a slide element 72*f* having a U-shaped cross-section and extending outwardly in opposite directions so as to be received in engaging relationship on the wall of the holder 71, extending outwardly from the groove 71*a* and so as to slide along the groove 71*a*, the slide element 72*f* further having a central bore therein for receiving a rotating shaft 72*e* at the center thereof, a rotary bearing 72*g* for engagement with the slider 401 of the cartridge 400 and a stopper clip 72*h* for assembled for maintaining the shaft 72*e* engaged by the rotary bearing 72*g*. In view of improving durability of the roller 72*a*, the rotating shaft 72*e* preferably is formed of a metal material, such as aluminum, stainless steel, or the like, while the other slide element 72f, the rotary bearing 72g and the stopper clip 72h are formed of a resin, such as poly-acetal resin, or a plastic material having good sliding property. Moreover, a part of the coil spring 72b is received on the shaft 72e, between the rotary bearing 72g and the slide element 72f.

Although it is possible to form all the parts, in addition to the rotating shaft 72e, of a metal material in order to improve durability of the roller 72, if a metal material is used for the sliding portion, the sliding portion may still become worn, depending on the surface condition and frequency operation of the sliding portions (i.e., the rotating shaft 72e, sliding element 72f, the rotary bearing 72g and the stopper clip 72h), disabling smooth opening and closing operations of the shutter. However, smooth sliding operation can be assured by coating a resin having a good sliding property, such as a Teflon coating, onto the sliding portion or impregnating these elements with lubricant; thereby, the roller 72a may be formed entirely of a metal material, as explained above.

Therefore, durability of roller 72a can be much improved by introducing the construction as explained above.

Figure 30A:
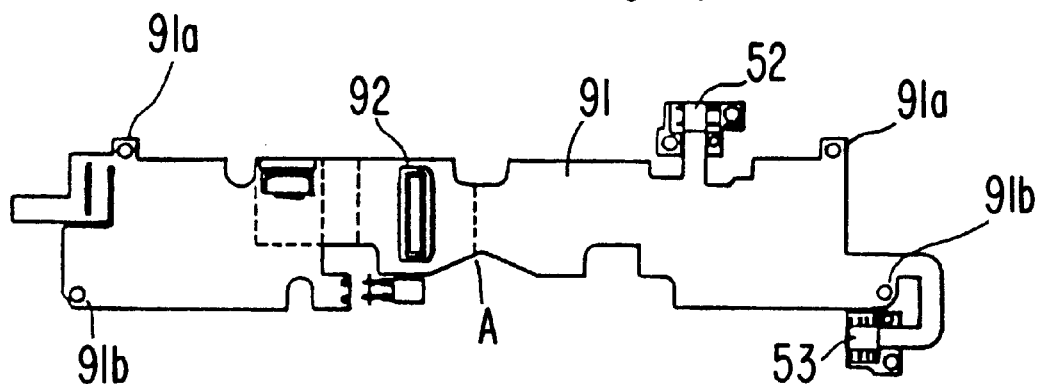
FIG. 30(a) is a top plane view of a flexible printed circuit board (FPC).
Figure 30B:
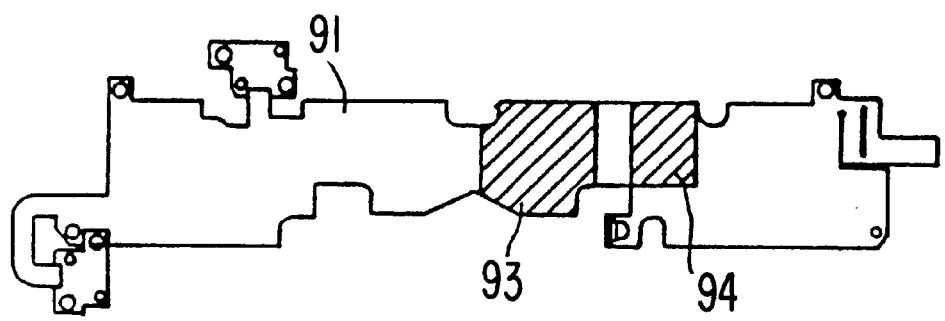
FIG. 30(b) is a flipped (i.e., bottom) plane view of the FPC shown in FIG. 30(a).
Figure 30C:
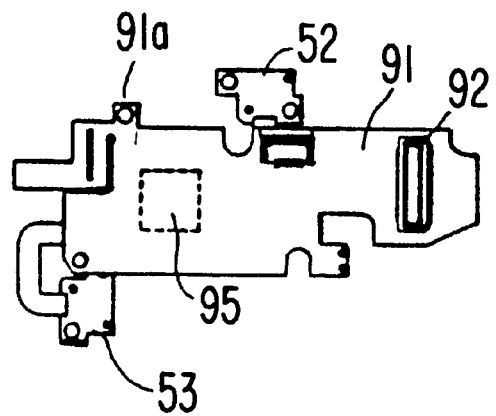
FIG. 30(c) is a top plane view of the FPC folded along the line A shown in FIG. 30(a).

FIG. 30(a) is a top plan view of the flexible printed circuit board (FPC) 91. FIG. 30(b) is a bottom (flipped-over) plan view of the FPC shown in FIG. 30(a). FIG. 30(c) is a top plan view of the FPC, folded to overlapped relationship along the line A—A shown in FIG. 30(a). On this FPC 91 there are mounted circuit parts, such as a head IC 95 for controlling servo signal, information signal of optical system and laser diode and the photo-detectors 52, 53. A plug-in connector 92 is provided on the FPC 91. Adjacent the fixed line A—A, a film having a certain hardness and sheets 93 and 94 are attached with a bonding agent or double-sided bonding tape. Therefore, the two folded portions of the plug-in connector 92 can be pressed together easily, enabling easier assembling work contributing greatly to the working efficiency on the occasion of connecting this connector 92 to the connector 92' in the side of the printed circuit board 11.

In FIG. 30(c), the FPC 91 is bent so that the plug-in connector 92 is exposed at the surface. Therefore, the mounting area of FPC 91 can be reduced, enabling the screwing thereof into threaded holes in support/mounting blades of base 20 adjacent the space 20i of the drive base 20 through the threaded holes 91a and 91b.

In addition, mounting of the FPC 91 in the space 20i of the drive base 20 facilitates electrical connections to the printed circuit board 11, also contributing greatly to improvement in the assembling work efficiency. Moreover, this location of the FPC 91 is beneficial since the undesired mixture into the signals for recording, reproducing and erasing operations can be prevented by connecting the wires, which for transfer the signals participating in the information recording or reproducing operations, with the plug-in connector without laying the wires to the outside of the drive base 20 between the drive base 20 and printed circuit board 11. Accordingly, it is possible to realize a disc drive having higher reliability, as the data storage device.

Meanwhile, the shielding effect can be obtained and interference of external noise can also be prevented by holding the wires between the printed circuit board 11 and drive base 20, using the plug-in connector 92, and then covering same with the frame 12. Therefore, a disc drive having excellent reliability as a data storage device can be attained.

Figure 31A:
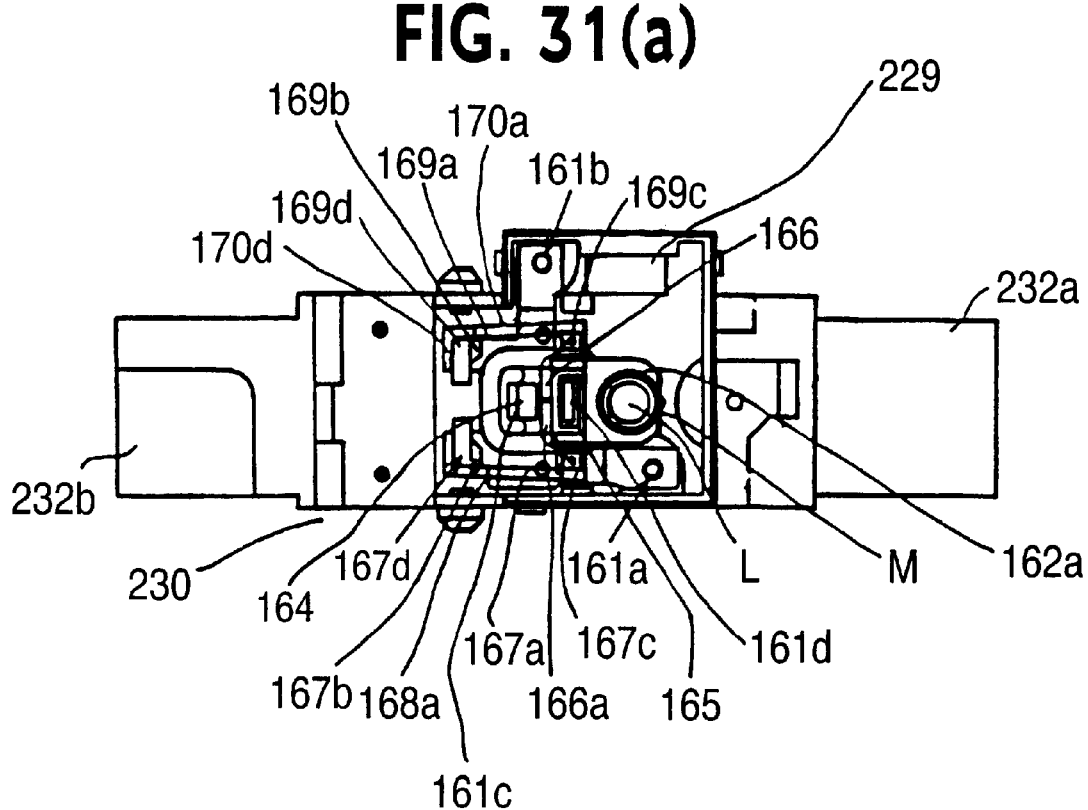
FIG. 31(a) is a top plane view of an alternative lens carriage and lens actuator.
Figure 31B:
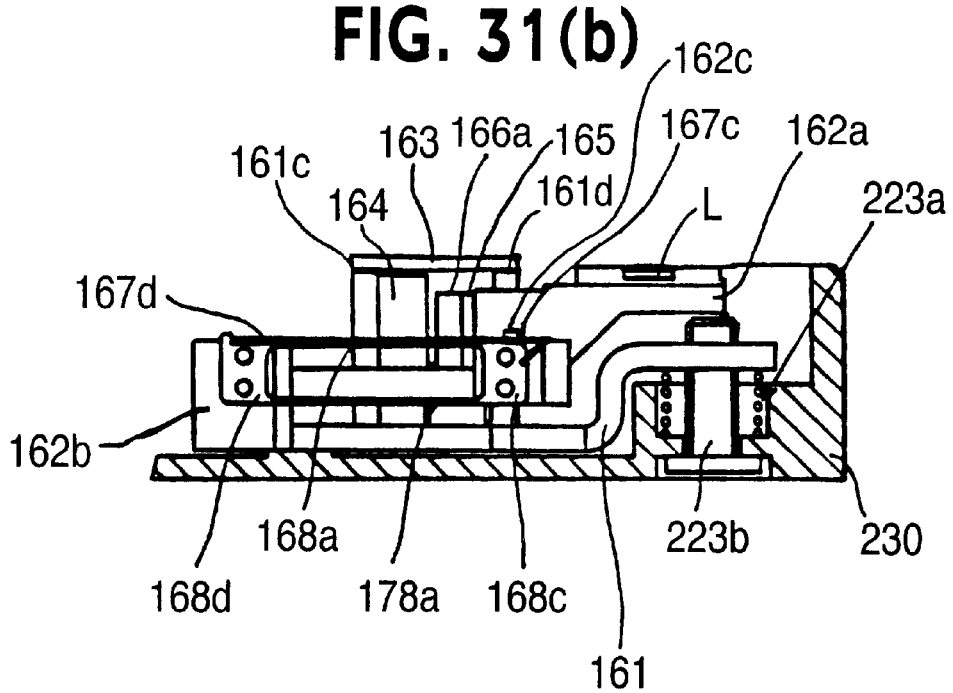
FIG. 31(b) is a side cross-sectional view of the lens actuator shown in FIG. 31(a).

FIG. 31(a) is a top plan view of an alternative lens carriage 230 and lens actuator. FIG. 31(b) is a side cross-sectional view of the lens actuator shown in FIG. 31(a).

In FIG. 31(a), a space is formed at the central area of the lens carriage 230 thereby to move the objective lens L in the radial direction of the optical disc, in order to mount a condenser lens 229 for inputting and outputting the optical beam from and to the fixed optical unit 40, a mirror M inclined at 45 degrees for reflecting the (horizontal) optical beam from the condenser lens 229 to a vertical direction, a lens actuator 60, etc.

At the opposite sides of the lens carriage 230, respective coil assemblies 232a and 232b are provided. A movable part of the lens actuator 60 comprises the lens holder 162a, made of thermosetting resin or the like, which movably holds the objective lens L in both the track direction and the focus direction, the focus coil 165 which is provided in close contact with the wall of the center aperture of the lens holder 162a and the track coils 166a, 166b which are provided in close contact with the respective opposite surfaces of the bonding parts, explained above, of the focus coil 165.

A pair of tracking coils 166a and 166b, respectively provided at the right and left sides of the focus coil 165, are wound in such a direction as to be almost perpendicular to the winding plane of the focus coil 165 and the end portions thereof protrude to the outside from the end surface of the yoke 163 of the magnetic circuit. That is, influence of the magnetic flux can be eliminated so as not to generate mechanical oscillation by locating the part extending to the upper and lower directions at the outside of the magnetic gap of the track coils 166a and 166b at the position outside the magnetic gap.

Moreover, a magnetic circuit of the actuator 160 comprise a magnet 164 provided on the actuator base 161, opposing to the track coil 165 at the center aperture of the lens holding means 162a in the movable side, a yoke 161c consisting of a bending portion of the actuator base 161 receiving a magnetic force of the magnet 164 and a yoke 163 provided on such two yokes.

Moreover, there are provided six wire assemblies 167a, 168a, 169a, 170a, 178a (one is not illustrated) for holding the movable portion of the lens actuator 60, terminal boards 167c, 168c, 169c (one is not illustrated) which are bonded after engaging the holes to the projection 162c of the lens holding means 162a to hold the end portion of the wire assembly in the side of the objective lens and the terminal boards 167d, 168d, 169d and 170d to be bonded to the wire holding means 162c fitted to the end portion of the actuator base 61. The vibration absorbing members 167b and 169b (two members are not illustrated) for absorbing vibration of the wire assemblies are also provided.

However, the terminal board 168c and the terminal board (coupled with the wire assembly 170a) in the opposite side of the lens holding member have two wire assemblies at the upper and lower sections and the two wire assemblies are coupled with only one terminal board. In addition, the wire assemblies may be formed, like the embodiment explained previously, in the vibration absorbing structure where the surrounding is covered with the bonding layer, vibration absorbing member or the like.

The end portion of FPC 39a is extended on the wire holding means 162b and is then soldered to four terminal boards on the wire holding means 162b. Moreover, the four terminal boards on the lens holding means 162 are soldered respectively to the two lead wires of the focus coil 165 and track coils 166a, 166b. As explained above, continuity among the focus coil 165, track coils 166a, 166b and FPC 39a has been established. Therefore, since electrical connection can be made without laying fine lead wires of each coil, there is no fear of disconnection of wires and higher reliability can also be attained.

Furthermore, the side wire assemblies and terminal boards at both end portions of each wire assembly may be manufactured by laminating plate or linear spring material using a die having a shape of a pair of right and left wire assemblies coupled with each other. The right and left wire assemblies are mounted to the wire holding means 162b while these are coupled (in the shape of "C") and thereafter the coupling portion is disconnected. Accordingly, use of such wire assemblies makes easier the handling and management of small size parts, thereby much improving the assembling efficiency.

Therefore, the actuator base 161 can be screwed through the spring 223a with the screw 223b at the fitting portions 161a and 161b of the bending piece thereof and the lens carriage 230 under the condition of mounting all parts of the lens actuator 60 explained above.

In this embodiment, constitution of each part has been explained in order to set the height of the optical disc drive to about 24 mm or less, that is, to about 17 mm.

According to the optical disc drive which performs recording and reproducing operations for the 3.5-inch magneto-optical disc cartridge explained above, following dimensions can be realized by constituting the disc drive with the parts, as explained above:

1. Thickness only of the substrate of the printed circuit board 11: About 0.8 mm (the circuit parts, in a maximum height of about 4.5 mm, can be mounted because the allowable height of the space 20i of the drive base 20 is about 4.5 mm)
2. Maximum height of cartridge holder 71: About 7.1 mm
3. Maximum height of the drive base 20: About 15.8 mm (Height of the recess 20h (FIG. 3) for the cartridge holder 71 is about 9.7 mm; height of the recess 20g (FIG. 4) for the turn-table motor unit 222 is about 6.0 mm; maximum height of head base is 6.4 mm; maximum height of eject motor is about 10.7 mm/minimum height is about 9.7 mm, including the thickness of the drive base which is set in the range of 0.8 to 1 mm) (Width: about 100.2 mm, maximum depth: about 132.2 mm)
4. Thickness of the center area of lens carriage: 7.0 mm (depth: about 22.2 mm) Thickness of lens carriage 30 including the molded coil portions and the magnetic circuit is about 7.6 mm (Thickness of VCM, only is about 4.5 mm.)
5. Total height of turn-table motor unit 222: About 5.8 mm. (Thickness of the actuator (metal) plate, only is about 0.6 mm.)
6. Thickness of cover 13: 0.2 mm
7. Maximum thickness of load plate: 4.7 mm (Above dimensions include the tolerance of ±0.1 mm.)

Thereby, since the thickness of the drive base 20 can be set to about 15.8 mm, considering the construction and layout of the component parts, the total height of the drive unit, the printed circuit board and cover mounted on the drive base, can be limited to about 17 mm—i.e., thus achieving a substantial reduction in size from current commercial devices.

Moreover, a width of 102 mm and a depth of 140 mm, including the printed circuit board and front bezel, etc. have been attained. (In more detail, 17.2 (height)×101.6 (width)× 140 mm (depth) has been achieved.) Therefore, the apparatus can be built into the slot of the thinner floppy disc drive, having measurements of a thickness of about 17 mm, a width of 102 mm and a depth of 140 mm.

Each constitution has been explained in this embodiment so as to enable limiting the total weight of the optical disc drive to about 300 g or less.

According to the optical disc drive of the invention, for the recording and reproducing operation of the 3.5-inch magneto-optical disc cartridge as is explained in this embodiment, the total weight of the disc drive can be reduced to about 250 g by setting the weights of the following principal sections, or components, to the following through reduction in thickness of the base unit 20, savings in the number of parts and simplification of the parts:

1 Total weight of printed circuit board: About 40 g (including the circuit parts)
2 Total weight of cartridge holder 71: About 50.2 g (including dust-proof sheet)
3 Total weight of lens carriage 30: About 36.7 g (including VCM, etc.)
4 Total weight of cover 13: About 19.8 g
5 Total weight of turn-table motor unit: About 18.3 g
6 Total weight of driver base 20: About 66.5 g (including load plate, LD unit, etc.)
7 Total weight of eject motor unit: About 10 g Moreover, the total weight of the disc drive, when a frame 12 and a front bezel 10, etc. are included, as an option, can be reduced to about 299 g.

In this invention, the optical disc drive of the magneto-optical disc cartridge has been explained but it is of course possible to introduce the technology for realizing thinner, lighter weight and smaller size unit, which has been explained in this embodiment, into the optical memory apparatus such as the 3.5-inch phase variable type optical disc accommodated in the cartridge.

An embodiment for utilizing the optical memory apparatus explained above, particularly the magneto-optical disc drive in the computer system, will now be explained.

Figure 32:
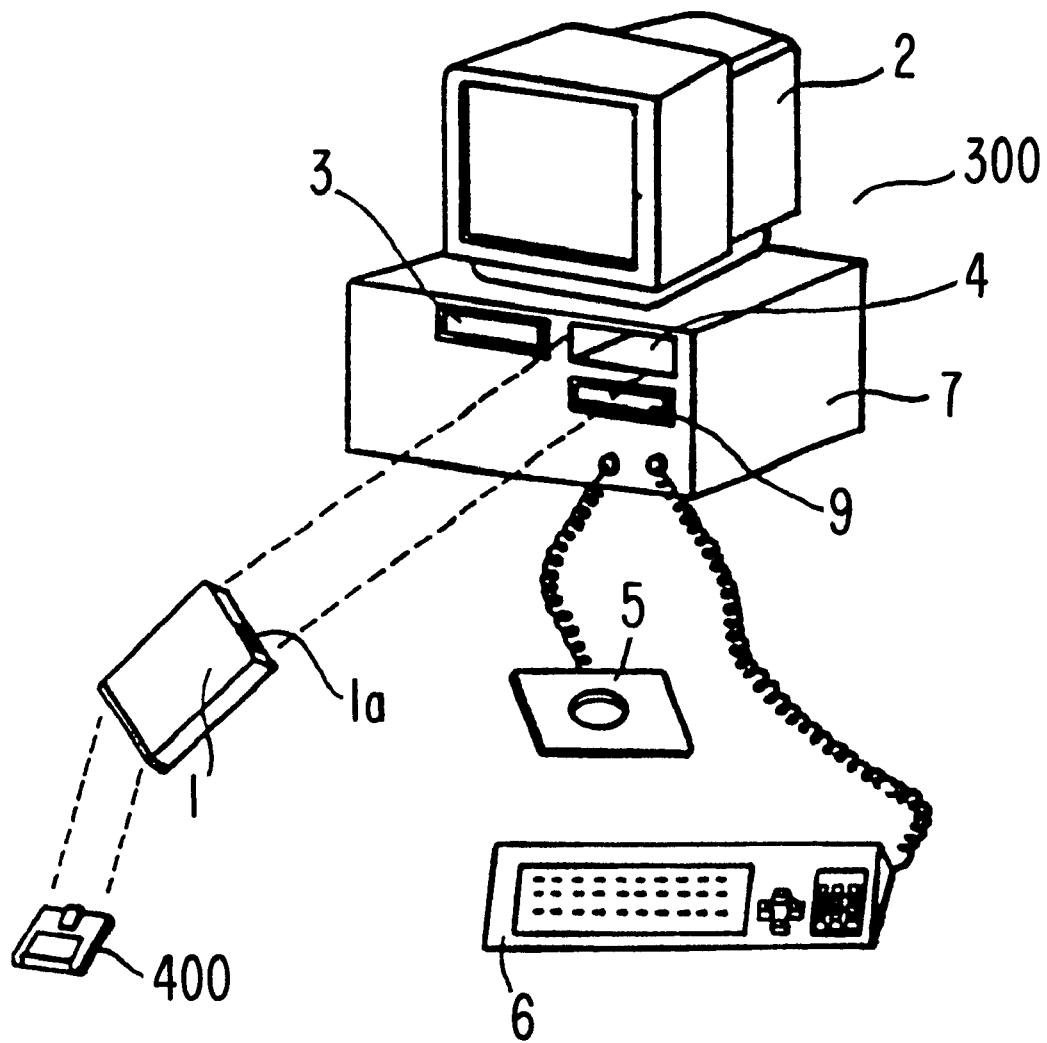
FIG. 32 is a perspective view of a personal computer.

FIG. 32 is a perspective view of a personal computer 300, comprising as primary components, a display 2, a mouse 5, a computer body 7 and a keyboard 6. The computer body 7 comprises a floppy disc disk drive 3, a CD-ROM optical disc drive 9 and a memory apparatus such as a magnetic disk drive (not illustrated). Moreover, a magneto-optical disc drive 1, having the structure as explained above, is inserted into a slot 4 which is a cavity part of the computer unit 7 and is designed to be a little larger than the disc drive and the connector 1a for E-IDE interface of the magneto-optical disc drive 1, which is connected to a connector (not illustrated) within the slot 4.

The memory apparatus explained above uses a portable type recording medium, except for the magnetic disk drive, and exposes a part of the mechanism to the surrounding environment to permit the insertion of the medium therein or the ejection of the medium from within the device and to the outside. Such a personal computer 300 is driven when the power switch is turned ON; it then reads the operating system software and applications from the preset memory and then executes the software.

Figure 33:
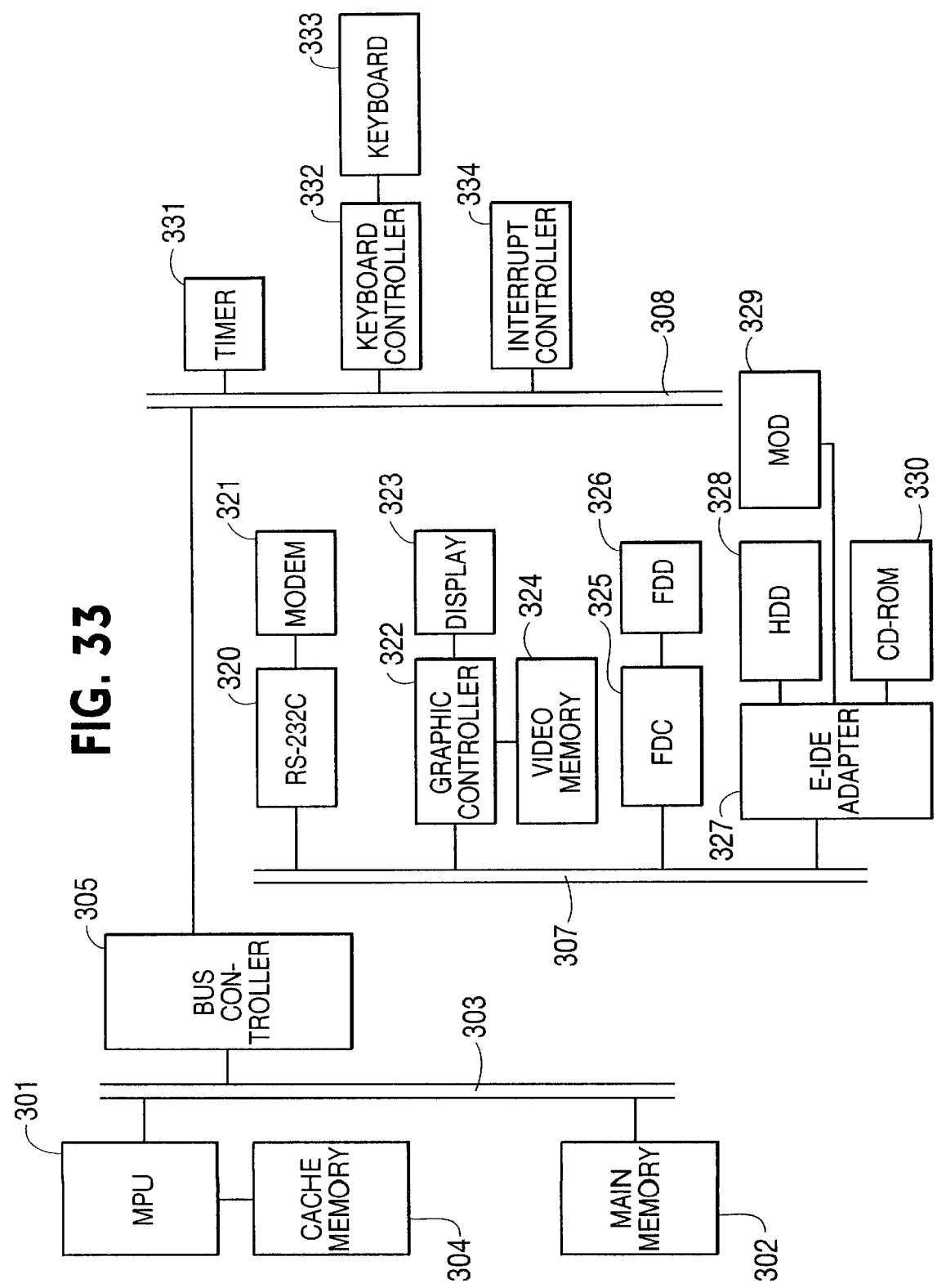
FIG. 33 is a block diagram of the personal computer shown in FIG. 32.

FIG. 33 is a block diagram of the personal computer shown in FIG. 32. A microprocessor (MPU) 301 is the heart of the personal computer, and processes the programs and data stored in the main memory 302. Data transfer between MPU 301 and main memory 302 is carried out by an internal bus 303. A cache memory 304 uses a memory element, which can make access at a higher rate than the main memory 302, to preferentially store the data having the higher application frequency. A bus controller 305 is connected to an internal bus 303 for the data transfer with the internal bus 307 or 308.

Next, the internal bus 307 is capable of directly connecting the external devices. This internal bus 307 is connected with the modem 321 via an RS-232C interface 320, with the display 323 via a graphic controller 322 and video memory 324 and with a floppy disk drive (FDD) 326 through a floppy disc controller (FDC) 325, respectively.

The internal bus 307 is further connected through an E-IDE adapter 327 to a magnetic disk drive (HDD) 328, a magneto-optical disc drive (MOD) 329, and a CD-ROM optical disc drive (CD-ROM) 330. The E-IDE interface is an extended version of IDE interface, and all of which are general, standard interfaces.

In succession, the internal bus 308 is used for interrupt control and is connected with a keyboard controller 332 in turn connected with the timer 331 and keyboard 333 and an interrupt controller 334.

Figure 34:
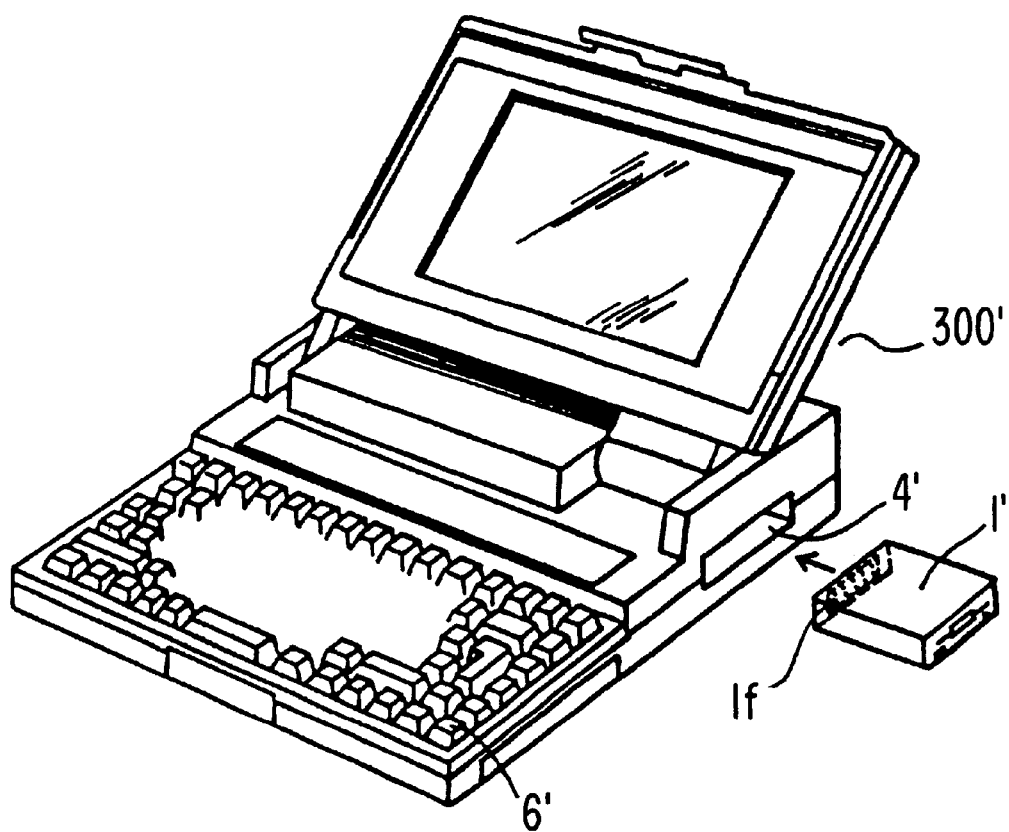
FIG. 34 is a perspective view of a laptop type computer and a floppy disk drive unit before mounting to the laptop computer.
Figure 35A:
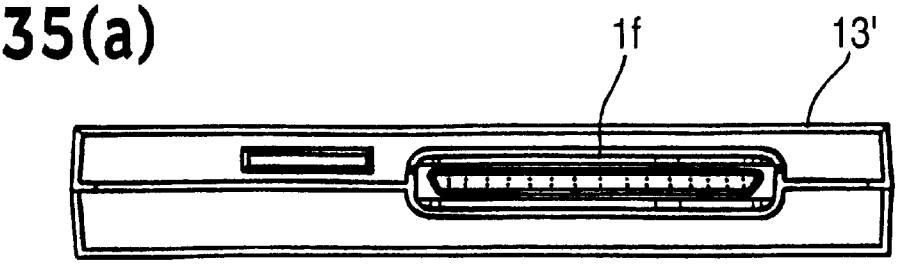
FIG. 35(a) is a rear plane view of a case for an optical disc drive.
Figure 35B:
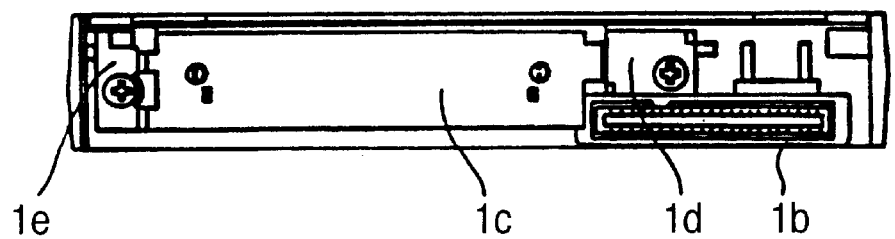
FIG. 35(b) is a front plane view of the case shown in FIG. 35(a).
Figure 35C:
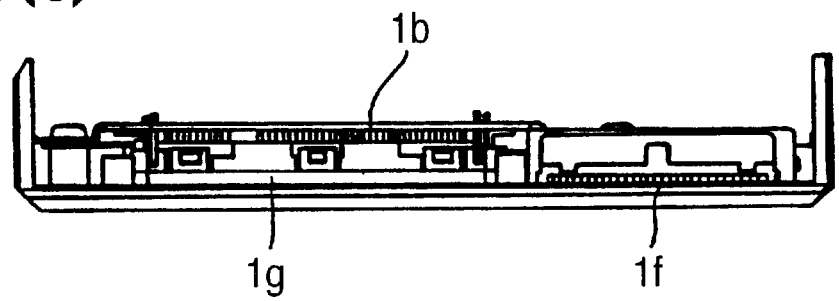
FIG. 35(c) is a partly top view of the interior of the case shown in FIG. 35(a).
Figure 35D:
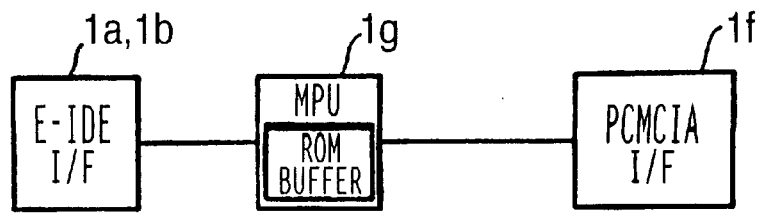
FIG. 35(d) is a block diagram of an interface conversion circuit of the disc drive shown in FIG. 35(a).

FIG. 34 is a perspective view of a laptop type computer and a floppy disk drive unit, before mounting the latter to the laptop computer. A laptop computer 300' has a keyboard 6' and a floppy disk drive unit of about 17 mm high or a slot 4' to which a power supply unit can be inserted.

The magneto-optical disc drive 1', explained above, can be reduced in size as described in regard to the present invention. Therefore, it can be set to almost the same size as the external shape of the floppy disk drive of about 17 mm high and can be used through insertion into the slot 4'.

FIG. 35(*a*) is a rear plane view of a case, or housing, for the optical disc drive. FIG. 35(*b*) is a front plane view of the case shown in FIG. 35(*a*). FIG. 35(*c*) is a partly top view of the interior of the case shown in FIG. 35(*a*). FIG. 35(*d*) is a block diagram of an interface conversion circuit of the disc drive shown in FIG. 35(*a*). Here, as shown in FIG. 35(*a*), a case 13' is provided to slide the magneto-optical disc drive unit 1 within the slot 4'.

The interface of the laptop type computer 300' of this embodiment is different from the interface of the magneto-optical disc drive 1 of the embodiment explained above. Therefore, since it is impossible to simply connect them, an interface conversion circuit is then provided at the inside of the case 13' as shown in FIGS. 35(*a*) to 35(*b*).

In more detail, the magneto-optical disc drive 1 of the invention, as explained above, uses the connector 1*a* for E-IDE, but since the interface of the laptop type computer 300' in this embodiment is the PCMCIA type, various signals outputted from the connector 1*a* for E-IDE are converted to the signals for PCMCIA.

Therefore, the connector 1*b* to which the connector 1*a* for E-IDE is connected, in opposition when the magneto-optical disc drive 1 is accommodated in the case 13', is provided in the case 13'.

Moreover, FPC ic for guiding the signals from the connector 1*b* is screwed to the metal plates 1*d* and 1*e* attached to the case 13'. In addition, a microprocessor unit (MPU) 1*g* having a ROM, BUFFER, etc., is mounted on FPC 1*c* and is connected to the connector 1*b* with the E-IDE standard and to the connection 1*f* with the PCMCIA standard. The signal from E-IDE connector 1*b* is converted to the signal for PCMCIA and is then transferred to the connector if of the other end side. The signal from PCMCIA is then converted to the signal for E-IDE similarly. The connector if is projected to the outside from the case 13' and it can be connected to the PCMCIA of the interface of the laptop type computer 300'.

Therefore, the optical memory apparatus can be connected to many host apparatuses by changing only the case, depending on the users' request.

Figure 36A:
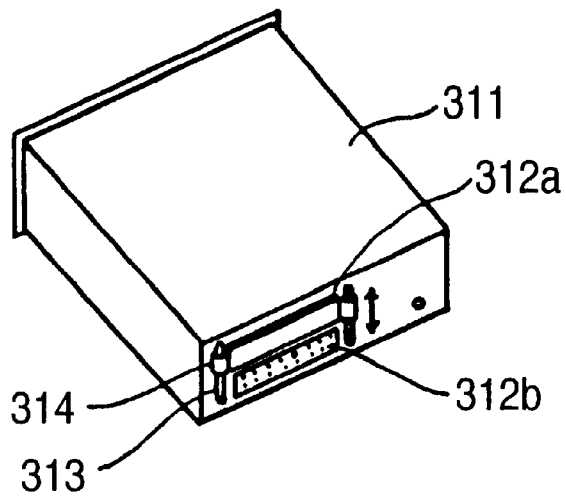
FIG. 36(a) is a rear perspective view of an internal magneto-optical disc drive unit with an E-IDE interface connector and a SCSI interface connector.
Figure 36B:
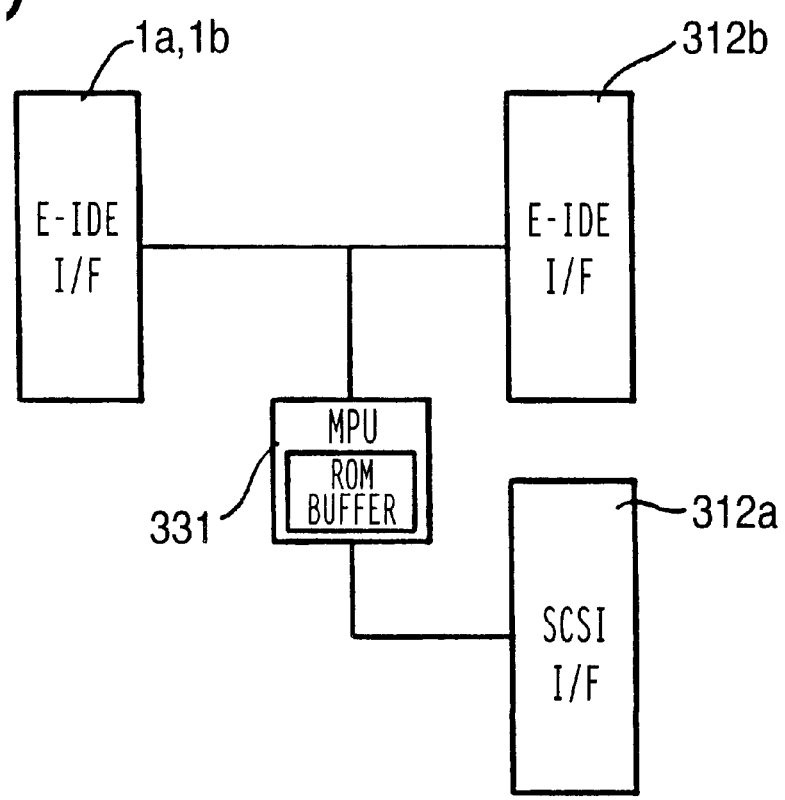
FIG. 36(b) is a block diagram of an interface conversion circuit of the disc drive shown in FIG. 36(a).

FIG. 36(*a*) is a rear perspective view of an internal magneto-optical disc drive with an E-IDE interface and a SCSI interface. FIG. 36(*b*) is a block diagram of an interface conversion circuit of the disc drive shown in FIG. 36(*a*).

In FIG. 36(*a*), the magneto-optical disc drive 1 explained in relation to FIG. 1 is accommodated in the case (cabinet) 311 and two kinds of connectors, an SCSI connector 312*a* and an E-IDE connector 312*b*, are projected to the outside of the case 311.

The slide plate 314 opens to reveal one of two kinds of connectors and covers the other connector not being used. Long pins 313 are engaged in opposite sides of the slide plate 314 and permit movement thereof between respective connectors provided at the upside and downside slide positions. For use of the lower connector, the slide plate 314 is moved upwardly and is then fixed in place with a screw or pin (not illustrated).

In FIG. 36(*b*), the SCSI connector 312*a* and E-IDE connector 312*b* divide the signal lines for guiding the signals of the E-IDE connector 1*a* of the magneto-optical disc drive 1 into two sections. Thereby, one is used directly for E-IDE, while the other is connected to the micro processor unit (MPU) 311 having ROM BUFFER, etc., so that the signal for E-IDE is converted for SCSI and the signal for SCSI is converted for E-IDE, on the contrary.

A shape of the case and a kind of interface connectors for optical disc apparatus, such as SCSI, E-IDE, PCMCIA connectors, can be selected for the magneto-optical disc drive considering applicability and users' request.

Therefore, connectability of the optical memory apparatus having a certain specification with host apparatus, such as any of many kinds of personal computers, can be improved only by changing the case.

Figure 37A:
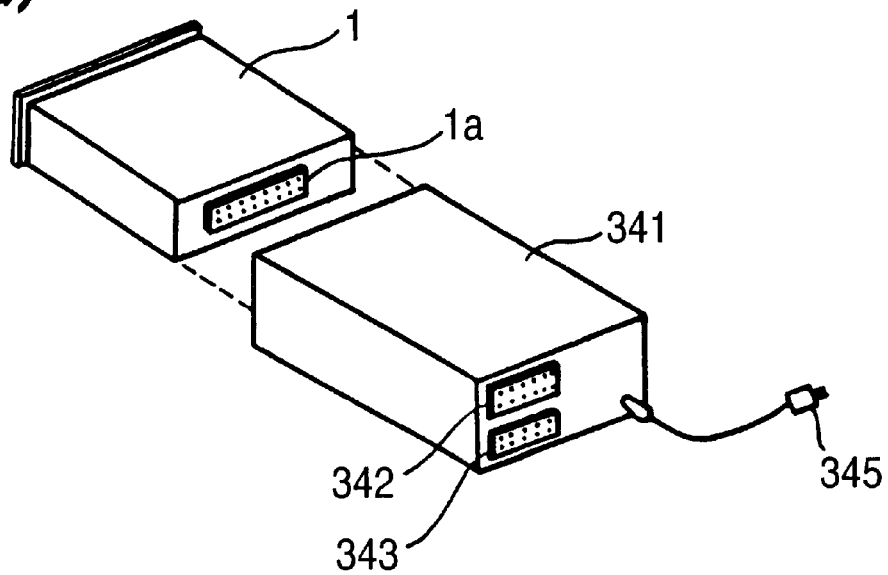
FIG. 37(a) is a rear perspective view of an external magneto-optical disc drive unit with a SCSI interface and a PCMCIA interface.
Figure 37B:
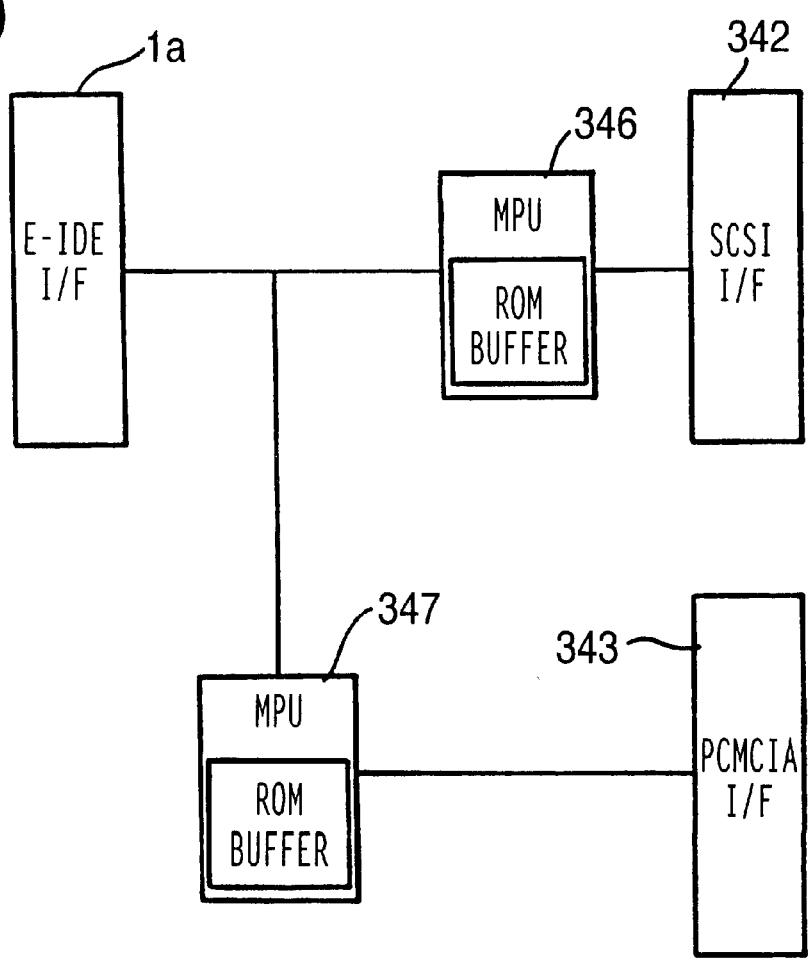
FIG. 37(b) is a block diagram of the interface conversion circuit of the disc drive shown in FIG. 37(a).

FIG. 37(*a*) is a rear perspective view of an external magneto-optical disc drive with a SCSI interface and a PCMCIA interface. FIG. 37(*b*) is a block diagram of the interface conversion circuit of the disc drive shown in FIG. 37(*a*). The magneto-optical disc drive 1 has a connector 1*a* for E-IDE. The magneto-optical disc drive 1 can be connected to the conversion connector not illustrated in the case 341 by inserting it to the case 341 having the SCSI connector 342 other than E-IDE connector, PCMCIA connector 343 and power adapter 345.

The micro processor unit (MPU) 346 having ROM BUFFER, etc., converts the signal for E-IDE to the signal for SCSI and converts conversely between the E-IDE connector 1*a* and the SCSI connector 342 signals to the host apparatus such as personal computer body 300 and laptop type computer 300' via the SCSI connector. Similarly, the micro processor unit (MPU) 347 having ROM Buffer, etc., between the E-IDE connector 1*a* and PCIMIA connector 343, converts the signal for E-IDE to the signal for PCMCIA and converts conversely.

Such signal conversion is performed by conversion of the corresponding signals using the data indicating corresponding relationship of signal definition and pin number between the E-IDE and the SCSI interfaces. Signal definition and pin number of the interface are generally known.

A simple conversion example will be indicated. For instance, the pin No. 1 indicates RESET for E-IDE type, GROUND for PCMCIA type and GROUND for SCSI type. Therefore, since definitions of signals are different among the interfaces, for transmission of GROUND, conversion is made so that the signal of the pin No. 2 for E-IDE type is transferred to the pin No. 1 for PCMCIA type and to the pin No. 1 for SCSI type.

Figure 38:
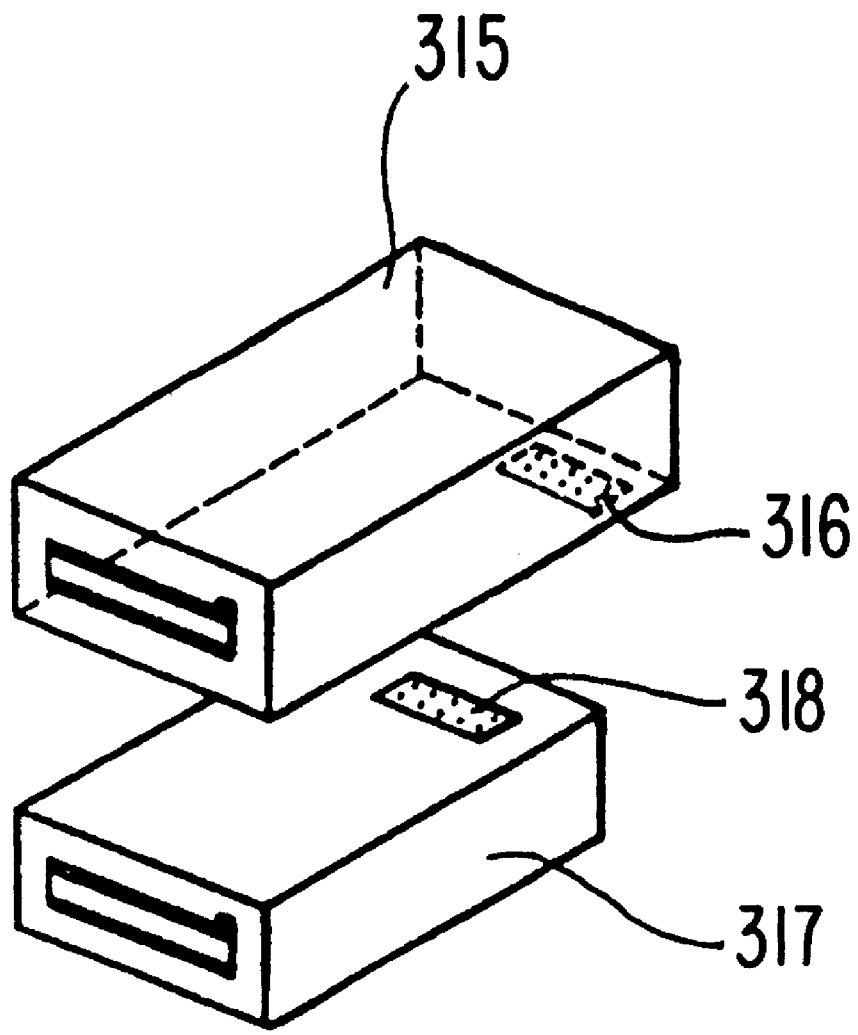
FIG. 38 is a perspective view of a directly connectable external optical disc drive unit connecting to another optical disc drive unit.

FIG. 38 is a perspective view of a directly connectable external optical disc drive among the optical disc drive. In this embodiment, the connectors 316 and 318 which may be connected with each other are provided, in this embodiment, at the position where the cases 315 and 317 are provided opposed with each other when the cases 315, 317 of two units of memory apparatus are stacked for the arrangement.

Connection of connector can be made, without providing or laying the cables, only by stacking two units of memory apparatuses in the vertical direction. In this embodiment, the optical memory apparatus is considered as an example, but connection, for example, between the hard disc apparatus and magneto-optical disc apparatus can be made by using in common the interface connectors to be connected and thereby direct transfer of data between such apparatuses can be realized.

Moreover, application into the data transfer between hard disc apparatus and floppy disc apparatus other than the optical memory apparatus is also possible.

Accordingly, connection of connectors in the right and left direction may also be realized only by exposing the connectors not only in the vertical direction but also in the horizontal direction. In addition, the connectors are provided, in this embodiment, at the upper and lower surfaces of the disc drive, but two or more apparatuses can be connected by providing the connectors at the upper and lower surfaces.

As explained previously, the present invention offers a thinner, smaller size, lighter weight and more compact optical memory apparatus which has remarkably improved assembling work efficiency as described above.

Moreover, the present invention can also offer the optical memory apparatus which has also improved higher reliability without lowering capability as the data memory apparatus even after reduction in thickness, size and number of parts.

Therefore, the present invention can offer, through reduction in thickness, size and weight of apparatus, the optical memory apparatus which can be mounted into a portable and thinner laptop type personal computer. In addition, the present invention can offer the optical memory apparatus which can be loaded to the slot of the apparatus in the thickness of 1-inch or less, namely of about 17 mm of the computer system.

The present invention can further offer the optical memory apparatus, in which height of the drive base is approximated as much as possible to the thickness of the optical disc cartridge (6.0±0.2 mm, conforming to 3.5-inch optical disc cartridge of ISO standards).

Accordingly, the present invention enables mounting and connection of optical memory apparatus into many host apparatuses to expand the application mode thereof into a wider range and to improve flexibility thereof.

Accordingly, it will be apparent to those of skill in the art that the system of the invention is subject to many modifications and adaptations and, thus, it is intended by the appended claims to encompass all such modifications and adaptations which fall within the true spirit and scope of the invention.

What is claimed is:

1. An optical memory apparatus which receives and reads data from an optical memory medium, comprising:
    an optical head having a fixed optical part and a movable optical part;
    a base having an approximately rectangular shape, a recess therein comprising a unitary and integral optical component mounting portion having precision mounting surfaces therein for mounting thereon respective optical components of the fixed optical part and a side wall having a portion at an edge of said base, the side wall defining a boundary of said recess and having an opening therein;
    holding members holding corresponding said components of said fixed optical part on the respective precision mounting surfaces;
    a carriage movably mounted on said base and carrying said movable optical part;
    a light emitter mounted on said base; and
    a photo-detector mounted on said sidewall and a light beam passing through said opening to the photodetector.

2. The optical memory apparatus of claim 1, wherein:
    said base has an optical memory medium holding portion which receives and holds an optical memory medium: and
    the recess of said base is displaced laterally from the optical medium holding portion.

3. The optical memory apparatus of claim 2, further comprising:
    an ejection motor mounted on said base and displaced laterally from the optical medium holding portion.

4. The optical memory apparatus of claim 2, further comprising:
    a cover covering the recess of said base.

5. The optical memory apparatus of claim 2, wherein:
    the side wall has a second opening therein; and
    said light emitter is mounted on the second opening.

6. The optical memory apparatus of claim 2, wherein:
    said base has a further recess in which said carriage is movable and an internal side wall; and
    the internal side wall defines the further recess and the further recess has a second opening therein for introducing a beam emitted from said light emitter to said movable optical part.

7. An optical memory apparatus as recited in claim 1, wherein the fixed optical part comprises a plurality of components, the base comprises plural precision surfaces, and each component, of the plural components of the fixed optical part, is engaged directly with a respective precision surface and thereby is optically aligned with a next adjacent component.

8. An optical memory apparatus which receives and reads data from an optical memory medium, comprising:
    an optical head having a fixed optical part and a moveable optical part;
    a base having an approximately rectangular shape and a unitary and integral construction comprising a supporting surface and peripheral and interior sidewalls surrounding and defining a first recess in the base, the first recess further having precision mounting surfaces therein for receiving and mounting thereon respective optical components of the fixed optical part;
    a turntable motor mounted on said base;
    a carriage movably mounted on said base and carrying said movable optical part;
    a light emitter mounted on said base and supplying a light beam to the fixed optical part through a first opening in an associated said sidewall, the fixed optical part transmitting the beam through a second opening in an associated interior sidewall to the moveable optical part mounted on said carriage for scanning an optical memory medium with the beam and, further, the fixed optical part receiving a light beam reflected from the optical memory medium through the second opening and transmitting the received reflected beam through a third opening in an associated sidewall surrounding the first recess;

a photo-detector mounted on said base adjacent the third opening in the associated sidewall and receiving and detecting the beam transmitted from the fixed optical part through the third opening; and an eject motor mounted on said base.

9. The optical memory apparatus of claim 7, wherein said eject motor is a flat box type motor.

10. The optical memory apparatus of claim 8, wherein said base further comprises a unitary and integral, second recess and said eject motor is mounted within the unitary and integral, second recess.

11. The optical memory apparatus of claim 10, wherein:

said base has a me dium holding portion which receives and holds an optical memory medium: and the first and second unitary and integral recesses of said base are displaced from the medium holding portion.

12. An optical memory apparatus as recited in claim 8, wherein the fixed optical part comprises a plurality of components, the base comprises plural precision surfaces, and each component, of the plural components of the fixed optical part is engaged directly with a respective precision surface and thereby is optically aligned with a next adjacent component.

13. An optical memory apparatus which receives and reads data from an optical memory medium, comprising:

an optical head having a fixed optical part and a moveable optical part;

a base having a recess therein comprising a unitary and integral mounting portion having precision mounting surfaces for mounting thereon respective optical components of the fixed optical part and a side wall having a portion at an edge of the base, the side wall defining a boundary of the recess;

a carriage mounted on said base for movement along a seek direction and carrying said movable optical part; and said optical components of the fixed optical part comprise:

a light emitter emitting a beam in a direction substantially perpendicular to the seek direction, a first fixed optical component reflecting a beam emitted from said light emitter to said movable optical part and further reflecting a beam, reflected from the optical memory medium, in a direction substantially perpendicular to the seek direction, a second fixed optical component receiving the beam reflected from said first fixed optical component and separating therefrom a data signal component and a servo signal component, a first photo-detector receiving and detecting the data signal component, and a second photo-detector receiving and detecting the servo signal component;

the first and second detectors mounted on the sidewall of the base.

14. The optical memory apparatus of claim 13, wherein:
said light emitter is mounted on the side wall.

15. The optical memory apparatus of claim 13, wherein:
said first fixed optical component comprises a beam reflector prism; and said second fixed optical component comprises a beam splitter and a Wollaston prism.

16. The optical memory apparatus of claim 13, further comprising:

a third fixed optical component mounted in the recess between said second fixed optical component and said second photo-detector and receiving a beam from said second fixed optical component and separating therefrom and outputting a first servo signal component and a second servo signal component.

17. The optical memory apparatus of claim 16, wherein said second photo-detector has a flat surface and further comprises:

a first detector element mounted on the flat surface detecting the first servo signal components and a second detector element mounted on the flat surface and detecting the second servo signal component.

18. An optical memory apparatus as recited in claim 13, wherein the fixed optical part comprises a plurality of components, the base comprises plural precision surfaces, and each component, of the plural components of the fixed optical part, is engaged directly with a respective precision surface and thereby is optically aligned with a next adjacent component.

19. A base unit of an optical disc memory having, relative to a horizontal orientation thereof, an outer periphery defined by first and second longitudinal sides and front and rear lateral ends and defining an optical axis substantially parallel to and disposed centrally between the first and second longitudinal sides, the base unit accommodating an optical head assembly which has a fixed optical part and a moveable optical part and comprising:

a horizontal base plate having a unitary and integral structure of upper and lower major surfaces, peripheral sidewalls and an interior lateral partition wall which together define a cartridge receiving slot on the upper major surface of the base plate, the optical axis being defined below the lower major surface of the base plate, and first and second support plates which extend from the interior, lateral partition wall to the rear lateral end of the base and define first and second upper mounting surfaces and first and second lower cavities, respectively;

the first lower cavity having support blocks therein which are unitary and integral with the second support plate and precision machined for mounting thereon, in optically aligned relationship, individual optical components of the fixed optical part so as to direct a laser beam along the optical axis;

the second lower cavity receiving and mounting therein an ejection motor; and the horizontal base plate, further, having a first aperture therein to accommodate a lens carriage, as selectively driven in reciprocating motion along the optical axis thereby to receive and redirect a laser beam from the optical axis to a vertical direction for scanning an optical disc and for receiving a beam, reflected from the scanned optical disc in the vertical direction, thereby to redirect and return the reflected beam along the optical axis to the fixed optical system and a second aperture therein permitting reciprocating vertical movement therethrough of a disc drive turn-table of a disc drive unit, mounted beneath the lower surface of the base plate, from a lowered position at which the turn-table extends no higher than the upper major surface of the base plate to a raised position at which the turn-table extends above the upper major surface of the base plate, the disk drive turn-table, in the raised position, engaging and driving, in rotation, an optical disc of a cartridge inserted into the cartridge receiving slot and, upon return to the lowered position, releasing the cartridge and permitting ejection thereof from the cartridge receiving slot.

20. A base unit of an optical disc memory having an optical head assembly which has a fixed optical part and a moveable optical part and receiving therein a disc cartridge, the base unit having an outer periphery defined by first and second longitudinal sides and front and rear lateral ends, generally transverse to the first and second longitudinal sides, and an optical axis substantially parallel to and disposed centrally between the first and second longitudinal sides and comprising:

a receiving slot for receiving a disc cartridge therein and comprising an upper surface of a base plate having a unitary and integral structure comprising upper and lower major surfaces extending between the first and second longitudinal sides and from the front lateral end toward the rear lateral end by a distance sufficient to receive the cartridge within the base unit, the optical axis being disposed parallel to and spaced from the lower major surface of the horizontal base plate;

first and second cavities of the unitary and integral base plate structure disposed therein in contiguous, laterally-displaced relationship and accessible from the lower major surface of the horizontal base plate and extending from the rear lateral end of the base unit and toward, but separated from, the cartridge receiving slot, the first cavity having support blocks therein which are unitary and integral with the base unit and precision machined for mounting thereon, in optically aligned relationship individual optical components of the fixed optical part so as to direct a laser beam along the central optical axis;

the horizontal base plate, further, having a first aperture therein accommodating a lens carriage, as selectively driven in reciprocating motion along the optical axis on which the moveable optical part is mounted, thereby to receive the laser beam from the optical axis and redirect same transversely to the surface of an optical disc of a disc cartridge, received in the disc cartridge receiving slot, for scanning the surface of the optical disc in a radial direction and to receive a reflected beam from the scanned optical disc and redirect and return same along the optical axis to the fixed optical system and having a second aperture therein permitting reciprocating transverse movement therethrough of a disc drive turntable of a disc drive unit, mounted beneath the lower major surface of the base plate, from a lowered position to a raised position the disk drive turn table in the raised position, engaging and driving, in rotation, an optical disc of a disc cartridge inserted into the cartridge receiving slot, and upon return to the lowered position, releasing a disc previously engaged thereby and permitting ejection of the disc cartridge from within the cartridge receiving slot; and the second cavity having a depth, in a direction transverse to the upper and lower major surfaces accommodating a cartridge ejection motor therein.

21. A base unit as recited in claim 20, further comprising:

a recess defined at the lower major surface of the base plate, extending from the front lateral end of the base unit and having a depth determined substantially by the extent of transverse movement of the disc drive unit between the raised and lowered positions thereof.

* * * * *

UNITED STATES PATENT AND TRADEMARK OFFICE
CERTIFICATE OF CORRECTION

PATENT NO.:     6,141,309
DATED      :    October 31, 2000
INVENTOR(S):    Hidenori SAITOU et al.

It is certified that error appears in the above-identified patent and that said Letters Patent is hereby corrected as shown below:

Col. 33,    line 13, change "med ium" to --medium--.

Col. 34,    line 9, change "components" to --component;--.

Signed and Sealed this

Eighth Day of May, 2001

Attest:

NICHOLAS P. GODICI

Attesting Officer    Acting Director of the United States Patent and Trademark Office